(12) United States Patent
Harwood et al.

(10) Patent No.: US 9,631,603 B2
(45) Date of Patent: Apr. 25, 2017

(54) WING WITH SLIPSTREAM TURBINE

(71) Applicants: Don Allen Harwood, Eureka, CA (US); Keith Allen Harwood, Eureka, CA (US)

(72) Inventors: Don Allen Harwood, Eureka, CA (US); Keith Allen Harwood, Eureka, CA (US)

( * ) Notice: Subject to any disclaimer, the term of this patent is extended or adjusted under 35 U.S.C. 154(b) by 392 days.

(21) Appl. No.: 14/463,856

(22) Filed: Aug. 20, 2014

(65) Prior Publication Data
US 2016/0053742 A1   Feb. 25, 2016

(51) Int. Cl.
*F03D 1/06* (2006.01)
*F03D 3/00* (2006.01)

(52) U.S. Cl.
CPC ............ *F03D 3/00* (2013.01); *F03D 1/0633* (2013.01); *F03D 3/002* (2013.01); *F05B 2240/34* (2013.01); *F05B 2240/921* (2013.01); *F05B 2240/923* (2013.01); *Y02E 10/721* (2013.01); *Y02E 10/74* (2013.01)

(58) Field of Classification Search
CPC .......... F03D 3/002; F03D 3/04; F03D 3/0427; F03D 3/0436; F03D 3/0454; F03D 3/005; F03D 3/065
See application file for complete search history.

(56) References Cited

U.S. PATENT DOCUMENTS

| | | | | |
|---|---|---|---|---|
| 4,084,918 A | * | 4/1978 | Pavlecka | F03D 1/04 290/55 |
| 6,849,964 B2 | * | 2/2005 | Becherucci | F03D 3/0418 290/42 |
| 7,112,034 B2 | * | 9/2006 | Bezemer | F03D 3/04 415/3.1 |
| 8,432,056 B2 | * | 4/2013 | Bailey | F03B 1/02 290/43 |
| 2010/0032954 A1 | * | 2/2010 | Law | F03D 3/0454 290/55 |

* cited by examiner

*Primary Examiner* — Justin Seabe
(74) *Attorney, Agent, or Firm* — Craig A. Simmermon

(57) ABSTRACT

A wing with slipstream turbine comprising: a wing or airfoil and at least one turbine, wherein wing or airfoil has at least one partial cylindrical void in a surface and at least one turbine is partially encapsulated within partial cylindrical void. Optionally, wing with slipstream turbine may further comprise at least one slipstream outrigger to help focus the flow of the slipstream more directly on a turbine. Optionally, wing with slipstream turbine may further comprise at least one lateral outrigger to create a low-pressure area which functions to add additional energy transfer to turbine. Optionally, wing with slipstream turbine may further comprise two leading outriggers to help focus the flow of the slipstream more directly on a turbine. Optionally, wing or airfoil may further comprise a leading subcomponent, a left subcomponent, and a right subcomponent to create a super low-pressure area which functions add additional energy transfer to turbine.

1 Claim, 46 Drawing Sheets

WING WITH SLIPSTREAM TURBINE

BACKGROUND OF THE INVENTION

1. Field of the Invention

This invention relates to windmills, turbines, propellers, or other mechanical devices that capture kinetic energy from surrounding fluid using fins, blades, vanes, or other similar appendage to cause a turbine to rotate. This invention is a wing or airfoil with at least one partially encapsulated turbine therein, leaving exposed some turbine blades that extend into the slipstream layer of fluid created by the wing or airfoil as described below.

2. Description of Related Art

This invention uses a wing or airfoil to create at least one slipstream layer of fluid, which is then used to rotate at least one partially encapsulated turbine that is housed within the wing or airfoil. A slipstream layer produced by a wing or airfoil is desirable for this purpose because it is a high-velocity thin layer of fluid in close proximity to the wing or airfoil. The wing or airfoil also serves as a housing for the turbine. This design is very efficient because the bulk of the turbine is shielded by the wing or airfoil, which in turn creates a slipstream layer near the wing, so that the turbine blades do not have to extend very far to reach the slipstream, to enable very efficient kinetic energy transfer from fluid to turbine. A special wing or airfoil uses at least one partially encapsulated turbine within the wing or airfoil, leaving some exposed turbine blades that extend out to the slipstream layer of fluid to provide superior kinetic energy transfer from the surrounding fluid to the turbine. The special wing or airfoil can be placed in a windy area or other fluid with relative motion to create a slipstream. Alternately, the special wing or airfoil can be attached to a moving body within in a relatively still fluid to create a slipstream. The slipstream in turn causes the turbine to rotate. Turbine rotation can be used for the generation of electrical power or the production of other work.

Applicants are not aware of any prior art that discloses such a wing or airfoil with a partially encapsulated turbine with exposed turbine blades that extend to the slipstream layer thereby created by the wing to yield turbine rotation for the extremely efficient generation of electrical power or the production of other work and in such a way as is described here within this application.

BRIEF SUMMARY OF THE INVENTION

It is an aspect of this invention to provide a wing or airfoil in order to create a slipstream.

It is an aspect of wing or airfoil to have at least one partial cylindrical void therein.

It is an aspect of at least one partial cylindrical void to contain or house at least one turbine where the turbine may freely rotate within the partial cylindrical void.

It is an aspect of at least one turbine to have blades or fibrous material that protrude above the surface of the wing or airfoil to reach the slipstream created by the wing or airfoil.

It is an aspect of this invention to receive and transfer kinetic energy from fluid with relative motion surrounding the wing or airfoil to at least one turbine.

It is an optional aspect of this invention to have at least one low pressure area in the vicinity of the turbine, where each function to add additional kinetic energy transfer from the surrounding fluid with relative motion into rotational energy of at least one turbine.

It is an optional aspect of this invention to include at least one leading outrigger.

It is an optional aspect of this invention to include at least one slipstream outrigger.

It is an optional aspect of this invention to include at least one lateral outrigger.

It is an optional aspect of wing or airfoil to further comprise: a leading wing subcomponent, a left wing subcomponent, and a right wing subcomponent.

It is an optional aspect of this invention to have a plurality of low pressure areas in the vicinity of the turbine that each function to add additional kinetic energy transfer from the surrounding fluid with relative motion into rotational energy of at least one turbine.

BRIEF DESCRIPTION OF THE DRAWINGS

All art presented is of an idealized concept, proportions may vary according to engineering and site conditions.

DEFINITION LIST

Figure 1:
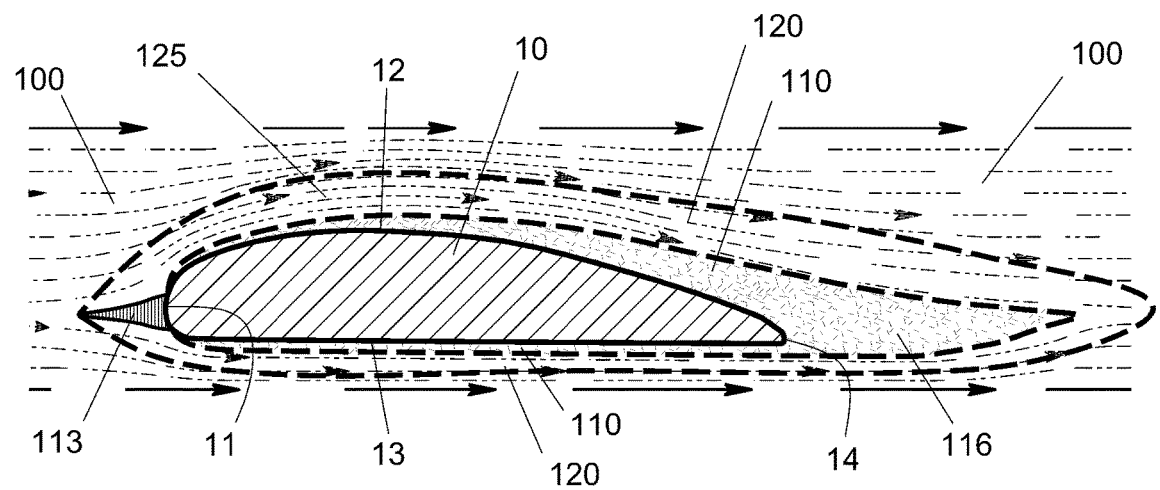
FIG. 1 is a lateral cross sectional view of a classic or standard wing or airfoil surrounded by fluid with relative motion depicting the boundary layer and the slipstream layer around the wing or airfoil.

| Term | Definition |
|---|---|
| 5 | Wing with Slipstream Turbine |
| 10 | Wing or Airfoil |
| 11 | Leading Edge |
| 12 | Left Surface |
| 13 | Right Surface |
| 14 | Trailing Edge |
| 15 | Upper End |
| 16 | Lower End |
| 18 | Mechanical Housing |
| 20 | Partial Cylindrical Void |
| 22 | Left Partial Cylindrical Void |
| 24 | Right Partial Cylindrical Void |
| 26 | Left Turbine |
| 28 | Right Turbine |
| 30 | Turbine |
| 32 | Axle |
| 33 | Axis-of-Rotation |
| 34 | Spoke Member |
| 36 | Drum or runner |
| 38 | Blade or Traveler |
| 39 | Fibrous Surface Covering |
| 40 | Leading Outrigger |
| 45 | High Pressure Chamber |
| 50 | Slipstream Outrigger |
| 53 | Slipstream Inlet Channel |
| 56 | Slipstream Outlet Channel |
| 60 | Lateral Outrigger |
| 63 | Low Pressure Chamber |
| 66 | Low Pressure Chamber Vent |
| 70 | Leading Subcomponent Wing or Airfoil |
| 72 | Left Subcomponent Wing or Airfoil |
| 74 | Right Subcomponent Wing or Airfoil |
| 76 | Center Evacuation Channel |
| 78 | Super Low Pressure Chamber |
| 100 | Surrounding Fluid |
| 110 | Boundary Layer of Fluid Surrounding Wing or Airfoil |
| 113 | Stagnation Area of Boundary Layer on Leading Edge |
| 116 | Elongated Low-Pressure Area of Boundary Layer on Trailing Edge |
| 120 | Slipstream Layer of Fluid Surrounding Boundary Layer |
| 125 | Region of Maximum Velocity on Slipstream Layer |

DETAILED DESCRIPTION OF THE INVENTION

An airfoil shape has a wide or thick rounded leading edge 11 followed by a narrower or sharp trailing edge 14. Airfoils 10 are used to produce 'lift force', which is typically used for flight or for other propulsion through the fluid 100 surrounding the airfoil 10. Lift force is created from a certain type of fluid flow along the surface of the airfoil shape. Lift force can be produced in gaseous or liquid fluid 100.

Detailed analysis of fluid flow around wings or airfoils 10 reveals that there are at least three distinct layers of fluid 100 that develop around a wing or airfoil 10 as fluid 100 is flowing along the surface of the wing or airfoil 10. These layers are the boundary layer 110, the slipstream layer 120, both bounded by the free fluid flow layer, where all of these layers comprise fluid 100. The boundary layer 110 is the layer of fluid 100 directly adjacent to the wing or airfoil 10. The boundary layer 110 has a relative velocity that is equivalent to that of the wing or airfoil 10. Thus, the boundary layer 110 is not moving relative to the wing or airfoil 10. The boundary layer 110 results from molecules of the fluid 100 literally clinging to the wing or airfoil 10 to cause the boundary layer 110 to develop on the wing or airfoil 10 as the wing or airfoil 10 moves relative to fluid 100.

The wing or airfoil 10 and the boundary layer 110 cause a disturbance in the fluid 100 as the wing or airfoil 10 and the boundary layer 110 move in unison through fluid 100. This disturbed fluid is the slipstream layer 120. The wing or airfoil 10 and the boundary layer 110 squeeze or otherwise act upon fluid 100 in the vicinity as they pass through fluid 100, which causes some fluid 100 to be pushed out of the way, sped up, or moved in some way. The pushed, sped up, or moved fluid makes up the slipstream layer 120 as depicted in the figures.

Detailed analysis of the slipstream layer 120 reveals that lift forces increase as the velocity of the slipstream layer 120 increases. Consequently, expansive efforts have occurred in the aerospace fields to design wings and airfoils 10 that yield maximum velocity slipstream layers 120 that have resulted in the classic wing or airfoil shape that produces a slipstream layer 120 with a region of maximum velocity 125 on one side of the classic wing or airfoil as depicted in FIG. 1.

With a classic wing or airfoil 10, the region of maximum velocity 125 on slipstream layer 120 is located adjacent and in close proximity to the thickest portion of the wing or airfoil 10. A wing or airfoil 10 with classic design has one region of maximum velocity 125 located on one side of the wing or airfoil 10. A wing design with this shape is known to produce maximum lift force for the aircraft.

This invention utilizes one or more wing or airfoil shapes to produce one or more high-velocity slipstream layers 120 of fluid 100 to rotate a turbine 30 or conduct other work. By strategically capitalizing on the fact that the region of maximum velocity 125 in slipstream layer 120 is located on an oblong area adjacent to the thickest portion of the wing or airfoil shape, this invention uses the thickest portion of the wing or airfoil to hold or house one or more turbines 30 in order to shield the turbines 30 from drag forces of the fluid 100 moving around the negative side of turbine 30 in order to maximize the efficiency of energy transfer from the slipstream layer 120 to the turbine 30.

The region of maximum velocity 125 of slipstream layer 120 runs along the full length of the wing or airfoil 10, parallel with the longitudinal axis of the wing or airfoil 10, and adjacent to the widest portion of the wing or airfoil 10 as depicted. The region of maximum velocity 125 is thus an oblong area running along the surface of the wing or airfoil 10.

Figure 2:
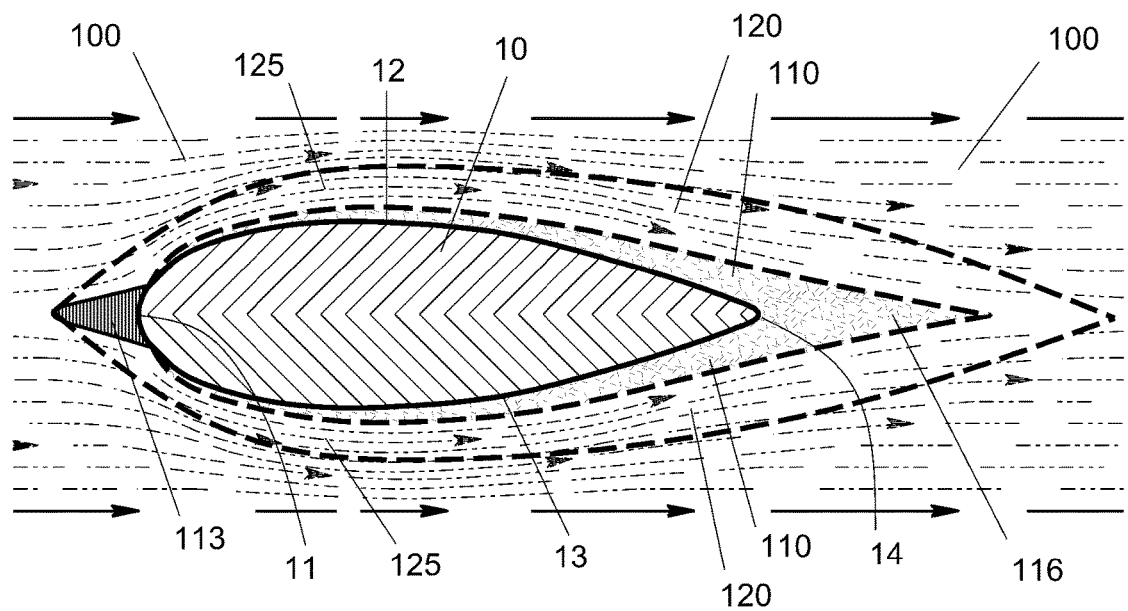
FIG. 2 is a lateral cross sectional view of a symmetric wing or airfoil surrounded by fluid with relative motion further depicting the boundary layer and the slipstream layer around the wing or airfoil.

The classic design of a wing or airfoil 10 may be further improved for the purpose of turbine rotation as depicted in FIG. 2. FIG. 2 depicts a symmetric wing or airfoil design that yields two regions of maximum velocity 125, one located on each side of the wing or airfoil 10. This design produces lift forces pulling on each side of the wing or airfoil 10, to yield a net effect of zero lift force acting on the wing or airfoil 10. This design would be useless in the aerospace fields because it produces zero lift while all the drag forces remain. However, in the turbine rotation fields, it is quite useful because it produces two regions of maximum velocity region 125, instead of one, thereby, doubling the energy potential of the wing or airfoil 10. The symmetry also improves the quality of slipstream layer 120 flow in the region surrounding wing or airfoil 10 particularly in the elongated low-pressure area of the boundary layer on the trailing edge 116.

Dimensional orientation may be confusing with several coordinate systems available; therefore, in order to simplify and align the terminology into a common frame of reference the following linkages are stipulated: the terms or words in the following list shall be understood by their defined meaning or usage, whereas; span, length and longitudinal are equivalent in meaning and axes, furthermore; cord and width are also equivalents, thus; thickness, camber and lateral being related quantities shall occupy the remaining axes.

Wing with slipstream turbine 5 is a windmill that converts energy from wind or other fluid 100 surrounding the windmill into rotational energy, where this rotation energy may be further transferred into electrical power energy through the use of a generator (not depicted). Wing with slipstream turbine 5 comprises: a wing or airfoil 10 with at least one partial cylindrical void 20 and at least one turbine 30 partially encapsulated within said at least one partial cylindrical void 20.

Wing or airfoil 10 is a fin, appendage, ledge, or other planar member with an airfoil shape. Wing or airfoil 10 is a rigid or semi-rigid: elongated planar member with rounded edges, elongated ellipsoid shaped planar member, elongated airfoil-shaped member, or wing-shaped member with a length, a width, and a thickness. Wing or airfoil 10 has a longer length than width and greater width than thickness. One long edge of wing or airfoil 10 is designated as the leading edge 11 and the opposite long edge of wing or airfoil 10 is designated as the trailing edge 14. Wing or airfoil 10 has a left surface 12 and a right surface 13 where each may include one or more airfoils to create one or more slipstream layers 120. Wing or airfoil 10 has an upper end 15 and a lower end 16. Upper and lower ends 15,16 of wing or airfoil 10 are each connected or attached to a mechanical housing 18. Each mechanical housing has a shape that reflects the cross-sectional shape of wing or airfoil 10 in the selected modes and unless described separately herein shall be considered as part of wing or airfoil 10. The mechanical housings 18 are primary structural components that contain axle bearing journals and other equipment (not shown), provide the rigid attachment of all wing or airfoil subcomponents and provides the method for modular or serial installation. Wing or airfoil 10 is immersed within a fluid 100 that is moving relative to the wing or airfoil 10. Fluid flow along the wing or airfoil 10 is such that, first, fluid 100 passes over leading edge 11, then fluid 100 passes over either the left surface 12 or right surface 13, and finally fluid 100 passes over the trailing edge 14.

Each partial cylindrical void 20 is a cylindrical-shaped void in the left surface 12 or the right surface 13 of wing or airfoil 10 where the 'complete' cylindrical shape of the void has not been carved, removed, or voided from the wing or airfoil 10 in order to leave a portion of the cylindrical shape standing above or protruding from left surface 12 and/or right surface 13 of wing or airfoil 10. The upper and lower ends of partial cylindrical void 20 are each attached to a mechanical housing 18. The protruding portion of the cylindrical void represents the portion of the turbine 30 nested therein that will protrude from the wing or airfoil 10, into the slipstream layer 120 of the surrounding fluid 100. Each partial cylindrical void 20 houses a turbine 30 that is also cylindrical shaped. The cylindrical shape of turbine 30 is sized slightly smaller than that of its paired partial cylindrical void 20 so that the turbine 30 may nest within partial cylindrical void 20 to form a slip-fit therein. Turbine 30 is nested within partial cylindrical void 20 so that a portion of the side of the cylindrical shape of the turbine 30 is standing above or protruding from the left surface 12 and/or right surface 13 of wing or airfoil 10 as depicted. One turbine 30 is pivotally attached to each partial cylindrical void 20 so that turbine 30 may freely rotate around axis-of-rotation 33 within partial cylindrical void 20 without contacting any portion of partial cylindrical void 20. Importantly, however, turbine 30 must rotate within partial cylindrical void 20 with the smallest reasonable gap between these members because this gap or gate separates the slipstream layer 120 from the turbine 30 by forcing a new boundary layer 110 to form at the proper location on the down stream side of turbine 30 and tangential to airfoil 10 thus shielding the negative side of turbine 30 and limiting the mass carried by turbine blades or travelers 38 as they travel through partial cylindrical void 20. Leakage of fluid 100 here is undesirable because it is leakage of the slipstream layer 120, which, in turn, reduces potential pressure differences, which, in turn, reduces energy transfer to the turbine 30, thereby reducing efficiency of turbine rotation. Pressure variations are related to density and in turn to mass.

Each turbine 26,28,30 is a turbine that rotates around an axis-of-rotation 33. Each turbine 26,28,30 comprises: an axle 32, a plurality of spoke members 34, a drum or runner 36, and a plurality of blades or travelers 38 or fibrous surface covering 39. Each turbine 26,28,30 is cylindrical shaped. Each turbine 30 is nested within a paired partial cylindrical void 20 which is also cylindrical shaped but sized slightly larger than turbine 30 in order to allow turbine 30 to be nested within partial cylindrical void 20 to form a slip fit therein. Axle 32 is a rigid solid cylindrical shaped member with a first and a second end. Axle 32 is an axle that rotates around axis-of-rotation 33. The longitudinal axis of axle 32 is coincident with axis-of-rotation 33. Axle 32 is pivotally attached to wing or airfoil 10 being composed of mechanical housing 18, at its first and second ends. Pivotal attachment is accomplished so that axle 32 may repeatedly rotate around and around with minimal friction forces acting to resist or repel this rotation. Pivotal attachment may be accomplished by any known means. Axle 32 primary mode is connected at first and/or second ends inside the mechanical housing 18 to an electrical power generation device (not depicted), or other device that receives work (not depicted) allowing smaller distributed components that, by adding in a modular way several wings with slipstream turbines 5, multiply the potential energy.

Alternately, axle 32 may extend beyond upper or lower ends 15,16 in order to expose first and/or second ends of axle 32 to provide an area with which to mechanically connect to an axle 32 of another turbine 30 from an adjacent wing with slipstream turbine 5 that is connected to the first turbine 30 in serial end-to-end fashion allowing many turbines to drive a single larger electrical power generation device (not depicted), or other device that receives work (not depicted), however torsion forces must be accommodated. A chain of many wings or airfoils 10 with slipstream turbines 30 can be made where very many wings with slipstream turbines 5 are connected, either in a modular or serial manner, thus creating a larger wing with slipstream turbine 5 increasing overall output.

A plurality of spoke members 34 is rigidly attached to axle 32. Each spoke member 34 is a rigid oblong-shaped member with a first and second end. Each spoke member 34 functions to rigidly attach drum or runner 36 to axle 32. The first end of each spoke member 34 is rigidly attached to the outer surface of axle 32 and the second end of each spoke member 34 is rigidly attached to the inner surface of drum or runner 36. Each spoke member 34 is positioned radially around axle 32 so that the longitudinal axis of each spoke member 34 is coincident with a line projecting radially outward from axis-of-rotation 33.

Drum or runner 36 is attached to axle 32 so that the longitudinal axis of drum or runner 36 is coincident with that of axle 32 where both are coincident with axis-of-rotation 33 so that these members rotate in unison around axis-of-rotation 33. Drum or runner 36 is a rigid hollow cylindrical member with open ends and an inner and outer surface. Drum or runner 36 rotates around axis-of-rotation 33. Drum or runner 36 must be sized so that its outer diameter is coincident with the outer surface of the boundary layer 110 of fluid 100. Thus, the size of drum or runner 36 is dependent upon the size and shape of the boundary layer 110 produced by wing or airfoil 10. The size and shape of the boundary layer 110 is dependent upon the size and shape of wing or airfoil 10 and the properties of fluid 100. For a wing or airfoil 10 of a certain shape, placed within a fluid 100 with certain properties, there is one size drum or runner 36 that yields an outer diameter that is coincident with the outer surface of the boundary layer 110 of fluid 100. This one design yields maximum efficiency because it positions each blade or traveler 38 exactly in the slipstream layer 120 as detailed below.

A plurality of blades or travelers 38 is rigidly attached to the outer surface of drum or runner 36. Each blade or traveler 38 is a rigid oblong fin, appendage, ledge, or similar member with an inner edge, an outer edge, upper end, and lower end. Each blade or traveler 38 may be planar, scooped, curved, or bucket shaped to catch fluid 100. Each blade or traveler 38 functions to interrupt the flow of fluid 100 in the slipstream layer 120 by placing mechanical resistance or pressure against this fluid flow. The rigid oblong fin, appendage, ledge, or other planar member acts to block the fluid 100 or catch the fluid 100 to yield energy transfer from the fluid 100, by way of the slipstream layer 120 to the fin, appendage, ledge, or similar member. Each blade or traveler 38 is attached in radial position with inner edge rigidly attached to the outer surface of drum or runner 36 with a plurality of blades or travelers 38 positioned radially around drum or runner 36 so that the lateral axis of each blade or traveler 38 is coincident with a line projecting radially outward from axis-of-rotation 33. The longitudinal axis of blade or traveler 38 shall be coincident with axis-of-rotation 33. A plurality of blades or travelers 38 indicates that the number of blades or travelers 38 is dependent on the fluid conditions. The number and width of blades or travelers 38 define a volume bounded by the drum or runner 36, the left and right blades or travelers 38 and an arc between the outer tips of blades or travelers 38, this volume is further referred to as a bucket. These buckets become blocks of mass at some pressure, as they travel through a cycle of turbine 30 they will pass many surfaces created by the partial cylindrical void 20 known as gates. As the bucket passes through a gate it transfers mass at some pressure to a chamber with a lower pressure thus removing some mass, this action is also assisted by centrifugal forces. Thus, the width of each blade or traveler 38 protrudes from the outer surface of drum or runner 36 in a radial direction. For turbine rotation efficiency purposes, each blade or traveler 38 should be positioned exactly perpendicular to the flow of fluid 100, in slipstream layer 120, at the regions of maximum velocity 125. Also for turbine rotation efficiency purposes, each blade or traveler 38 should be sized and placed exactly within slipstream layer 120, where the attached inner edge of each blade or traveler 38 exactly coincides with the inner surface of slipstream layer 120 and the opposite outer edge of each blade or traveler 38 coincides with the optimum energy zone of boundary layer 110. If blade or traveler 38 were wider than the optimum width, to extend beyond the slipstream layer 120, it would detract from efficiency because of the added additional weight and inertia of the wide blade extension without any benefit of additional mechanical energy transfer from fluid 100, 120. If blade or traveler 38 were narrower than the optimum width, it looses mechanical energy transfer from fluid 100,120 to also reduce efficiency. Thus, the size of each blade or traveler 38 is dependent upon the size and shape of boundary layer 110 and slipstream layer 120 produced by wing or airfoil 10 immersed within fluid 100. The optimum size and shape of boundary layer 110 and slipstream layer 120 is dependent upon the size and shape of wing or airfoil 10 and the properties of fluid 100. For a wing or airfoil 10 of a certain shape, placed within a fluid 100 with certain properties, there is one width of blade or traveler 38 that yields maximum turbine rotation efficiency. Each blade or traveler 38 is positioned within slipstream layer 120 by making the width of each blade or traveler 38 the optimum thickness of the slipstream layer 120; this optimum thickness also recommends placement and curvature of slipstream outrigger 50.

Optimizing the zone of contact between slipstream layer 120 and turbine 30 implies some energy is being allowed to escape; this is true however necessary in that some energy must remain to carry off the stalled air. By focusing this excess energy with the slipstream outrigger 50 we reduce overall down-wind turbulence in the elongated low-pressure area of boundary layer on trailing edge 116, bringing the system closer to a static or steady flow condition in the slipstream layer 120. Static or steady out-flow is desirable along the wing or airfoil 10 surface because it contains usable energy harvested by Venturi forces on the low pressure chamber 63 and the super low pressure chamber 78, it also indicates efficient energy conversion. Static or steady flow of fluid 100, in the immediate environment surrounding the wing with slipstream turbine 5 bounded by the optimum energy zone of slipstream layer 120, described earlier, and the free fluid flow, is desirable.

Wing with slipstream turbine 5 may further comprise at least one slipstream outrigger 50. Each slipstream outrigger 50 is a rigid or semi-rigid: elongated planar member with rounded edges, elongated ellipsoid shaped planar member, elongated airfoil-shaped member, or wing-shaped member with a length, a width, and a thickness. Slipstream outrigger 50 has a longer length than width and greater width than thickness. Slipstream outrigger 50 has a length that is similar to that of wing or airfoil 10, a width that is less than that of wing or airfoil 10, and a thickness that is less than that of wing or airfoil 10. Slipstream outrigger 50 is rigidly mounted to wing or airfoil 10 with longitudinal axis of slipstream outrigger 50 parallel to that of wing or airfoil 10. The longitudinal axis of slipstream outrigger 50 is essentially parallel with and adjacent to the region of maximum velocity 125 of slipstream layer 120 created by wing or airfoil 10. The attachment of slipstream outrigger 50 to wing or airfoil 10 in this way creates a slipstream inlet channel 53 and a slipstream outlet channel 56. Slipstream outrigger 50 functions to channel or direct the slipstream layer 120 into slipstream inlet channel 53, directly onto the turbine blades or travelers 38, to cause rotation thereof, and then to channel or direct the slipstream layer 120 out through slipstream outlet channel 56. Slipstream outrigger 50 causes more energy transfer to turbine 30 by channeling and containing the optimum slipstream layer 120 flow onto each blade or traveler 38 as each blade or traveler 38 rotates through the region of maximum velocity 125 in slipstream layer 120 than would be the case without slipstream outrigger 50.

Slipstream outrigger 50 also helps shape the slipstream by being the outermost surface to interact with fluid 100 flow by the external aerodynamic qualities that affect the total envelope or bow-wave thus defining the disturbed-wind-area. This interaction's greatest advantage is to help hold fluid flows 100, 110 and 120 into the most stable or static flow conditions. Slipstream outrigger 50 splits and shapes the slipstream layer 120 as it enters slipstream inlet channel 53 and contains the slipstream layer 120 in the channel created by turbine drum or runner 36 and the inner surface of slipstream outrigger 50 preventing losses due to centrifugal forces. Slipstream outrigger 50 channels the outflow of slipstream layer 120, from turbine 30 by way of slipstream outlet channel 56, along surface of wing or airfoil 10 in order to maintain a laminar, static or steady flow of fluid 100. This steady flow along wing or airfoil is further used to act by way of Venturi forces across low pressure chamber vent 66. This steady flow also continues past trailing edge 14 where it combines with fluid 100 from the opposite side of wing or airfoil 10 creating a low pressure region that acts on the super low pressure chamber 78 by way of center evacuation channel 76.

Wing with slipstream turbine 5 may further comprise at least one lateral outrigger 60. Each lateral outrigger 60 is a rigid or semi-rigid: elongated planar member with rounded edges, elongated ellipsoid shaped planar member, elongated airfoil-shaped member, or wing-shaped member with a length, a width, and a thickness. Lateral outrigger 60 has a longer length than width and greater width than thickness. Lateral outrigger 60 has a length that is similar to that of wing or airfoil 10, a width that is less than that of wing or airfoil 10, and a thickness that is less than that of wing or airfoil 10. Lateral outrigger 60 is rigidly mounted to wing or airfoil 10 with longitudinal axis of lateral outrigger 60 parallel to that of wing or airfoil. Lateral outrigger 60 has a leading edge that is positioned as close as possible, without contact therewith, to the exposed portion of turbine 30 as indicated. Leading edge has a slightly concave surface that mates with the convex exterior surface of turbine 30. This positioning and shape of lateral outrigger 60 creates a low pressure chamber 63. Low pressure chamber 63 is a partially enclosed volume defined by and bound by the lateral outrigger 60 on one side, the turbine 30 at the leading edge, and the wing or airfoil 10 on the other side. Low pressure chamber 63 is partially enclosed because there is an open slot at its trailing edge that is the low pressure chamber vent 66. Lateral outrigger 60 is positioned as close as possible to the exposed portion of turbine 30 without contacting it in order to yield the smallest possible gap or gate between these members for the same reasons as stated for the overall partial cylindrical void 20. Low pressure chamber vent 66 is acted upon by slipstream layer 120 through Venturi forces. Low pressure chamber vent 66 acts upon turbine 30 by being a lower pressure in low pressure chamber 63 then is found in the region of the slipstream outlet channel 56. Because of this principle, low pressure chamber 63 functions to, in a since, suck or pull the turbine rearwards thereby adding more rotational energy to turbine 30 while also allowing stalled fluid to reduce pressure and exit low pressure chamber 63 by way of low pressure chamber vent 66.

Fluid analysis of the boundary layer 110 around a wing or airfoil 10 reveals that there is an elongated low-pressure area on trailing edge 116 of the boundary layer 110 at the trailing edge 14 of a wing or airfoil 10. Elongated low-pressure area on trailing edge 116 is the region of the boundary layer 110 with the lowest pressure or the minimum pressure region of fluid 100 surrounding the wing or airfoil 10. This invention takes advantage of the elongated low-pressure area on trailing edge 116 created by a wing or airfoil 10 in order to create a super low pressure chamber 78 that ironically increases the efficiency of energy transfer from slipstream layer 120 to turbine 30. The super low pressure chamber 78 is formed by voiding some material from the center of the wing or airfoil 10 to form a channel identified as the center evacuation channel 76, in effect creating three subcomponents of the wing or airfoil 10. This configuration is depicted in FIGS. 27-47.

Wing or airfoil 10 may further comprise: a leading subcomponent 70, a left subcomponent 72, and a right subcomponent 74. Leading subcomponent 70, left subcomponent 72, and right subcomponent 74 are each a rigid or semi-rigid: elongated planar member with rounded edges, elongated ellipsoid shaped planar member, elongated airfoil-shaped member, or wing-shaped member. Leading subcomponent 70, left subcomponent 72, and right subcomponent 74 are each shaped and positioned as indicated in FIGS. 27-47. Leading subcomponent 70, left subcomponent 72, and right subcomponent 74 are each shaped and positioned to form an overall symmetric airfoil shape from the three subcomponents 70, 72 and 74. This overall symmetric airfoil shape has a leading edge 11, a trailing edge 14, a left surface 12, a right surface 13, an upper end 15, and a lower end 16. The leading subcomponent 70 is located at the leading edge 11 of the overall symmetric airfoil shape. The left subcomponent 72 is located at the left surface 12 of the overall symmetric airfoil shape. The right subcomponent 74 is located at the right surface 13 of the overall symmetric airfoil shape. The leading edge 11 is located on leading subcomponent 70. The left surface 12 is located on left subcomponent 72. The right surface 13 is located on right subcomponent 74. Leading subcomponent 70, left subcomponent 72, and right subcomponent 74 each have a leading edge, a trailing edge, a left surface, a right surface, an upper end, and a lower end, where each spatially corresponds respectively with the leading edge 11, trailing edge 14, left surface 12, right surface 13, upper end 15, and lower end 16 of the overall airfoil shape. The upper ends of leading subcomponent 70, left subcomponent 72, and right subcomponent 74 are each attached to a mechanical housing 18. The lower ends of leading subcomponent 70, left subcomponent 72, and right subcomponent 74 are each attached to a mechanical housing 18.

The leading edge of left subcomponent 72 has a negative partial cylindrical shape running longitudinally along the entire leading edge that is sized to make a slip-fit with the exterior cylindrical shape of left turbine 26 where this negative partial cylindrical shape forms part of left partial cylindrical void 22 as depicted. The leading edge of right subcomponent 74 has a negative partial cylindrical shape running longitudinally along the entire leading edge that is sized to make a slip-fit with the exterior cylindrical shape of right turbine 28 where this negative partial cylindrical shape forms part of right partial cylindrical void 24 as depicted. The right surface of left subcomponent 72 and the left surface of right subcomponent 74 are each flat planar surfaces. Left subcomponent 72 and right subcomponent 74 are each shaped and positioned so that there is an open slot or channel 76 running between left subcomponent 72 and right subcomponent 74 from the leading edges of left subcomponent 72 and right subcomponent 74 to the trailing edges of left subcomponent 72 and right subcomponent 74 where this open slot or channel 76 is defined as the center evacuation channel 76. Center evacuation channel 76 runs along the center of the overall symmetric airfoil shape. Center evacuation channel 76 is spatially defined by left subcomponent 72, trailing edge 14, right subcomponent 74, and super low pressure chamber 78.

Leading subcomponent 70 has a rounded leading edge and a blunt trailing edge. Blunt trailing edge includes a left negative partial cylindrical shape and a right negative partial cylindrical shape. Left negative partial cylindrical shape is a partial cylindrical void running longitudinally along the left side of the entire trailing edge that is sized to make a slip-fit with the exterior cylindrical shape of left turbine 26 where this negative partial cylindrical shape forms part of left partial cylindrical void 22 as depicted. Left turbine 26 is nested within left partial cylindrical void 22, which is also cylindrical shaped but sized slightly larger than left turbine 26 in order to allow left turbine 26 to be nested within left partial cylindrical void 22 to form a slip fit therein. Left partial cylindrical void 22 comprises left negative partial cylindrical shape on leading subcomponent 70 and negative partial cylindrical shape on left subcomponent 72 as depicted. Right negative partial cylindrical shape is a partial cylindrical void running longitudinally along the right side of the entire leading edge that is sized to make a slip-fit with the exterior cylindrical shape of right turbine 28 where this negative partial cylindrical shape forms part of right partial cylindrical void 24 as depicted. Right turbine 28 is nested within right partial cylindrical void 24, which is also cylindrical shaped but sized slightly larger than right turbine 28 in order to allow right turbine 28 to be nested within right partial cylindrical void 24 to form a slip fit therein. Right partial cylindrical void 24 comprises right negative partial cylindrical shape on leading subcomponent 70 and negative partial cylindrical shape on right subcomponent 74 as depicted. A semi-closed chamber 78 is located just behind the blunt trailing end of leading subcomponent 70 in between left turbine 26 and right turbine 28 that is defined as the super low pressure chamber 78. Super low pressure chamber 78 is located in the center of the center of the overall symmetric airfoil shape, just in front of center evacuation channel 76 as depicted. Super low pressure chamber 78 is spatially defined by the blunt trailing edge of leading subcomponent 70, left turbine 26, center evacuation channel 76, and right turbine 28. As discussed below, the overall purpose of this design is to add efficiency to the energy transfer process from fluid 100 to left and right turbines 26,28.

In this configuration, wing with slipstream turbine 5 comprises: a wing or airfoil 10 that comprises a leading subcomponent 70, a left subcomponent 72, and a right subcomponent 74; a left partial cylindrical void 22 located within left subcomponent 72; a right partial cylindrical void 24 located within right subcomponent 74; a left turbine 26 partially encapsulated within left partial cylindrical void 22; and a right turbine 28 partially encapsulated within right partial cylindrical void 24. This configuration is depicted in FIGS. 27-47. This configuration yields a full host of gates, channels or passages of which there are six (6) interfaces between wing or airfoil 10 subcomponents 70,72,74 and turbines 26,28. These gates or passages serve to isolate the various pressure zones and chambers from each other and allow positive structured flows to be created around left and right turbines 26,28 from what would naturally be considered negative drag forces.

The overall symmetric airfoil shape formed by leading subcomponent 70, left subcomponent 72, and right subcomponent 74 creates an elongated low-pressure area on trailing edge 116 as described above. This low-pressure area 116 sucks or pulls fluid 100 from the center evacuation channel 76 and from the super low pressure chamber 78 in order to create a surrounding fluid 100 pressure gradient such that there exists a lower pressure in the super low pressure chamber 78 than exists in the low pressure chamber 63, which is a lower pressure than exists at trailing edge 116. This pressure gradient adds efficiency to the turbine rotation process. The low pressure created in super low pressure chamber 78 causes additional pushing rotation of left and right turbines 26,28 thereby adding additional rotation energy to turbines 26,28 that would not be added otherwise. The pressure in super low pressure chamber 78 is much lower than the fluid pressure on the left surface 12 or right surface 13 of the overall symmetric airfoil shape thereby adding more rotational force on left and right turbines 26,28 to cause additional rotation thereof. This pressure gradient cause a fluid flow from the left surface 12 of the overall symmetric airfoil shape along the leading edge of left subcomponent 72 into super low pressure chamber 78 as well as a fluid flow from the right surface 13 of the overall symmetric airfoil shape along the leading edge of right subcomponent 74 into super low pressure chamber 78. This pressure differential between fluid 100 on each side of a gate causes additional fluid flow from high to low pressure areas thereby allowing more energy transfer from the fluid 100 to turbines 26,28.

Figure 15:
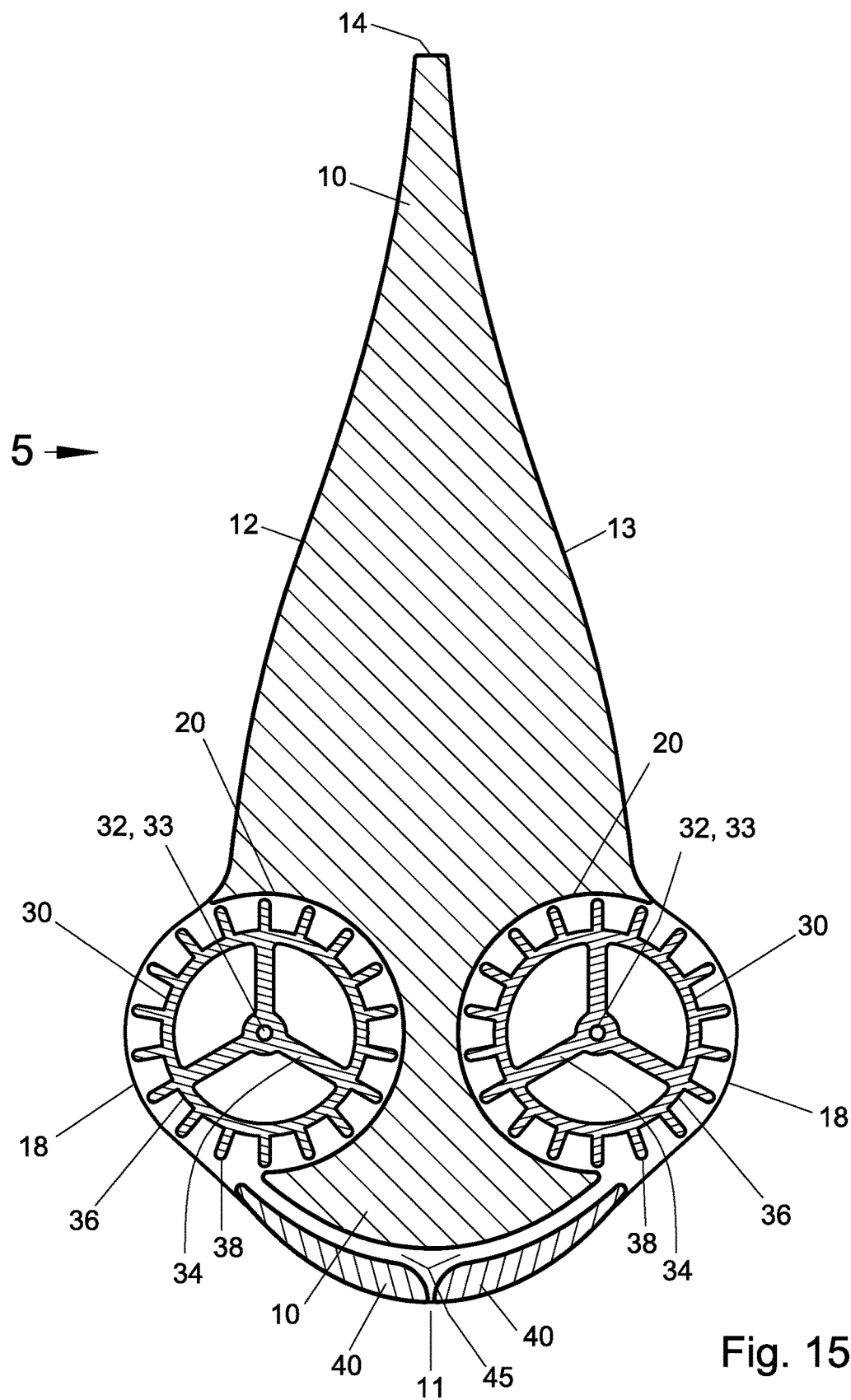
FIG. 15 is a lateral cross sectional view of a mode of wing with slipstream turbine with a turbine on the left surface, a turbine on the right surface, and two leading outriggers.
Figure 16:
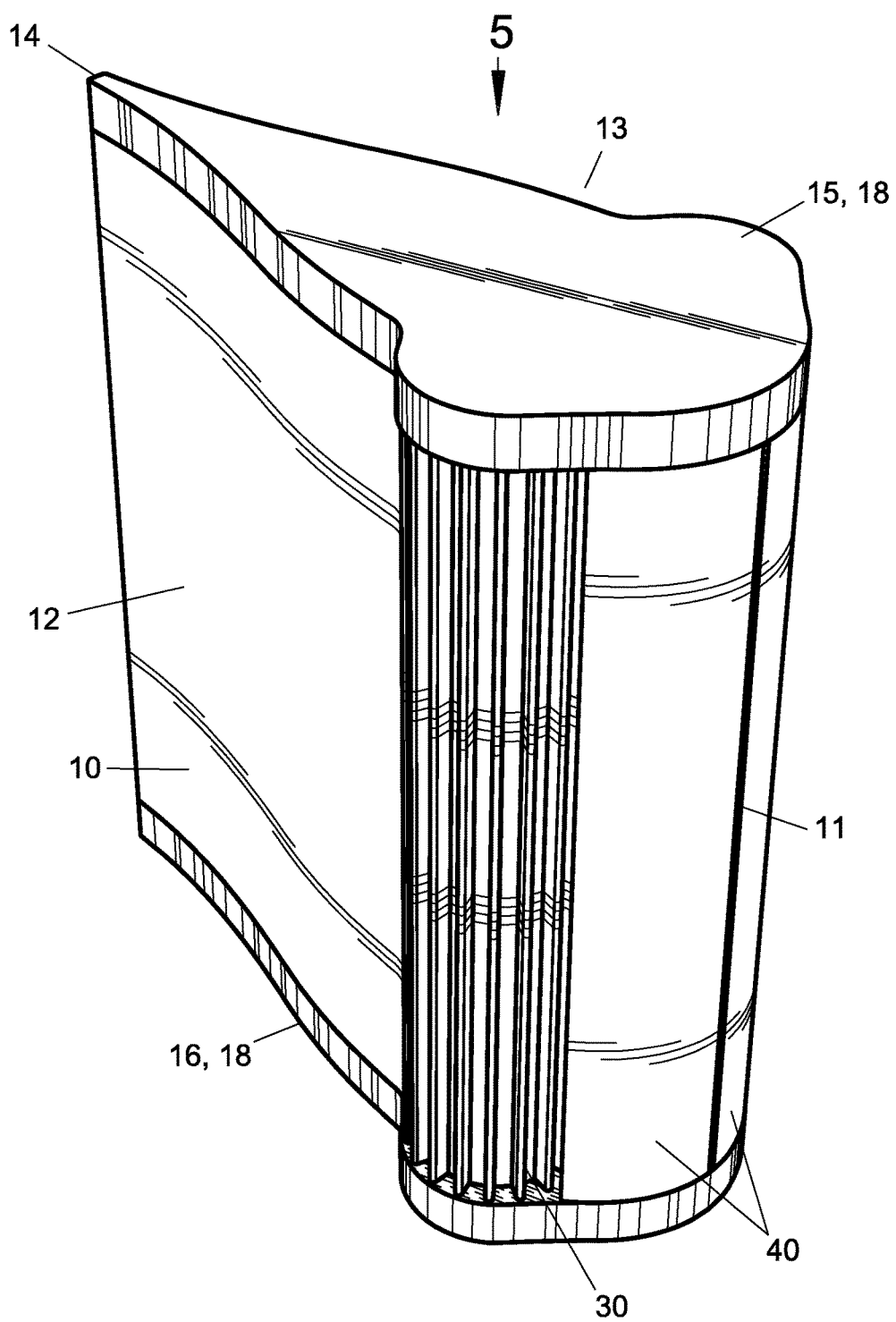
FIG. 16 is a perspective view of FIG. 15.

Wing with slipstream turbine 5 may further comprise two leading outriggers 40. The leading outriggers 40 are formed by voiding some material from wing or airfoil 10 or leading wing or airfoil subcomponent 70, forming a gap along the leading edge 11 and from the area identified as the high pressure chamber 45, in effect creating three subcomponents identified in total as wing or airfoil 10. Each leading outrigger 40 is a fin, appendage, ledge, or other member with an airfoil-like shape. Leading outrigger 40 is a rigid or semi-rigid: elongated planar member with rounded edges, elongated ellipsoid shaped planar member, elongated airfoil-shaped member, or wing-shaped member with a length, a width, and a thickness. Leading outrigger 40 has a longer length than width and greater width than thickness. Leading outrigger 40 has a length that is similar to that of wing or airfoil 10, a width that is about one-half the thickness of wing or airfoil 10, and a thickness that is much less than that of wing or airfoil 10 as depicted. Leading outrigger 40 is rigidly mounted to wing or airfoil 10 with longitudinal axis of leading outrigger 40 parallel to that of wing or airfoil 10. The leading outriggers 40 are positioned to create an open slot or seam between these members running longitudinally along the center of the leading edge 11 as depicted in FIGS. 15-16. Thus, there is a semi-closed area high pressure chamber 45 between the leading outriggers 40 and leading wing or airfoil subcomponent 70 or of wing or airfoil 10 as depicted. Fluid analysis of the boundary layer 110 around a wing or airfoil 10 reveals that there is a stagnation area 113 of the boundary layer 110 at the leading edge 11 of a wing or airfoil 10. Stagnation area 113 is the region of the boundary layer 110 with the highest pressure or the maximum pressure region of fluid 100 surrounding the wing or airfoil 10. Fluid analysis of the boundary layer 110 also reveals that increased pressure in the stagnation area 113 reduces pressure and velocity in the slipstream layer 120, which, in turn, detracts from energy transfer from the fluid 100 to the turbine 30. Therefore, stagnation area 113 is detrimental to efficiency. This invention eliminates or greatly reduces the stagnation area 113 in order to improve efficiency and does so as follows.

The fluid 100 approaching a symmetric wing or airfoil 10 must go left or right, the very central flow tube looses kinetic energy by impinging on the leading edge 11 before it can enter a left or right flow tube, because it is channeled by the adjacent flow tubes. The stagnation area 113 is also associated with negative turbulent vortices entering the flow tubes that become the slipstream interfering with static or steady flow dynamics. The leading outriggers 40 eliminate the stagnation area by allowing a separate path for the central flow tube through the gap created by leading outriggers 40 into high pressure chamber 45 where it may now go left or right without the constricting adjacent flow tubes interfering. This also allows the adjacent flow tubes to proceed along the natural path without interference from the stagnation flow tube. The high pressure chamber 45 translates a high pressure fluid 100 from leading edge 11, through the slot of leading outriggers 40, to the turbine 30 thus imparting a portion of the once wasted kinetic energy.

This translation is the beginning if a turbine cycle; bucket 'a' is positioned such that its leading blade or traveler 38 is within the gate created by the leading wing or airfoil subcomponent 70, the bucket contains some mass at the greatly reduced pressure of super low pressure chamber 78. First bucket 'a' rotates in to alignment with the outlet of high pressure chamber 45 whereupon bucket 'a' receives mass at the stagnation pressure once wasted in the stagnation area 113 of boundary layer on leading edge. Bucket 'a' now rotates into the slipstream inlet channel 53 and into slipstream layer 120 where the blades or travelers are acted upon by the impulse energy of slipstream layer 120 while mass transfer is minimized. Bucket 'a' is carried through the channel between drum or runner 36 and slipstream outrigger 50 that ends at the slipstream outlet channel 56 whereupon the slipstream layer 120 and turbine 30 separate. Bucket 'a' is aligned with gate formed by lateral outrigger 60 and contains some mass at the pressure of slipstream outlet channel 56. Bucket 'a' passes into low pressure chamber 63 that is at the pressure found at low pressure chamber vent 66, provided by Venturi forces, whereupon the fluid 100 expands and is forced out of bucket 'a' into low pressure chamber 63 reducing the mass. Bucket 'a' then becomes aligned with gate formed by left or right wing or airfoil subcomponent 72 or 74 containing a reduced mass at the pressure of low pressure chamber 63. Bucket 'a' enters super low pressure chamber 78 that is at the pressure found at trailing edge 14, provided by the elongated low pressure area of boundary layer on trailing edge 116, whereupon the fluid 100 expands and is forced out of bucket 'a' into super low pressure chamber 78 reducing the mass. Thus bucket 'a' enters the first gate whereupon it repeats the cycle; this describes only the mass transfer cycle of the slipstream turbine 30 leaving many energy equations to balance. The primary forces being: the kinetic impulse of the slipstream/jet 120 on traveler 38, the pressure differential of the gates and the aerodynamic drag used to evacuate stalled fluid 100.

The overall dynamics of this invention are relatively simple when addressed from the proper discipline; however the minute interactions of each component make the selection of the correct discipline at that point difficult to rectify. Place a wing or airfoil 10 in a moving fluid 100 and it will experience a transfer of energy. This energy could be harvested by placing turbines 30 where the fluid 100 flow is greatest that also happens to be adjacent to a volume of said wing or airfoil 10 that could house a shielded turbine 30. Detailed studies of the flow dynamics revealed key areas of dynamic forces that were not always helpful while also presenting remarkable solutions that brought aerodynamic and hydrodynamic forces into harmony. A single particle of fluid may travel several pathways through or around wing with slipstream turbine 5 however each pathway is now a positive value to overall efficiency.

Figure 3:
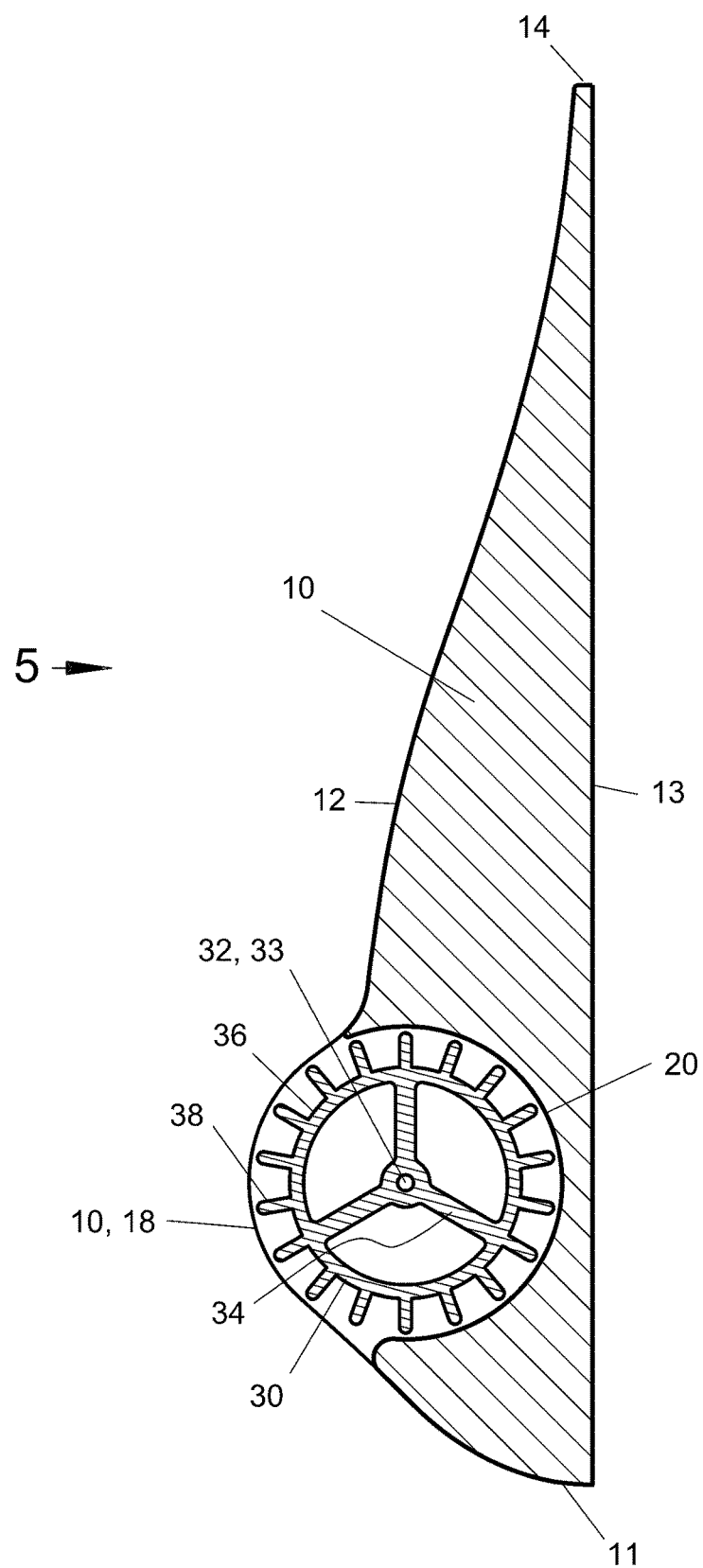
FIG. 3 is a lateral cross sectional view of the basic mode of wing with slipstream turbine.
Figure 4:
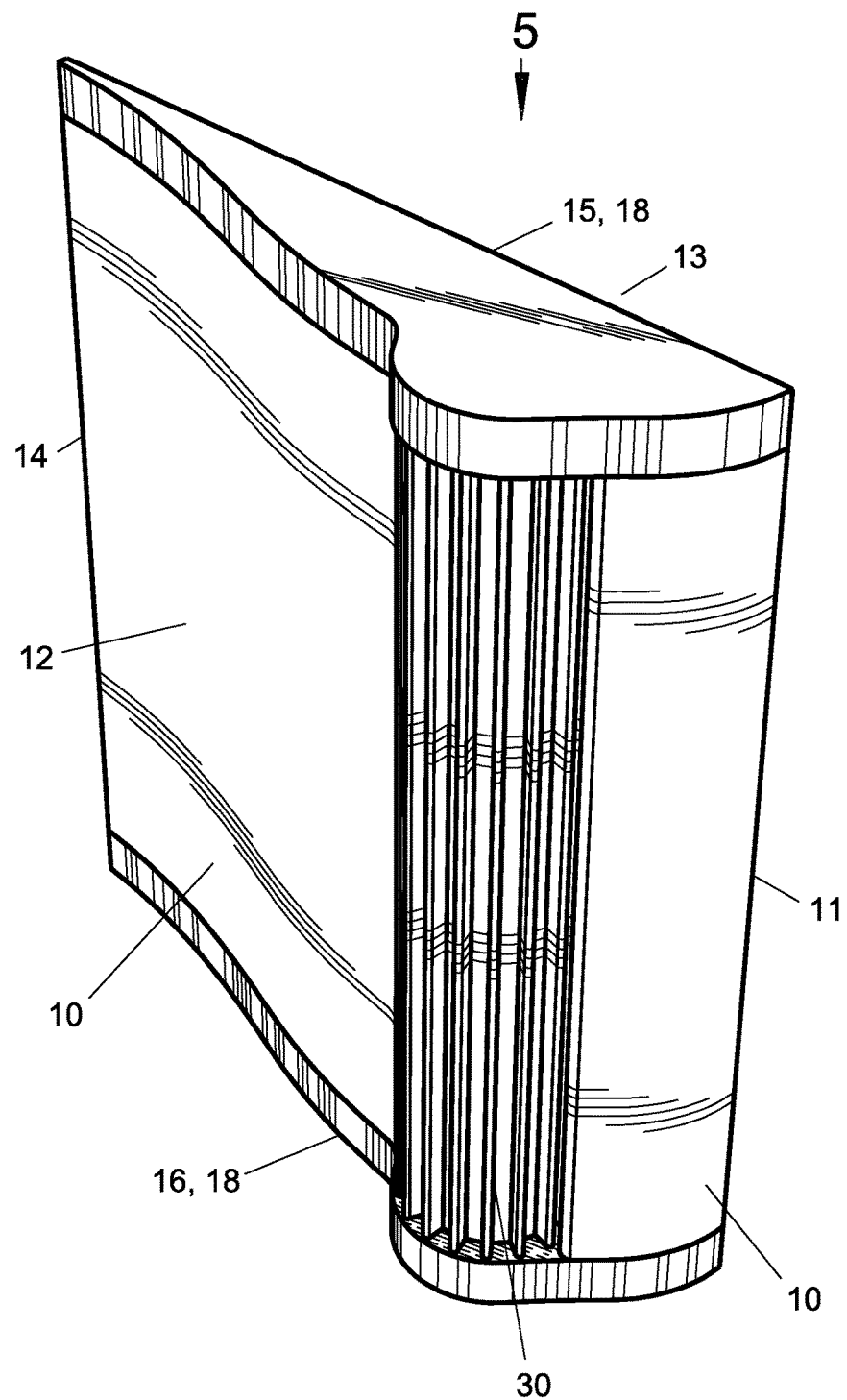
FIG. 4 is a perspective view of FIG. 3.

FIGS. 3-4 depict the basic mode of wing with slipstream turbine 5 comprising: a wing or airfoil 10 with one partial cylindrical void 20 and one turbine 30 partially encapsulated within said one partial cylindrical void 20. In this mode, wing or airfoil 10 has a classic airfoil shape that produces one region of maximum velocity of slipstream layer 120 that is an oblong area running longitudinally along the left surface 12 of the wing or airfoil 10. Parallel and adjacent to the region of maximum velocity 125 is one partial cylindrical void 20 that houses and partially encapsulates one turbine 30.

Figure 5:
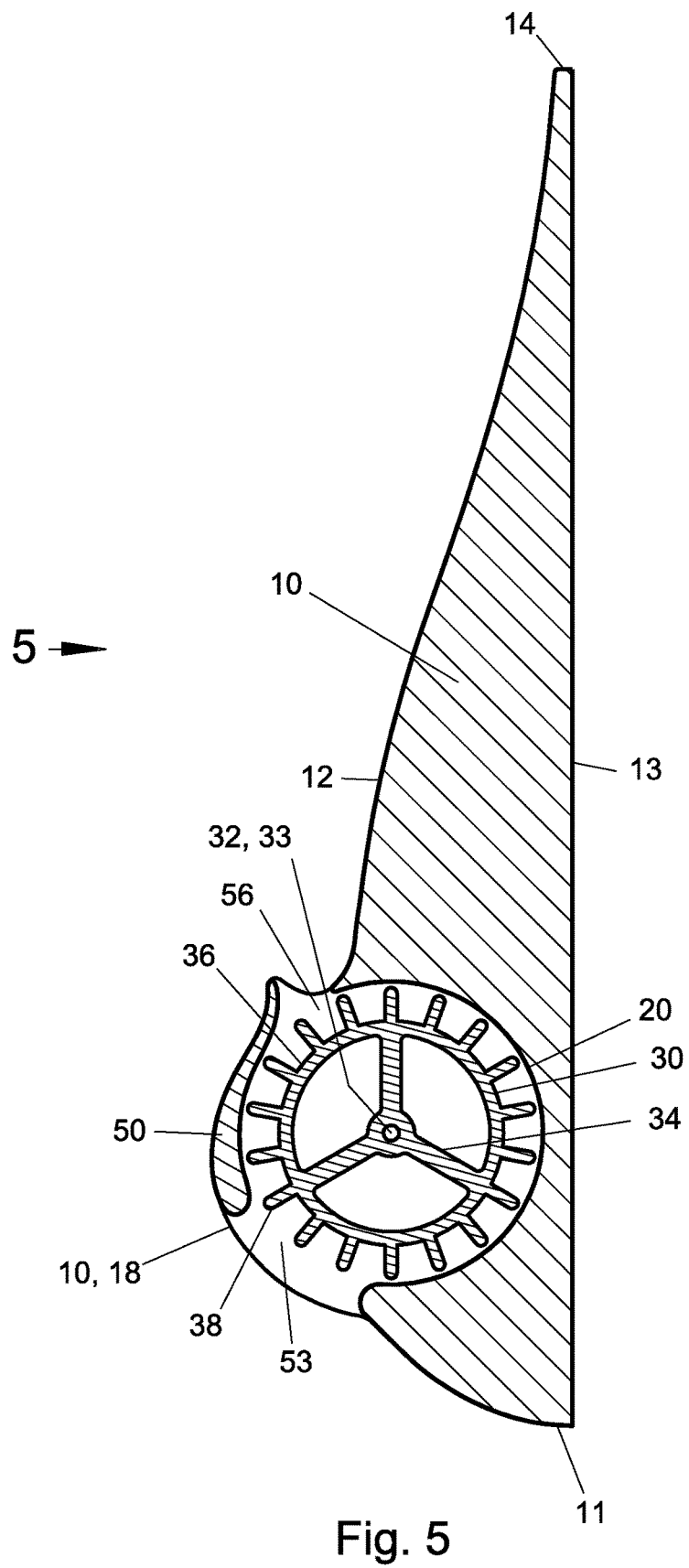
FIG. 5 is a lateral cross sectional view of a mode of wing with slipstream turbine with one slipstream outrigger.
Figure 6:
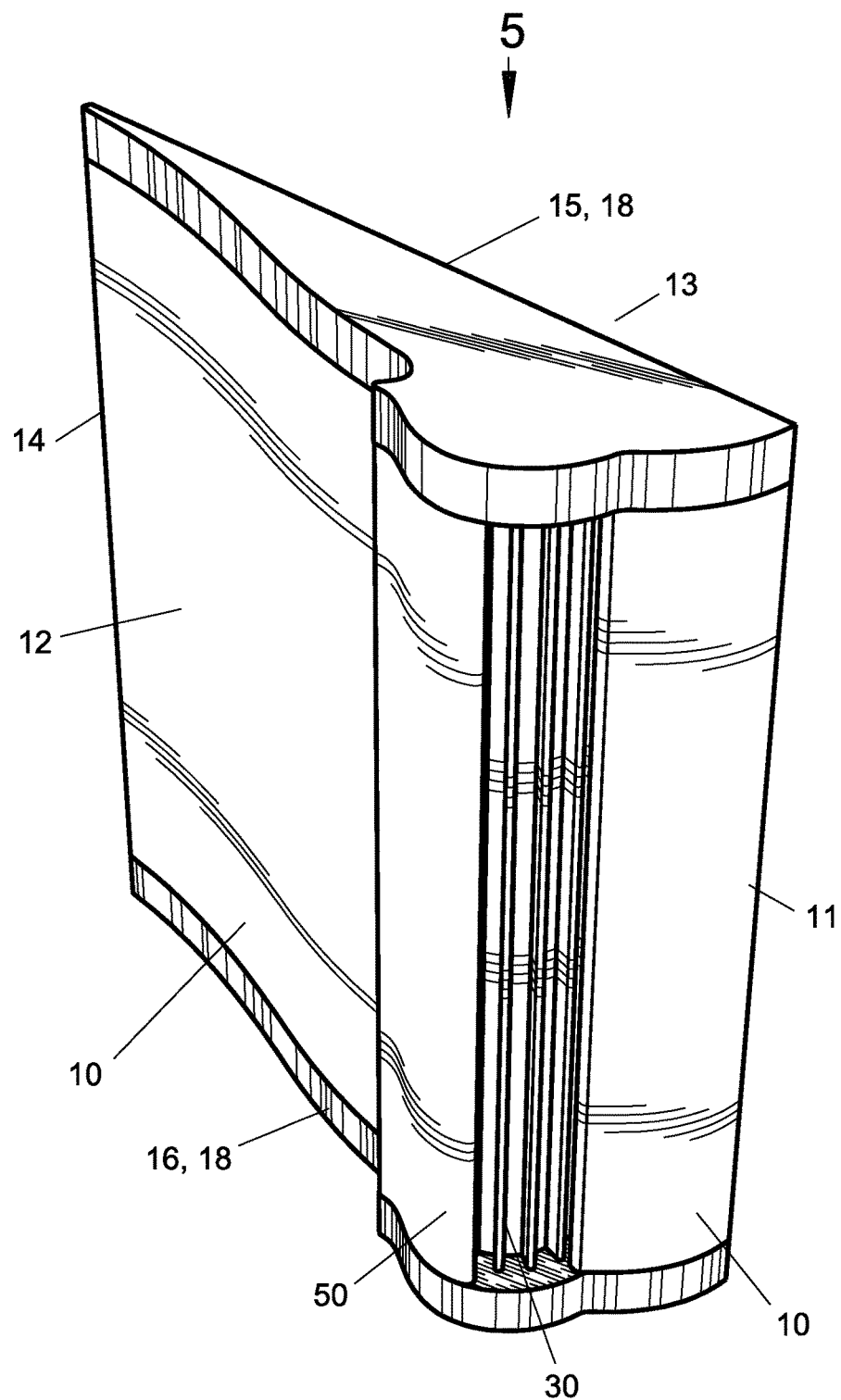
FIG. 6 is a perspective view of FIG. 5.

FIGS. 5-6 depict a mode of wing with slipstream turbine 5 comprising: a wing or airfoil 10 with one partial cylindrical void 20, one turbine 30 partially encapsulated within said one partial cylindrical void 20, and one slipstream outrigger 50. This mode functions to add additional rotation energy to turbine 30 as described above where the additional rotation energy would not be added without slipstream outrigger 50.

Figure 7:
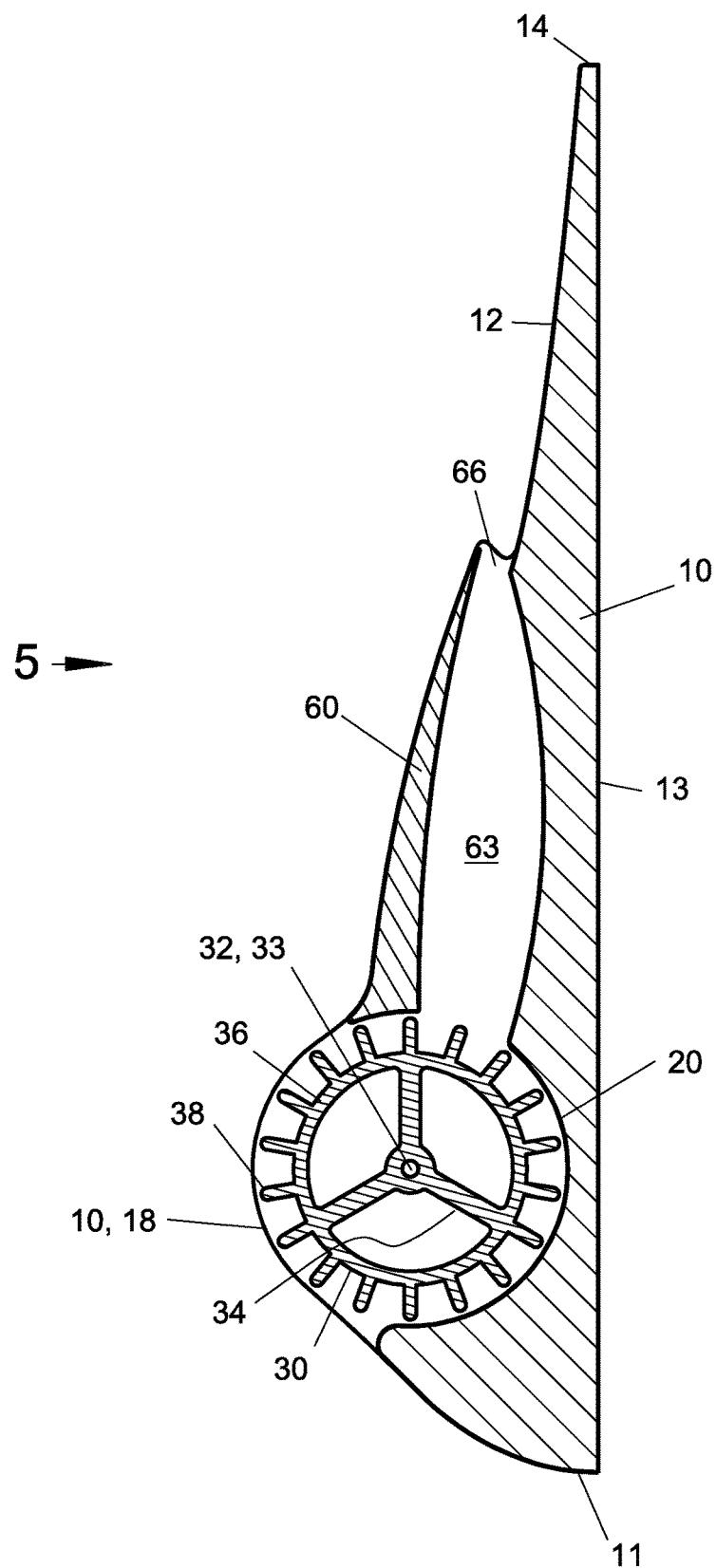
FIG. 7 is a lateral cross sectional view of a mode of wing with slipstream turbine with one lateral outrigger.
Figure 8:
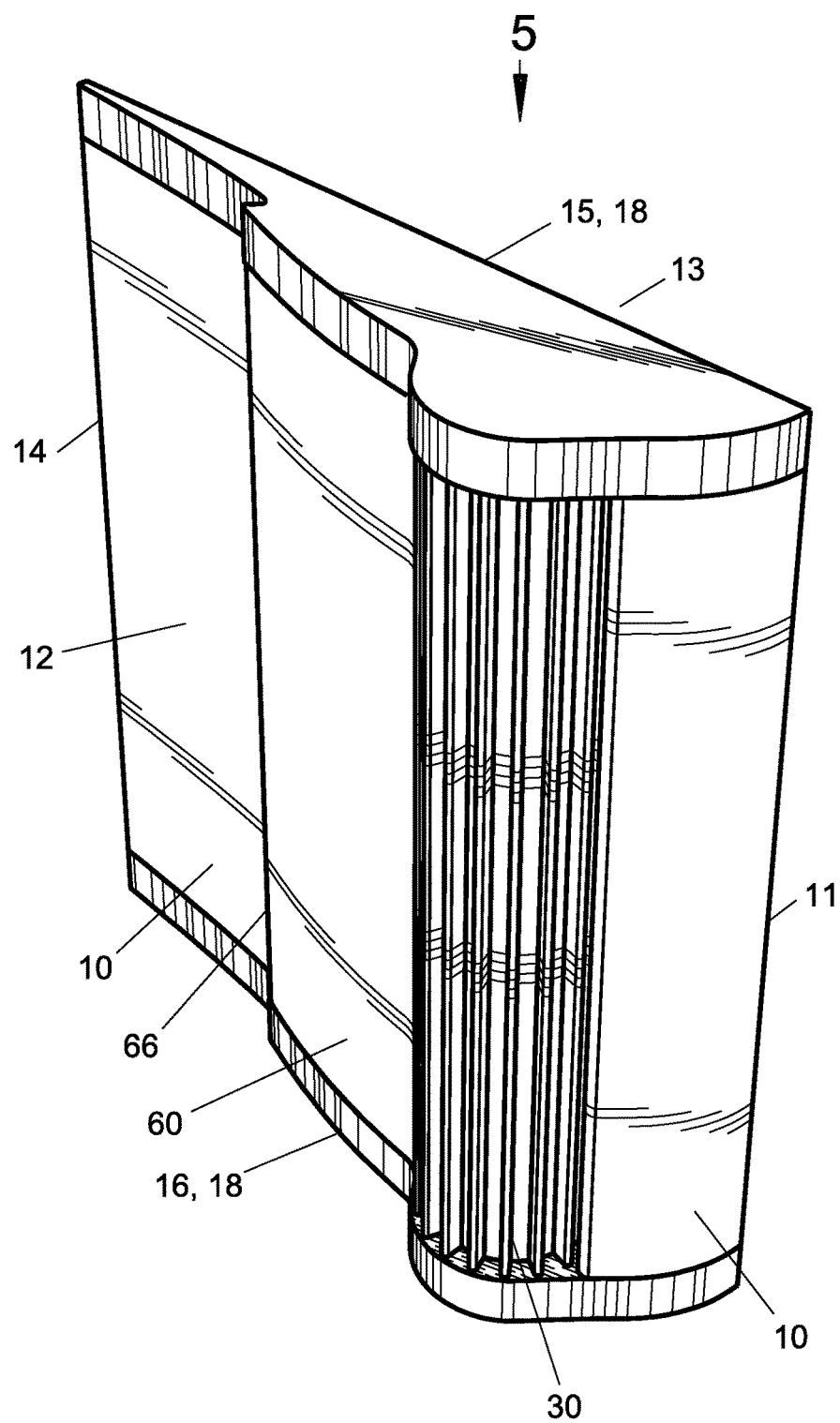
FIG. 8 is a perspective view of FIG. 7.

FIGS. 7-8 depict a mode of wing with slipstream turbine 5 comprising: a wing or airfoil 10 with one partial cylindrical void 20, one turbine 30 partially encapsulated within said one partial cylindrical void 20, and one lateral outrigger 60. This mode functions to add additional rotation energy to turbine 30 as described above where the additional rotation energy would not be added without lateral outrigger 60.

Figure 9:
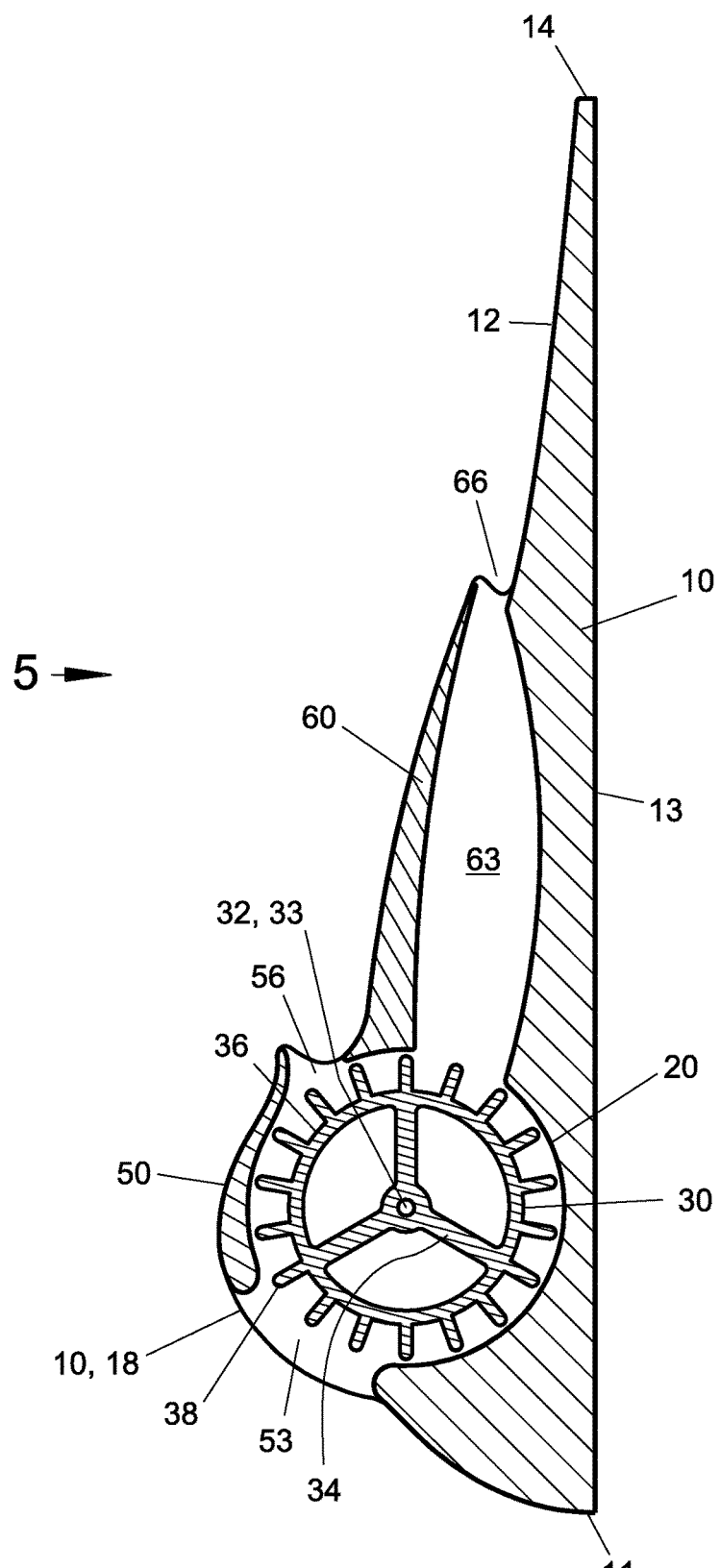
FIG. 9 is a lateral cross sectional view of a mode of wing with slipstream turbine with one slipstream outrigger and one lateral outrigger.
Figure 10:
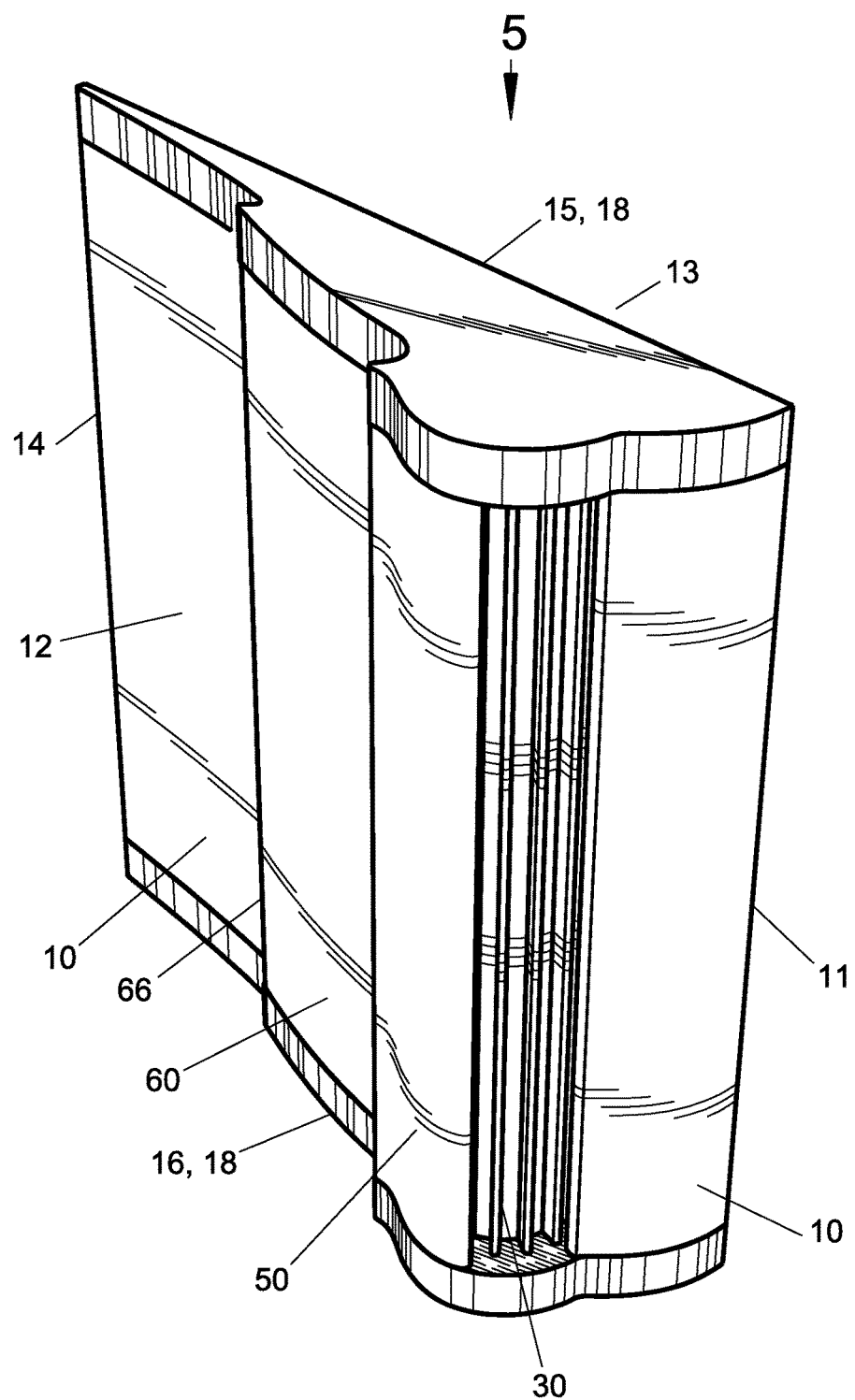
FIG. 10 is a perspective view of FIG. 9.

FIGS. 9-10 depict a mode of wing with slipstream turbine 5 comprising: a wing or airfoil 10 with one partial cylindrical void 20, one turbine 30 partially encapsulated within said one partial cylindrical void 20, one slipstream outrigger 50, and one lateral outrigger 60. This mode functions to add additional rotation energy to turbine 30 as described above where the additional rotation energy would not be added without slipstream outrigger 50 or lateral outrigger 60.

Figure 11:
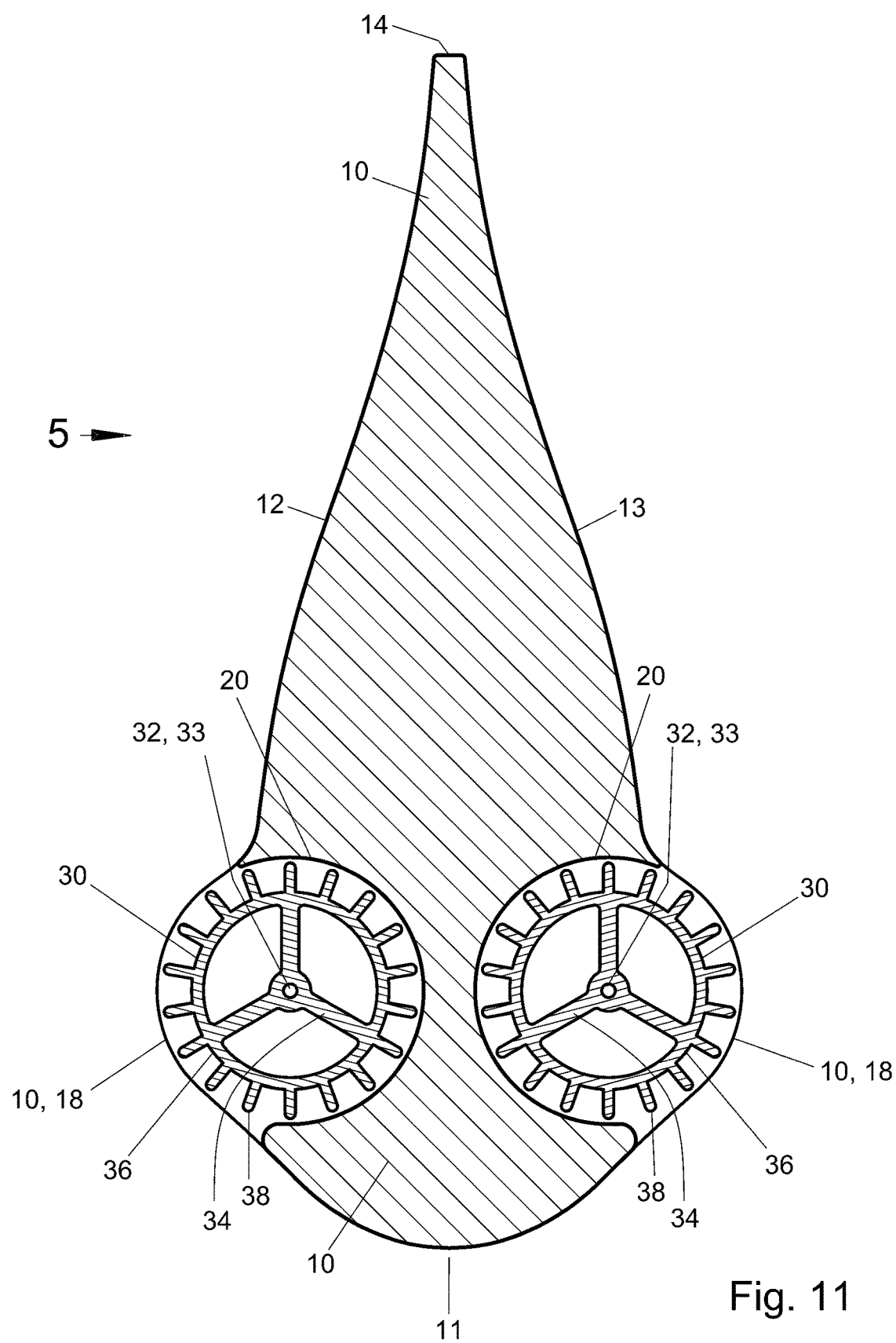
FIG. 11 is a lateral cross sectional view of a mode of wing with slipstream turbine with a turbine on the left surface and a turbine on the right surface.
Figure 12:
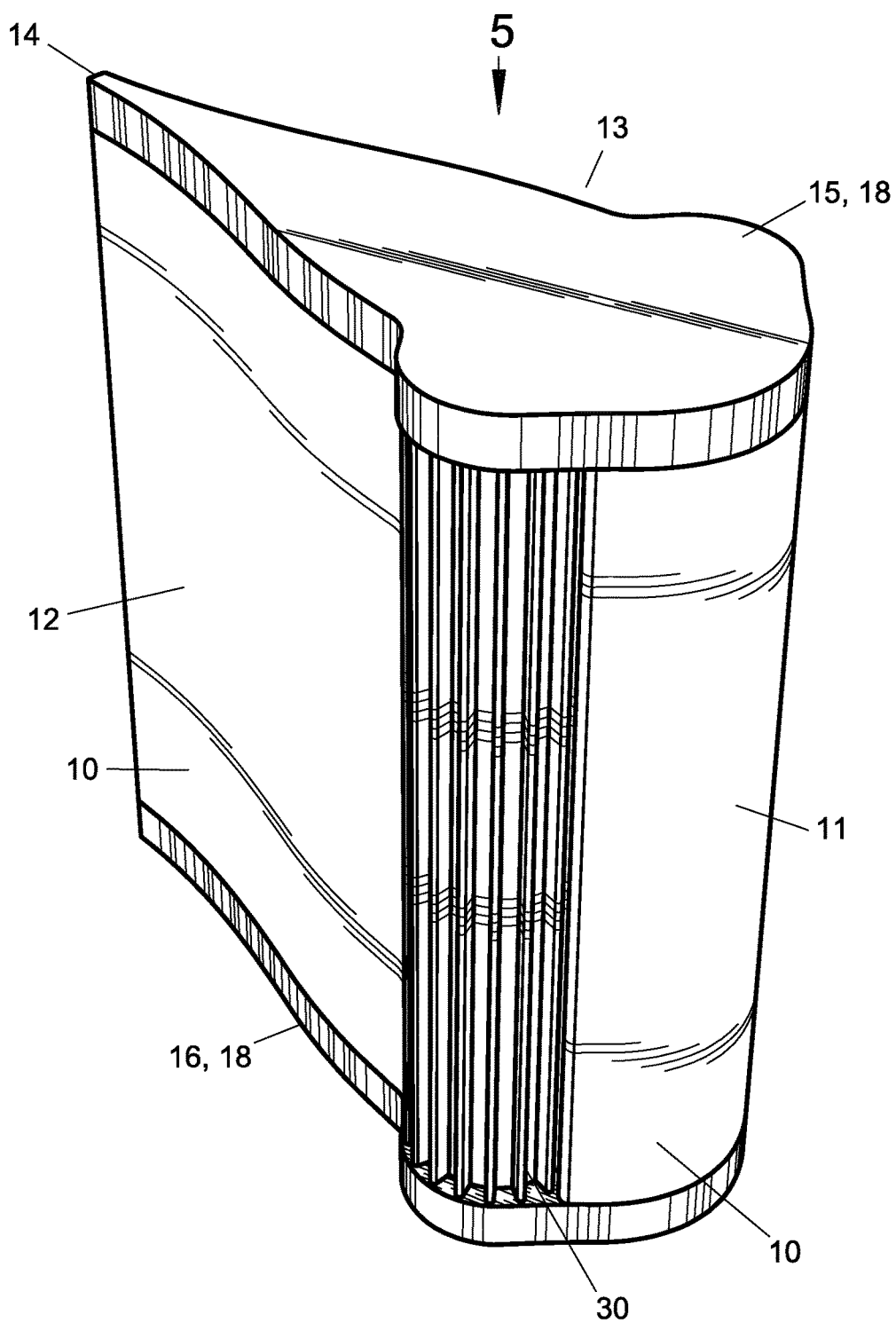
FIG. 12 is a perspective view of FIG. 11.

FIGS. 11-12 depict a mode of wing with slipstream turbine 5 comprising: a wing or airfoil 10 with two partial cylindrical voids 20 and two turbines 30, wherein one turbine 30 is partially encapsulated within each partial cylindrical void 20. In this mode and all modes to follow, wing or airfoil 10 is a symmetric wing or airfoil design that creates a region of maximum velocity 125 on both the left surface 12 and right surface 13 of wing or airfoil 10. As stated above, symmetric wings or airfoils are more efficient because they have two regions of maximum velocity 125 to allow for the use of two turbines 30 thereby doubling the potential energy.

Figure 13:
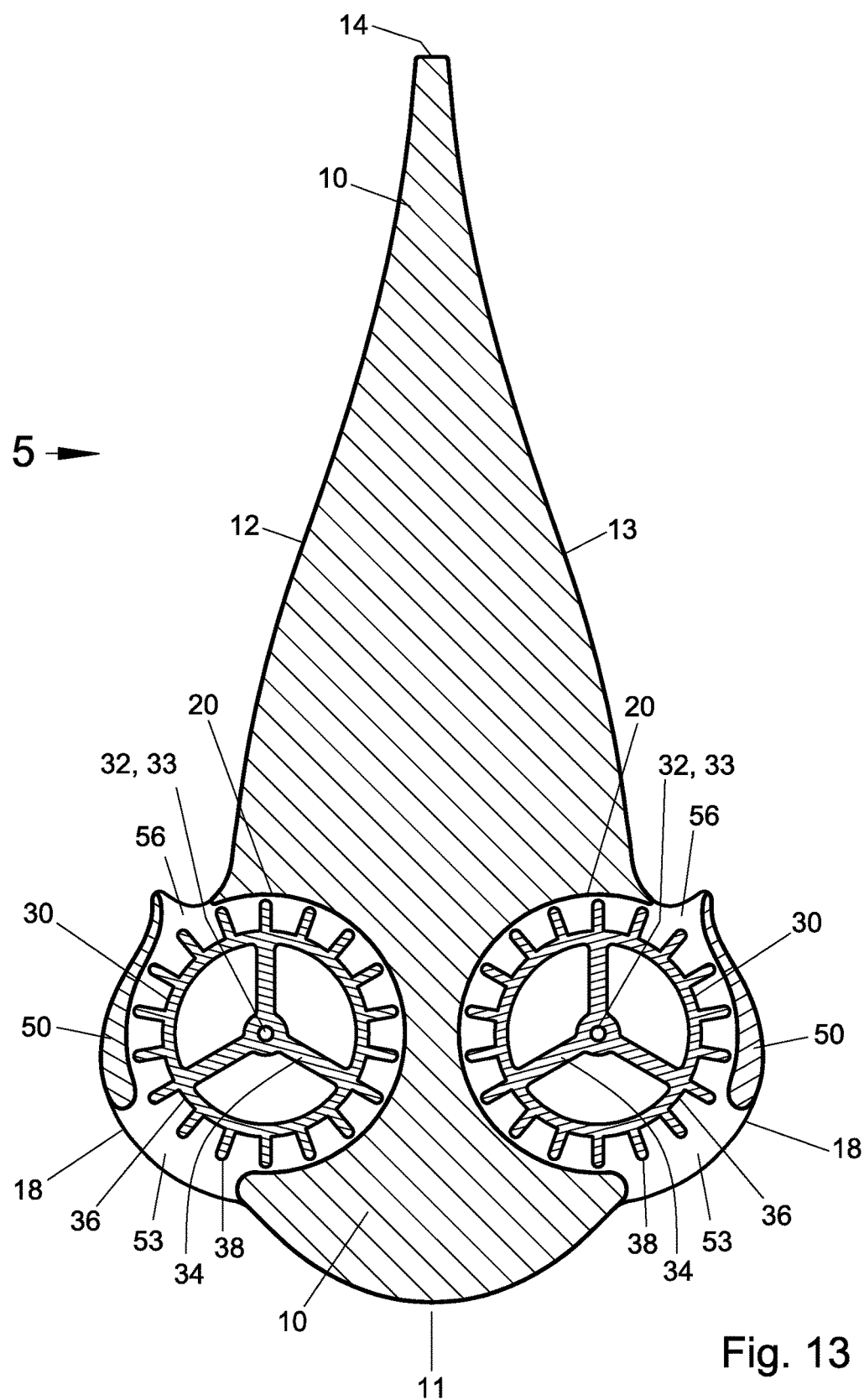
FIG. 13 is a lateral cross sectional view of a mode of wing with slipstream turbine with a turbine on the left surface, a turbine on the right surface, and two slipstream outriggers.
Figure 14:
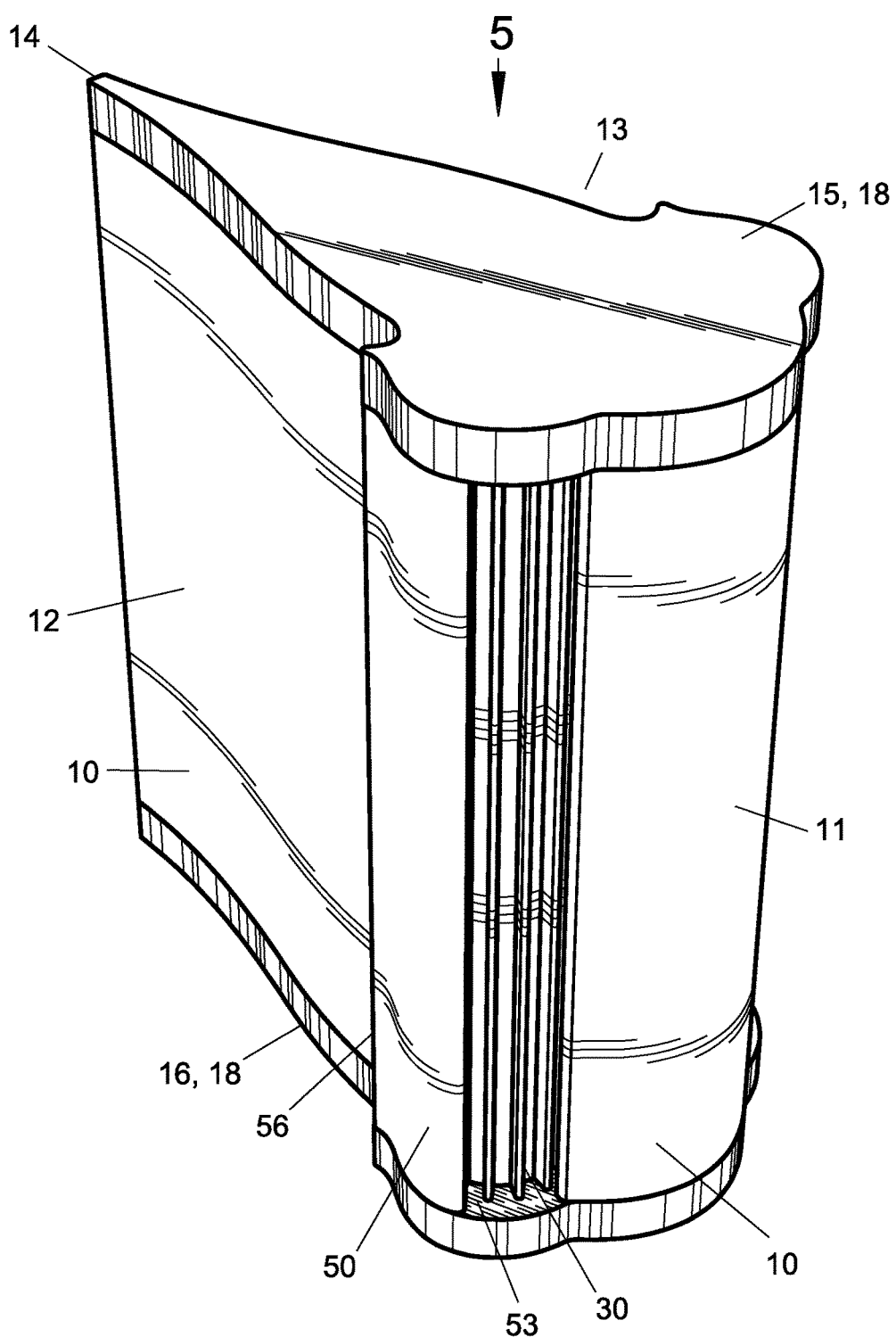
FIG. 14 is a perspective view of FIG. 13.

FIGS. 13-14 depict a mode of wing with slipstream turbine 5 comprising: a wing or airfoil 10 with two partial cylindrical voids 20, two turbines 30, and two lateral outriggers 60. This mode functions to add additional rotation energy to turbine 30 as described above.

FIGS. 15-16 depict a mode of wing with slipstream turbine 5 comprising: a wing or airfoil 10 with two partial cylindrical voids 20, two turbines 30, and two leading outriggers 40. This mode functions to add additional rotation energy to turbine 30 as described above.

Figure 17:
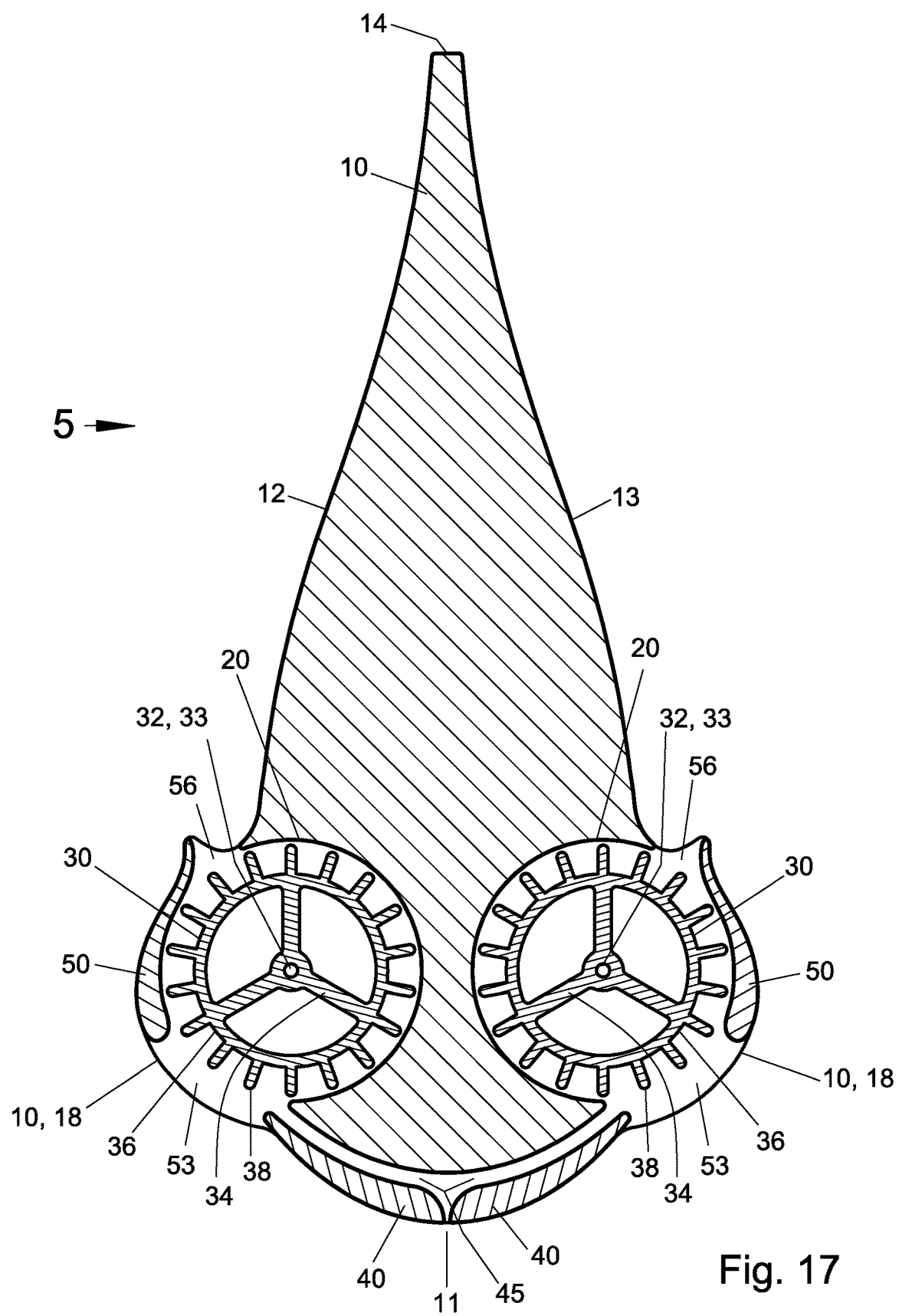
FIG. 17 is a lateral cross sectional view of a mode of wing with slipstream turbine with a turbine on the left surface, a turbine on the right surface, two leading outriggers, and two slipstream outriggers.
Figure 18:
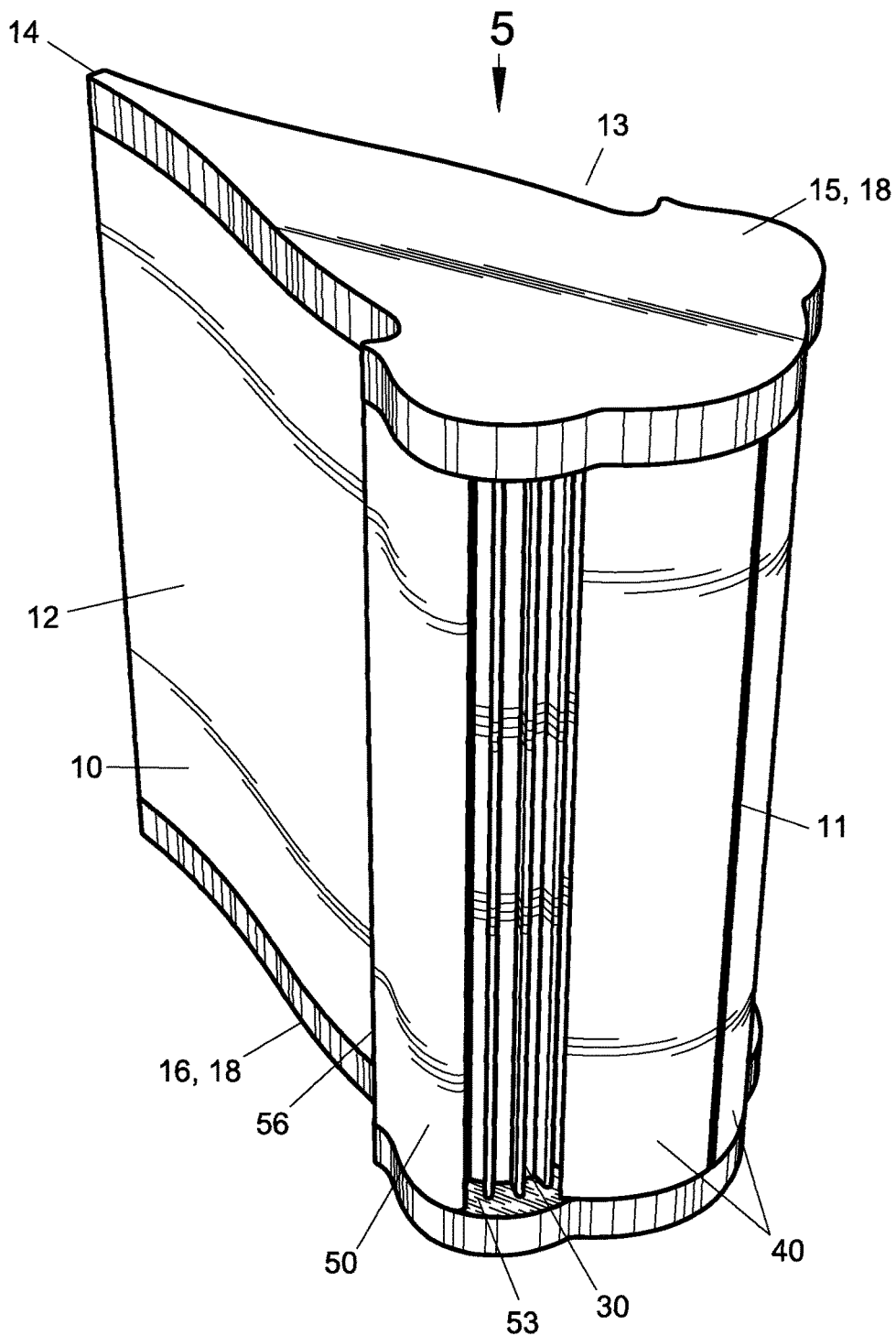
FIG. 18 is a perspective view of FIG. 17.

FIGS. 17-18 depict a mode of wing with slipstream turbine 5 comprising: a wing or airfoil 10 with two partial cylindrical voids 20, two turbines 30, two leading outriggers 40, and two slipstream outriggers 50. This mode functions to add additional rotation energy to turbine 30 as described above.

Figure 19:
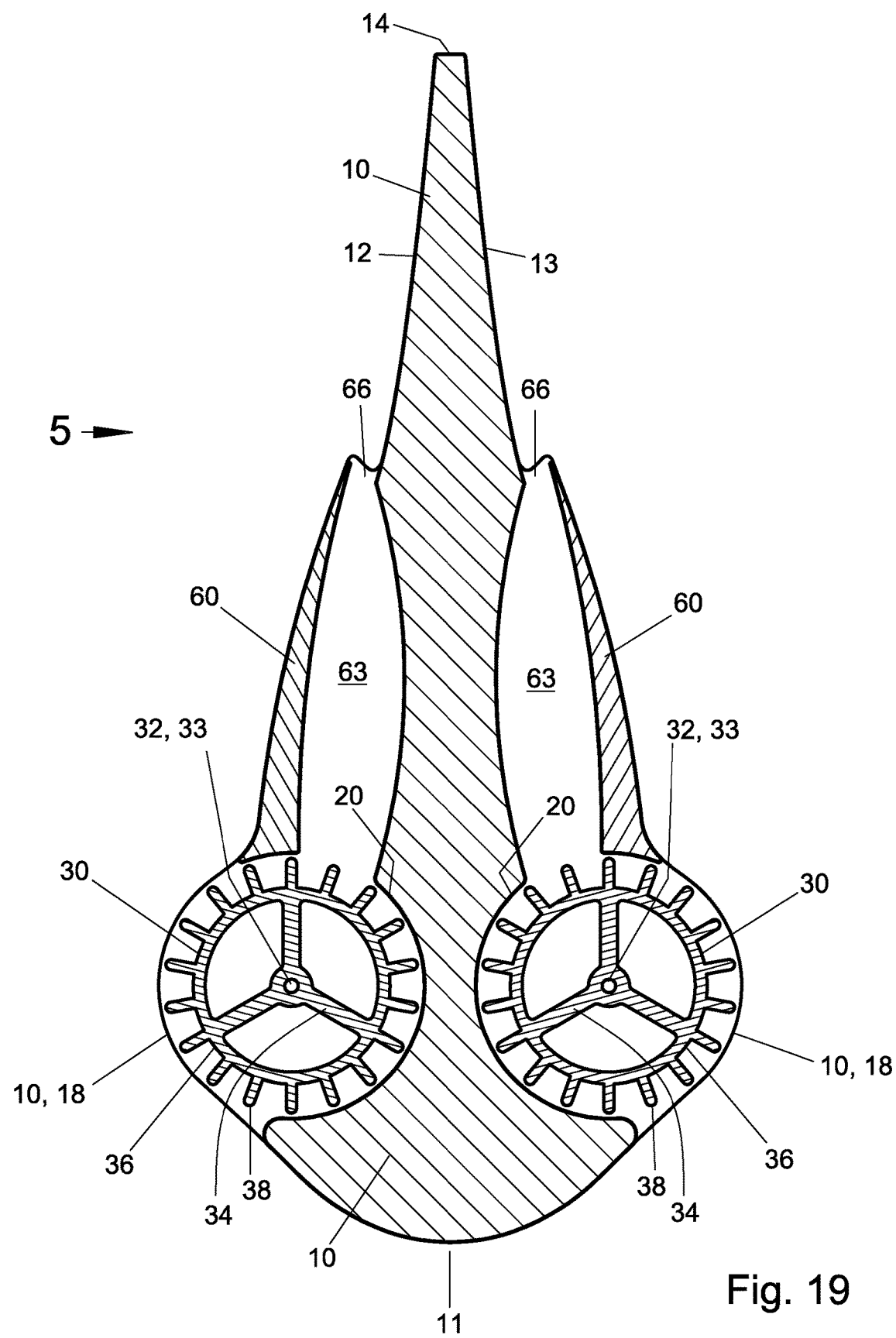
FIG. 19 is a lateral cross sectional view of a mode of wing with slipstream turbine with a turbine on the left surface, a turbine on the right surface, and two lateral outriggers.
Figure 20:
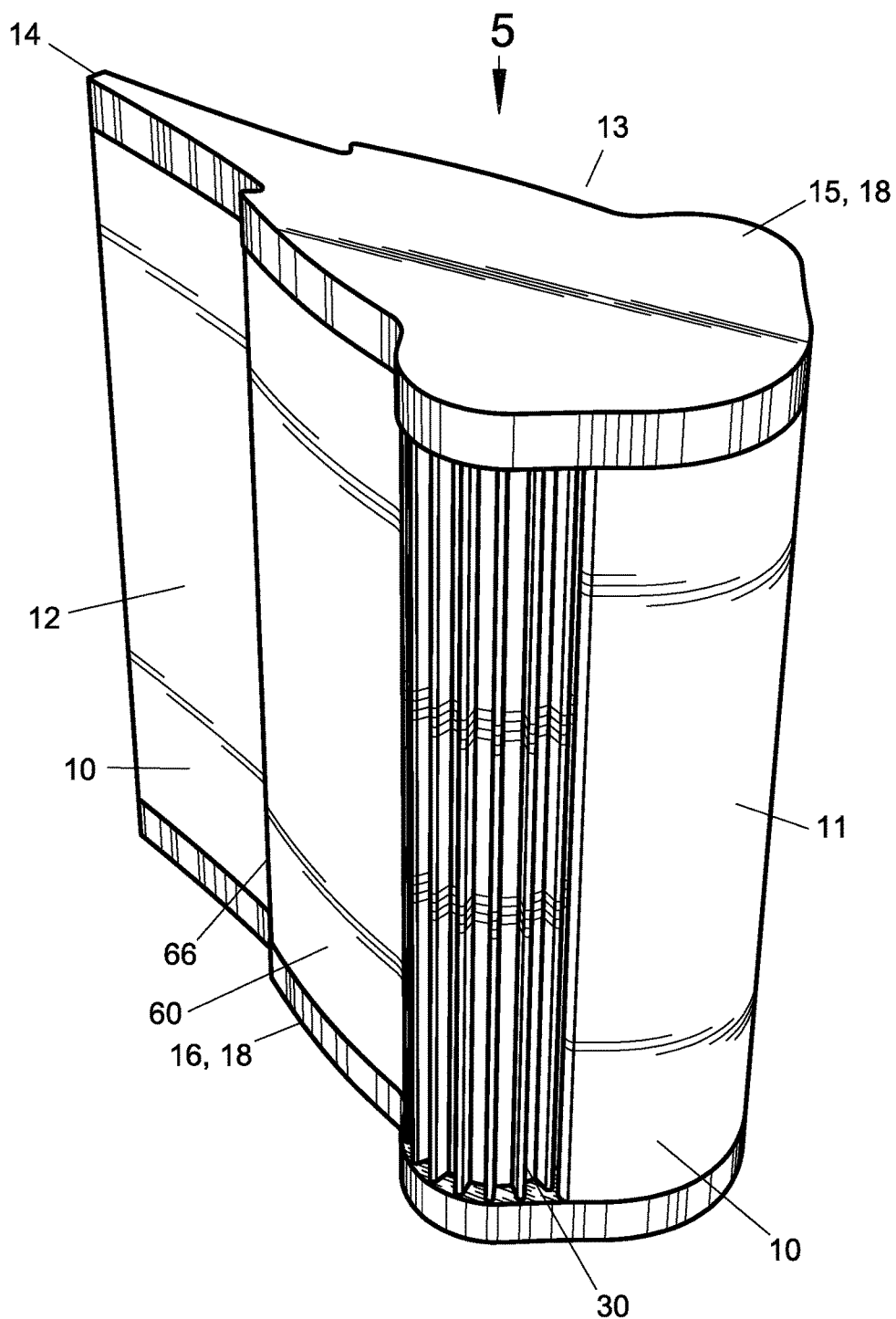
FIG. 20 is a perspective view of FIG. 19.

FIGS. 19-20 depict a mode of wing with slipstream turbine 5 comprising: a wing or airfoil 10 with two partial cylindrical voids 20, two turbines 30, and two lateral outriggers 60. This mode functions to add additional rotation energy to turbine 30 as described above.

Figure 21:
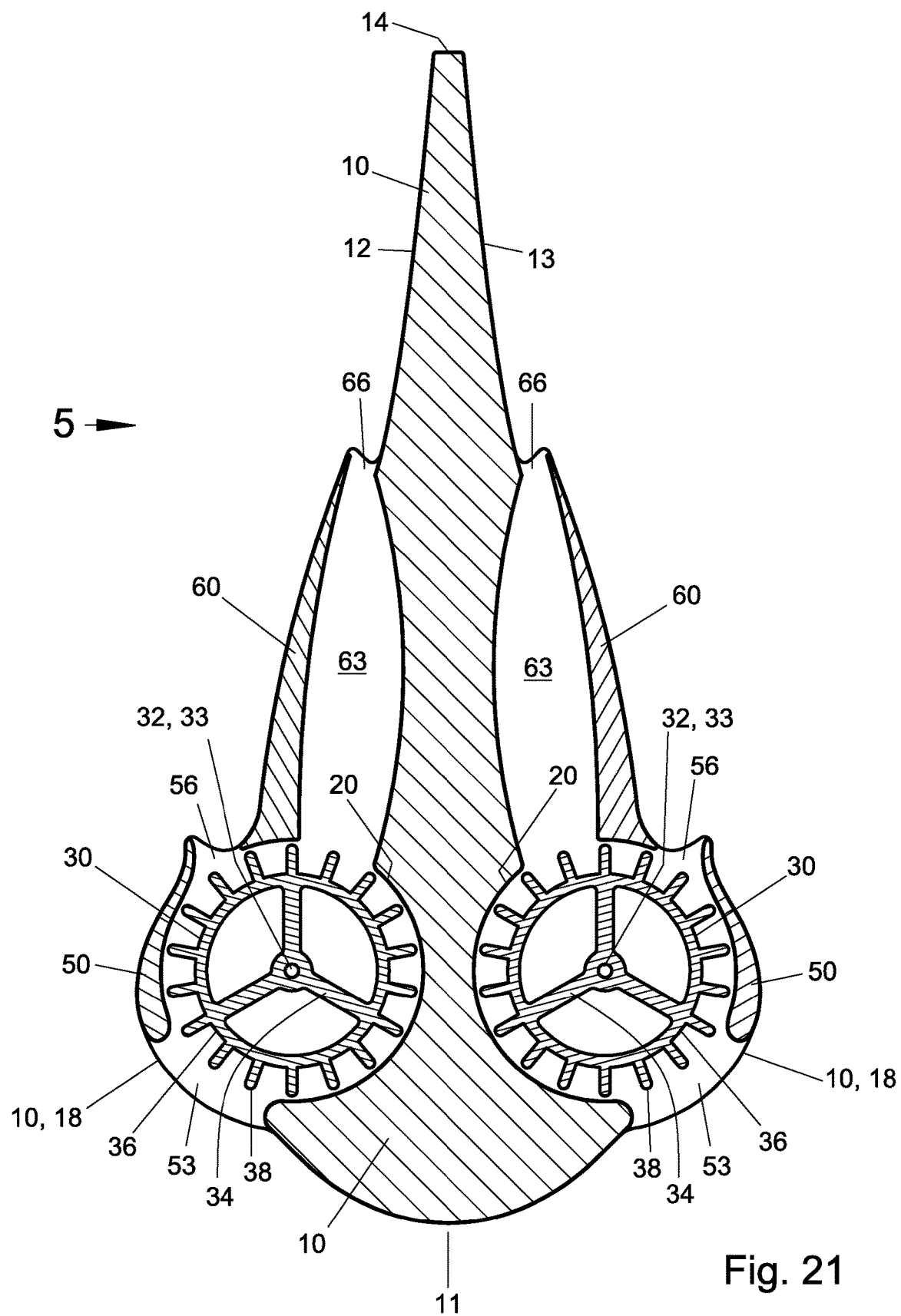
FIG. 21 is a lateral cross sectional view of a mode of wing with slipstream turbine with a turbine on the left surface, a turbine on the right surface, two slipstream outriggers, and two lateral outriggers.
Figure 22:
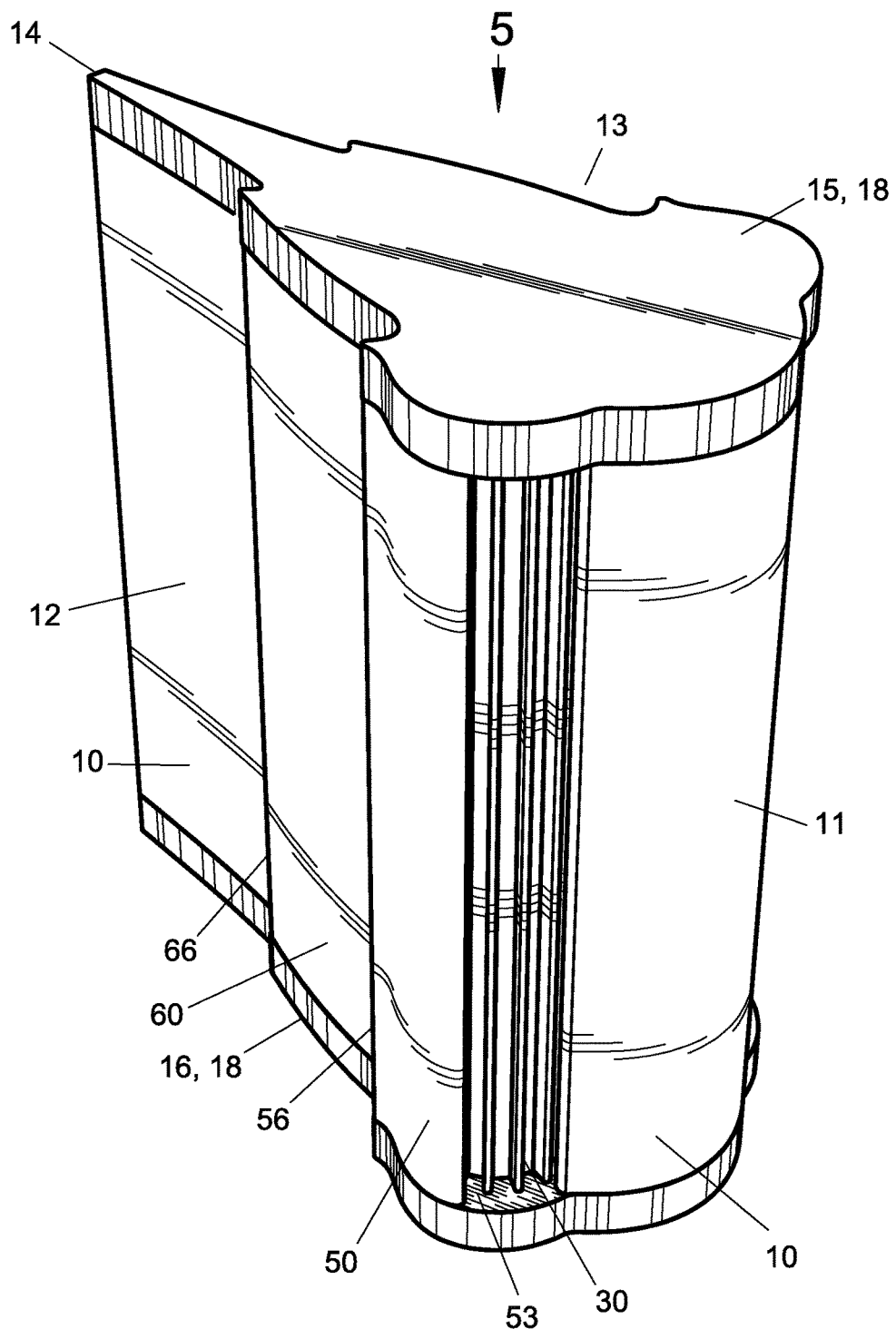
FIG. 22 is a perspective view of FIG. 21.

FIGS. 21-22 depict a mode of wing with slipstream turbine 5 comprising: a wing or airfoil 10 with two partial cylindrical voids 20, two turbines 30, two slipstream outriggers 50, and two lateral outriggers 60. This mode functions to add additional rotation energy to turbine 30 as described above.

Figure 23:
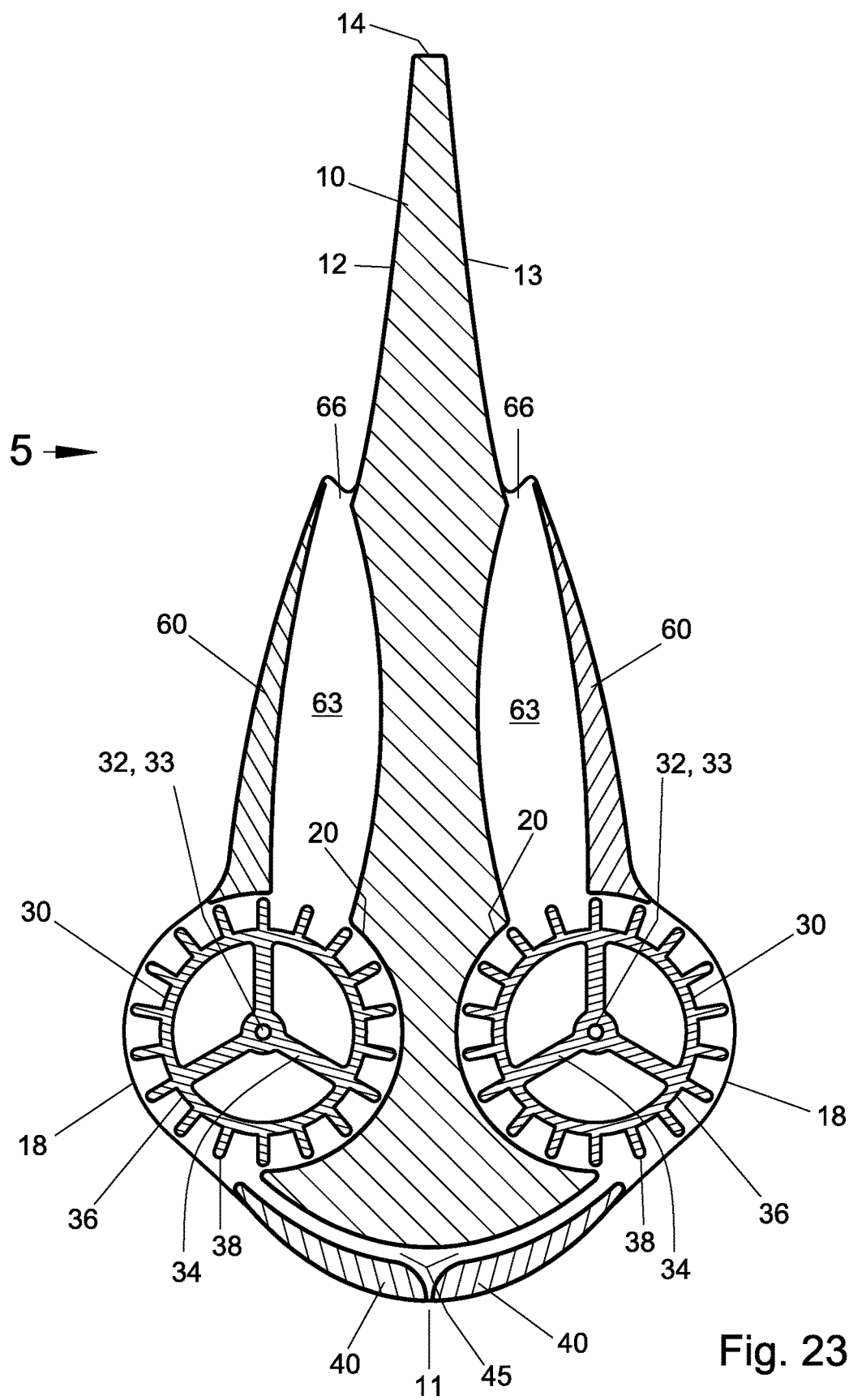
FIG. 23 is a lateral cross sectional view of a mode of wing with slipstream turbine with a turbine on the left surface, a turbine on the right surface, two leading outriggers, and two lateral outriggers.
Figure 24:
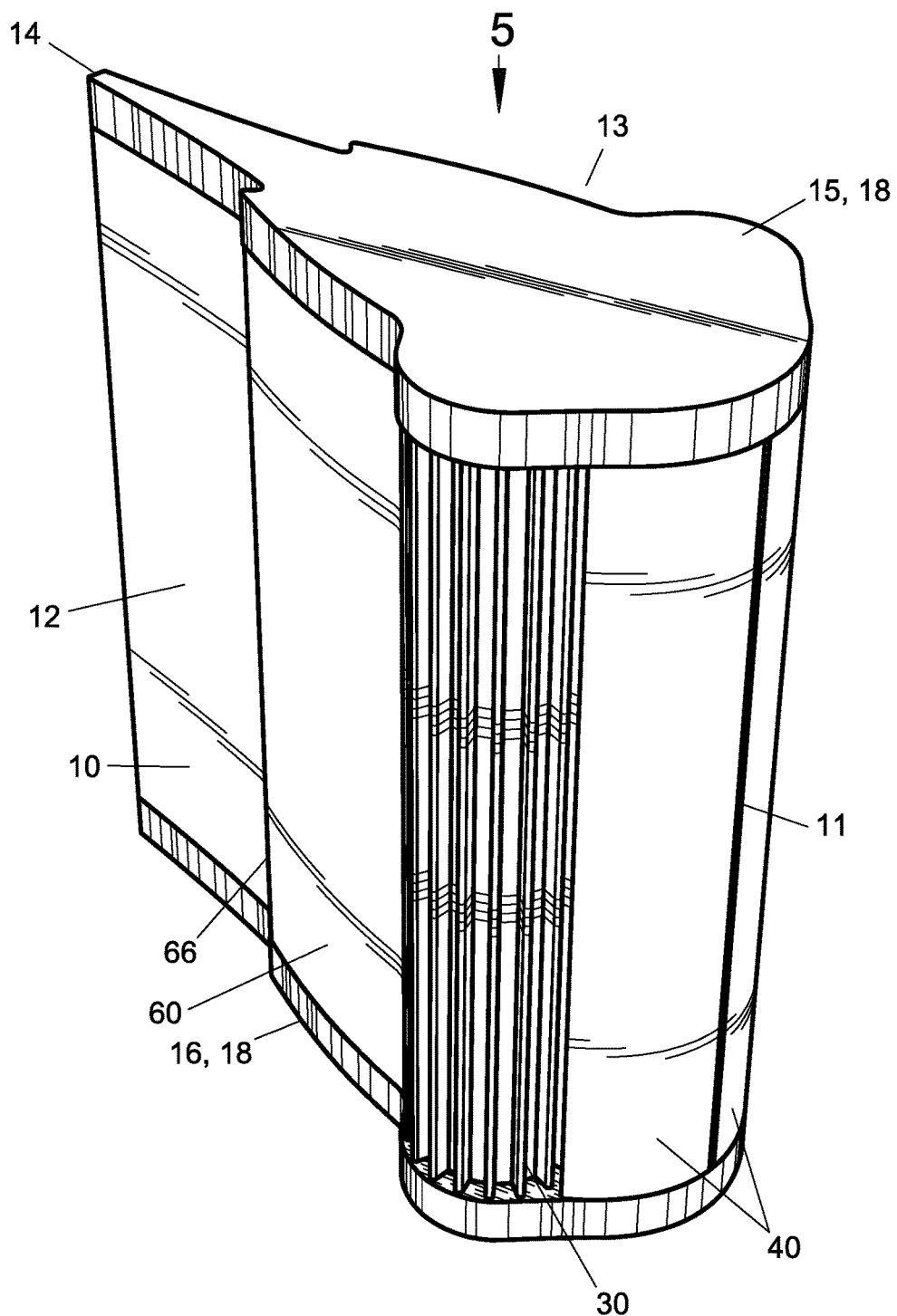
FIG. 24 is a perspective view of FIG. 23.

FIGS. 23-24 depict a mode of wing with slipstream turbine 5 comprising: a wing or airfoil 10 with two partial cylindrical voids 20, two turbines 30, two leading outriggers 40, and two lateral outriggers 60. This mode functions to add additional rotation energy to turbine 30 as described above.

Figure 25:
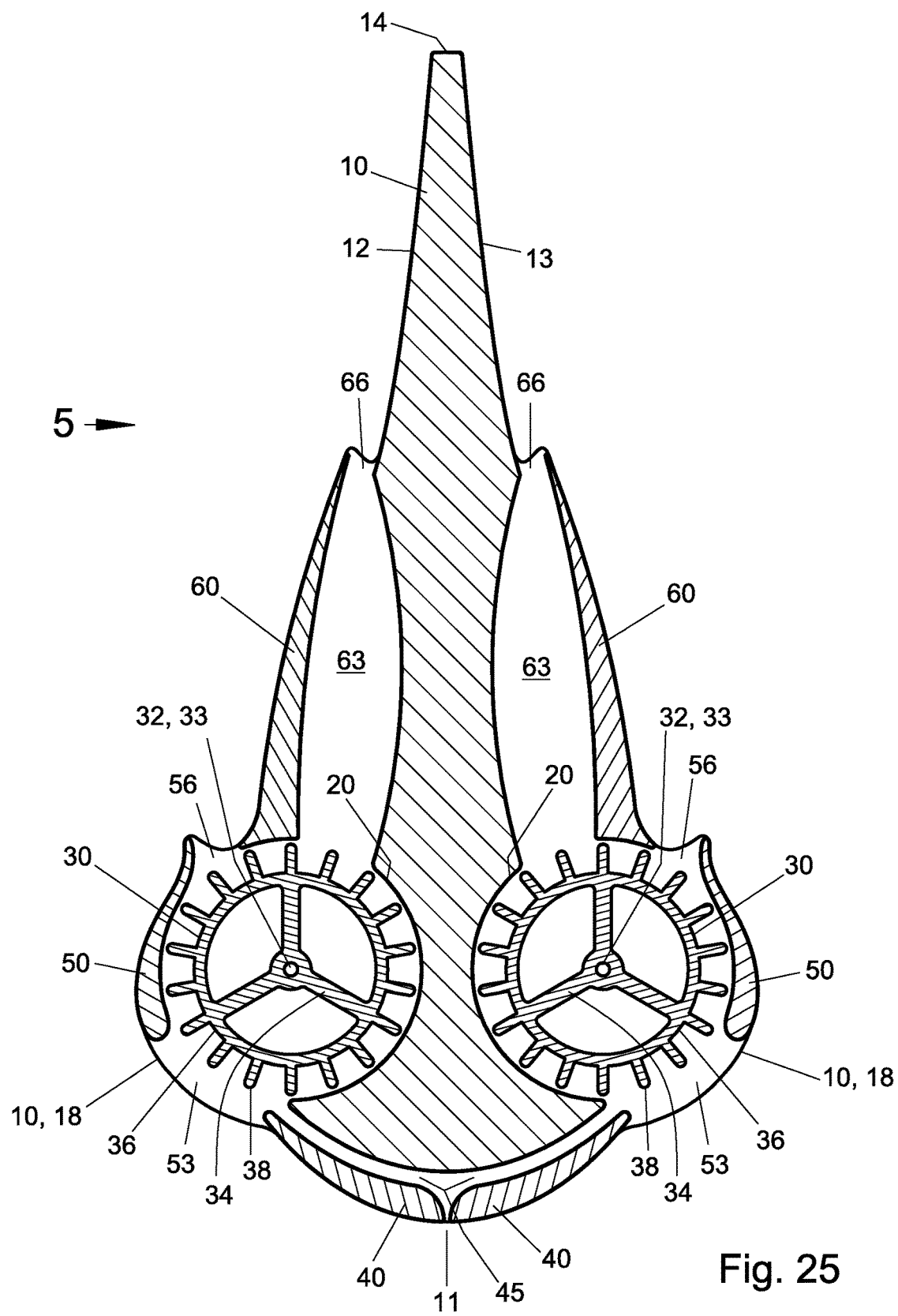
FIG. 25 is a lateral cross sectional view of a mode of wing with slipstream turbine with a turbine on the left surface, a turbine on the right surface, two leading outriggers, two slipstream outriggers, and two lateral outriggers.
Figure 26:
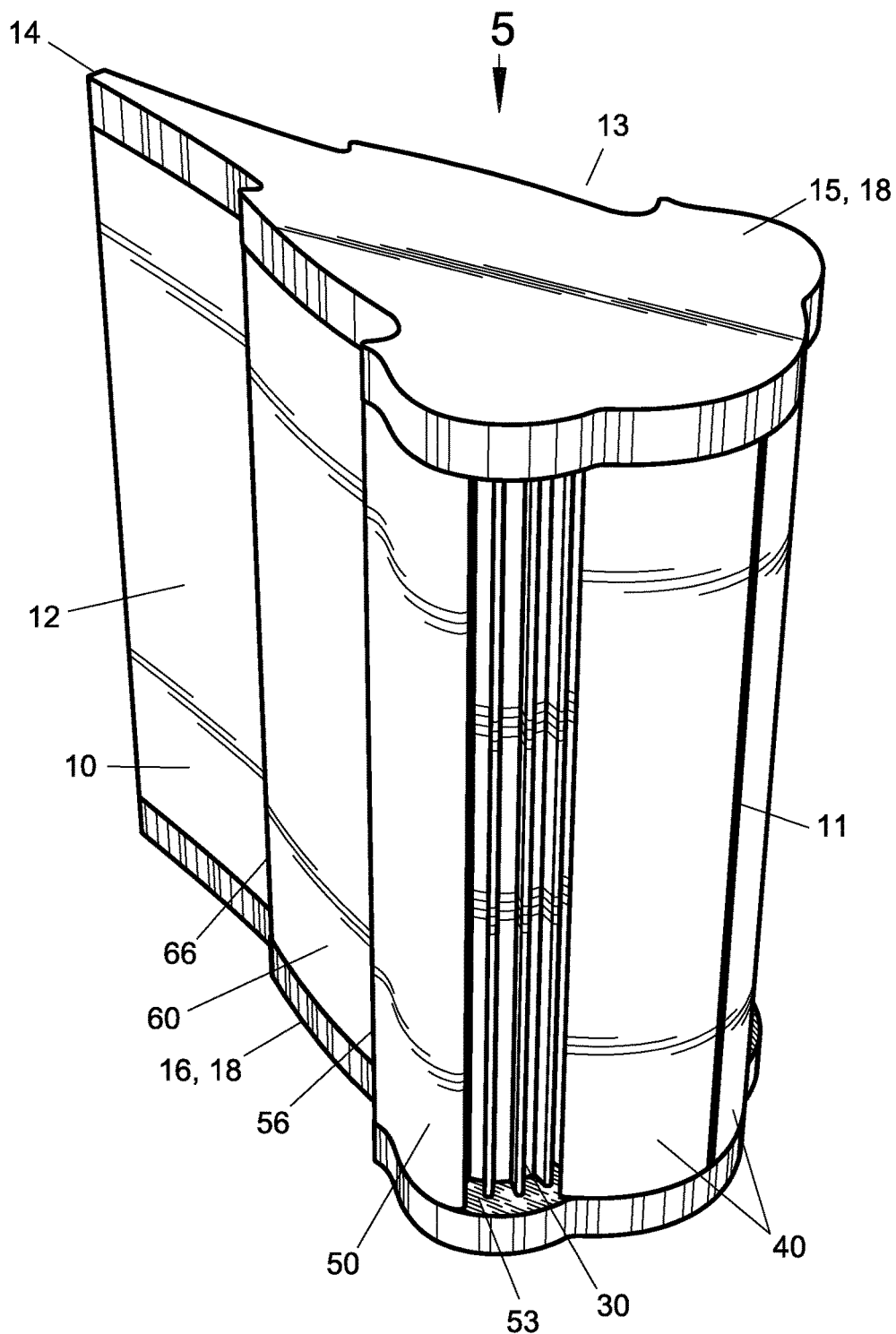
FIG. 26 is a perspective view of FIG. 25.

FIGS. 25-26 depict a mode of wing with slipstream turbine 5 comprising: a wing or airfoil 10 with two partial cylindrical voids 20, two turbines 30, two leading outriggers 40, two slipstream outriggers 50, and two lateral outriggers 60. This mode functions to add additional rotation energy to turbine 30 as described above.

Figure 27:
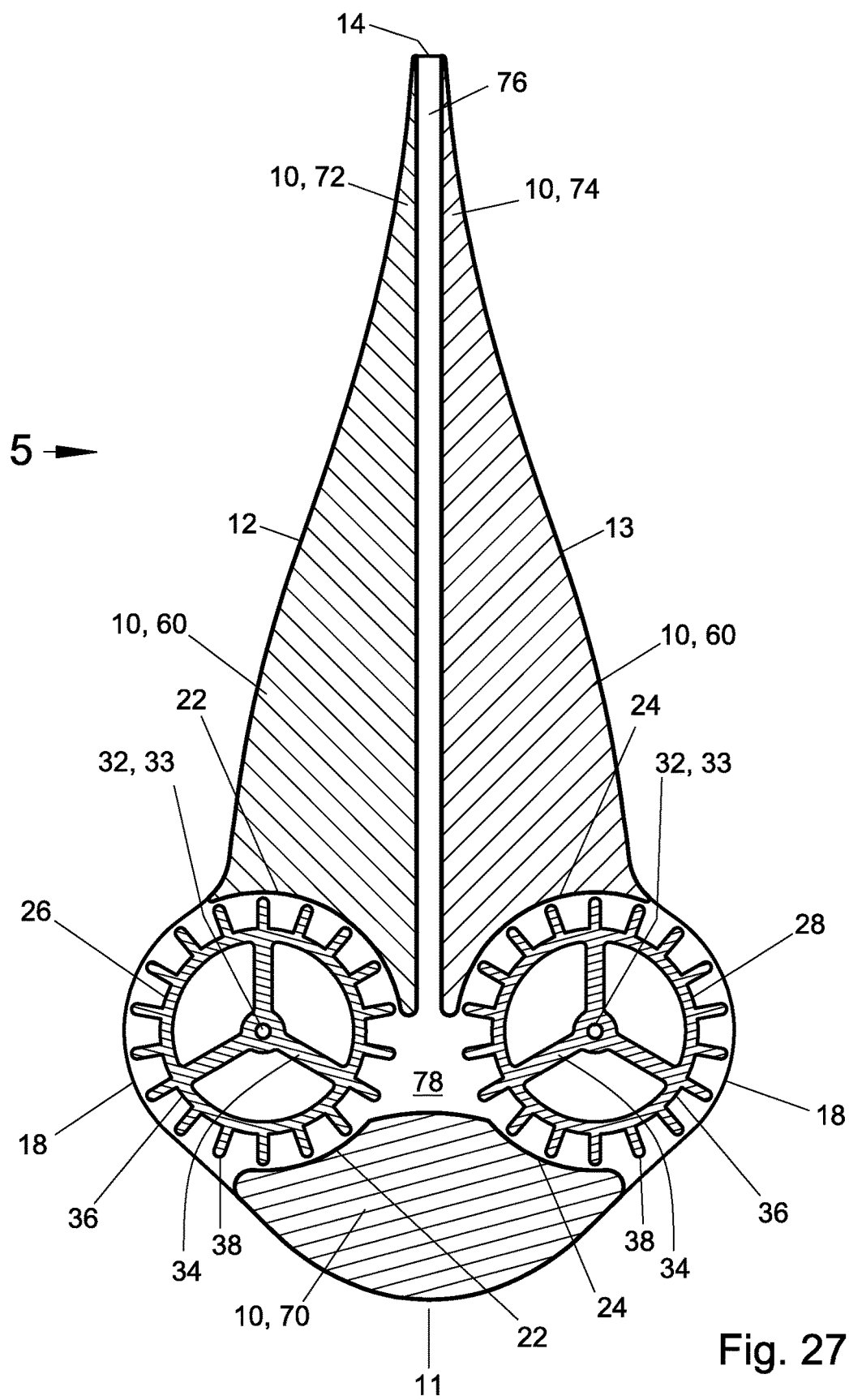
FIG. 27 is a lateral cross sectional view of a mode of wing with slipstream turbine with a turbine on the left surface, a turbine on the right surface, wherein the wing is broken down into three subcomponents to create a super low pressure chamber inside the wing.
Figure 28:
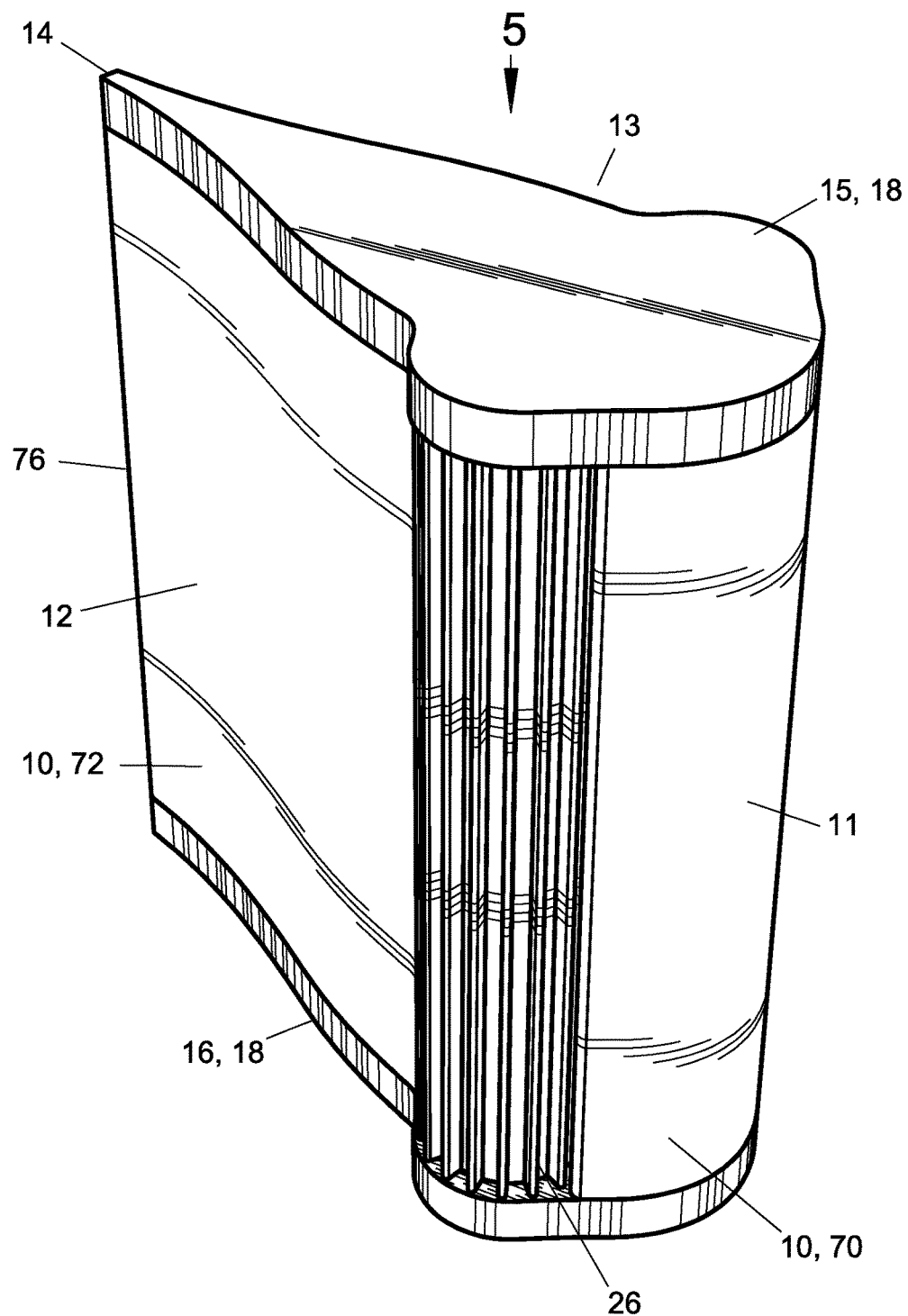
FIG. 28 is a perspective view of FIG. 27.

FIGS. 27-28 depict a mode of wing with slipstream turbine 5 comprising: wing or airfoil with two partial cylindrical voids 20 and two turbines 30, wherein wing or airfoil comprises a leading subcomponent 70, a left subcomponent 72, and a right subcomponent 74 to form an overall symmetric airfoil shape with a center evacuation channel 76 and a super low pressure chamber 78.

Figure 29:
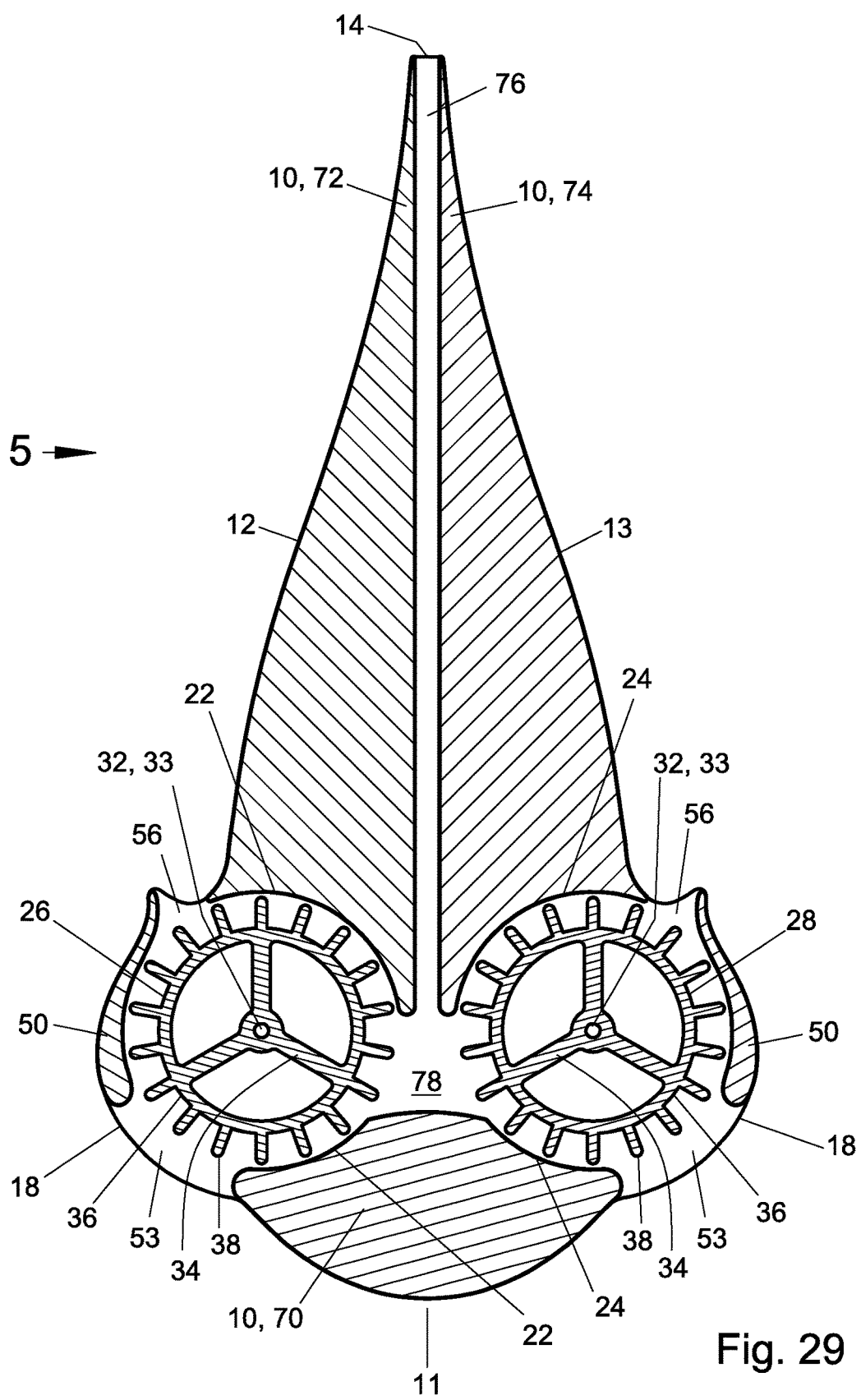
FIG. 29 is a lateral cross sectional view of a mode of wing with slipstream turbine with a turbine on the left surface, a turbine on the right surface, and two slipstream outriggers, wherein the wing is broken down into three subcomponents to create a super low pressure chamber inside the wing.
Figure 30:
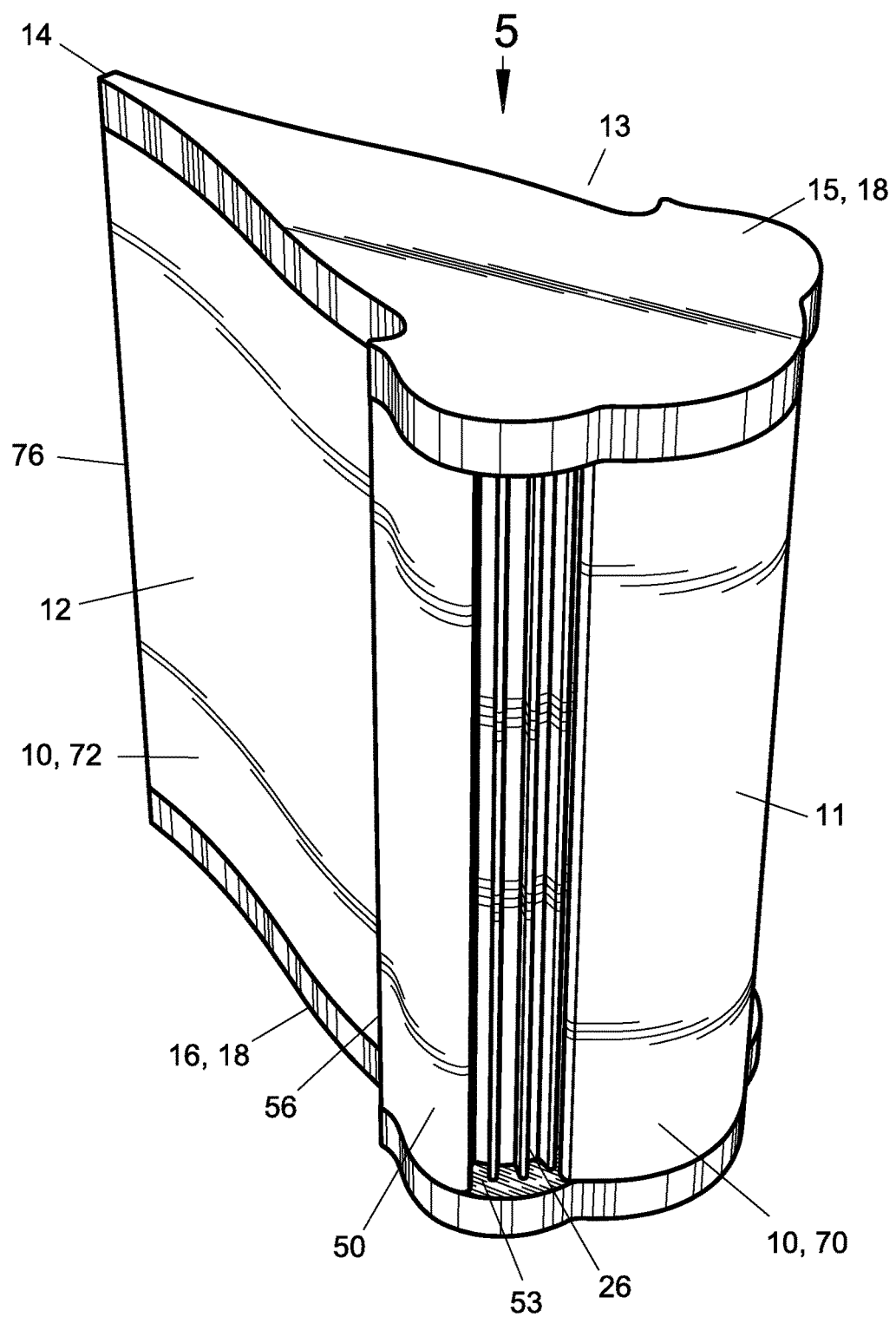
FIG. 30 is a perspective view of FIG. 29.

FIGS. 29-30 depict a mode of wing with slipstream turbine 5 comprising: wing or airfoil with two partial cylindrical voids 20, two turbines 30, and two slipstream outriggers 50, wherein wing or airfoil comprises a leading subcomponent 70, a left subcomponent 72, and a right subcomponent 74 to form an overall symmetric airfoil shape with a center evacuation channel 76 and a super low pressure chamber 78.

Figure 31:
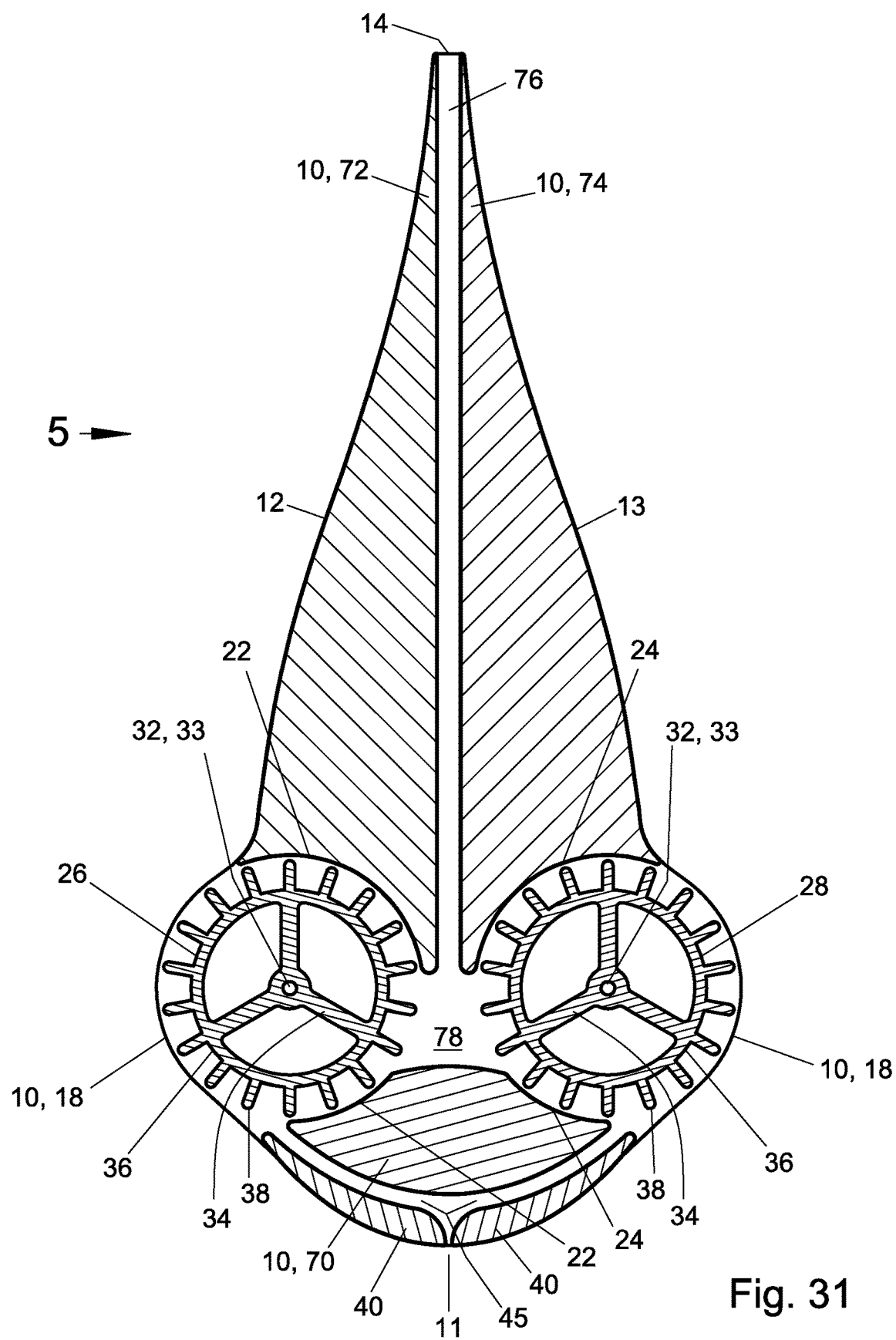
FIG. 31 is a lateral cross sectional view of a mode of wing with slipstream turbine with a turbine on the left surface, a turbine on the right surface, and two leading outriggers, wherein the wing is broken down into three subcomponents to create a super low pressure chamber inside the wing.
Figure 32:
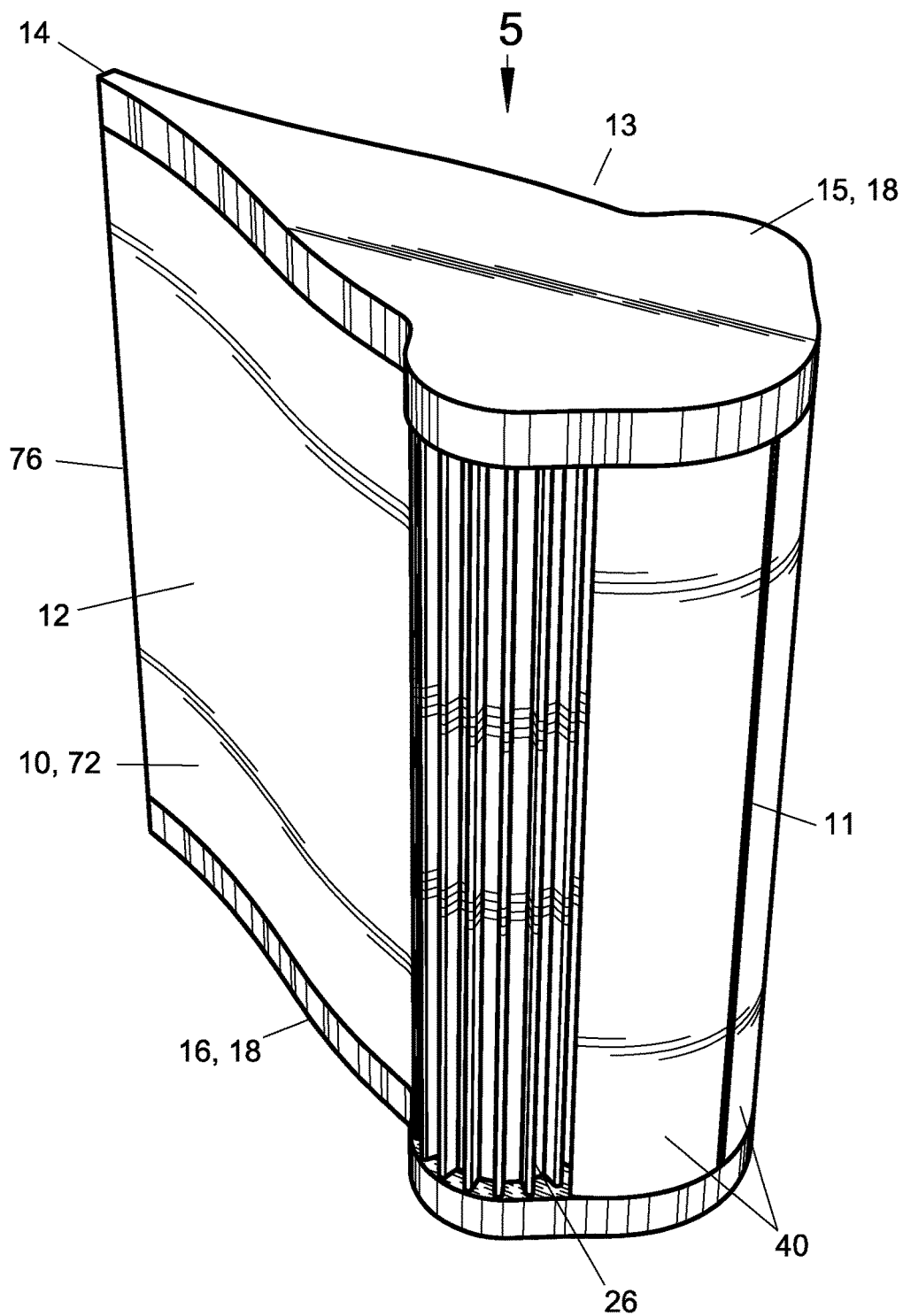
FIG. 32 is a perspective view of FIG. 31.

FIGS. 30-31 depict a mode of wing with slipstream turbine 5 comprising: wing or airfoil with two partial cylindrical voids 20, two turbines 30, and two leading outriggers 40, wherein wing or airfoil comprises a leading subcomponent 70, a left subcomponent 72, and a right subcomponent 74 to form an overall symmetric airfoil shape with a center evacuation channel 76 and a super low pressure chamber 78.

Figure 33:
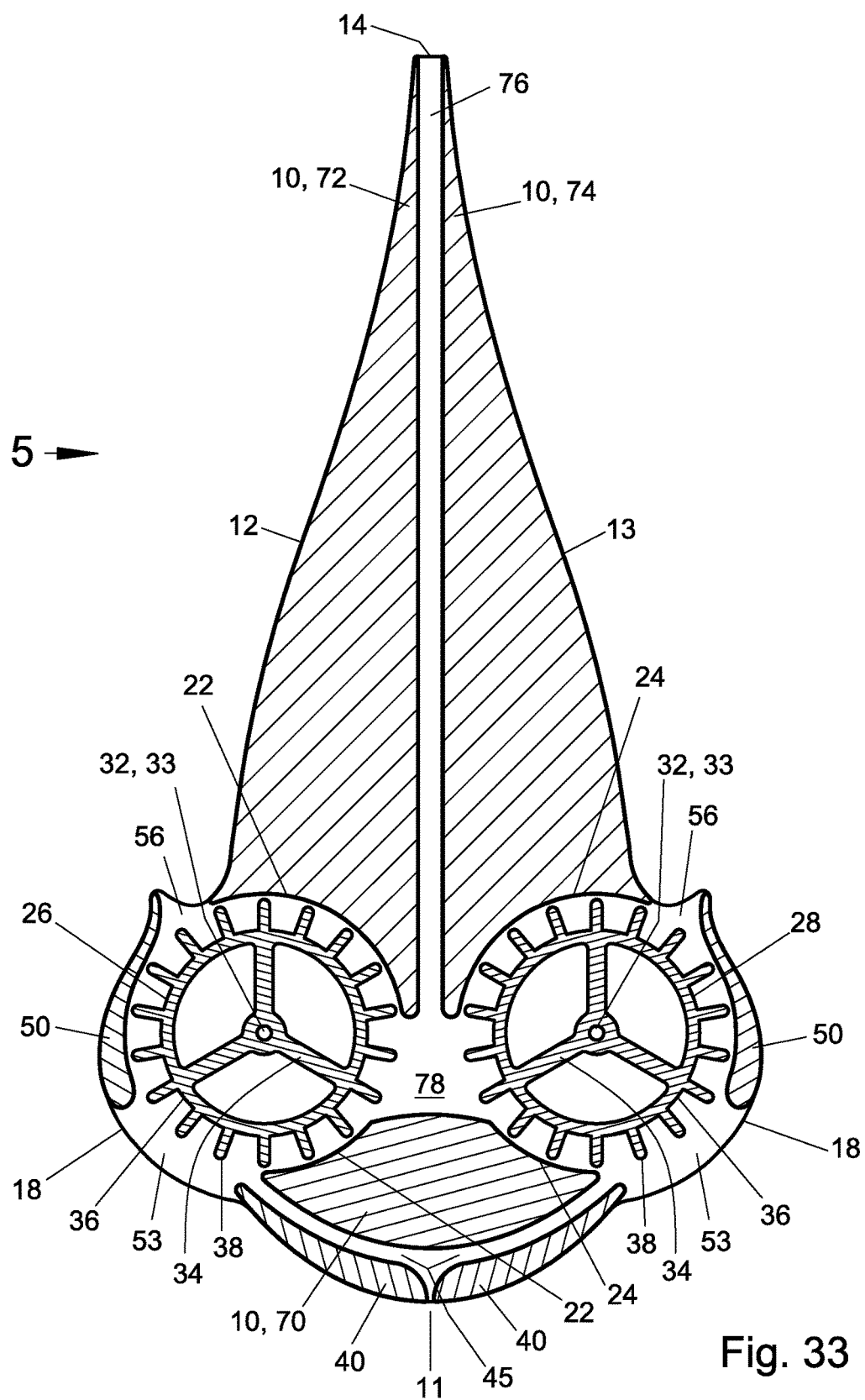
FIG. 33 is a lateral cross sectional view of a mode of wing with slipstream turbine with a turbine on the left surface, a turbine on the right surface, two leading outriggers, and two slipstream outriggers, wherein the wing is broken down into three subcomponents to create a super low pressure chamber inside the wing.
Figure 34:
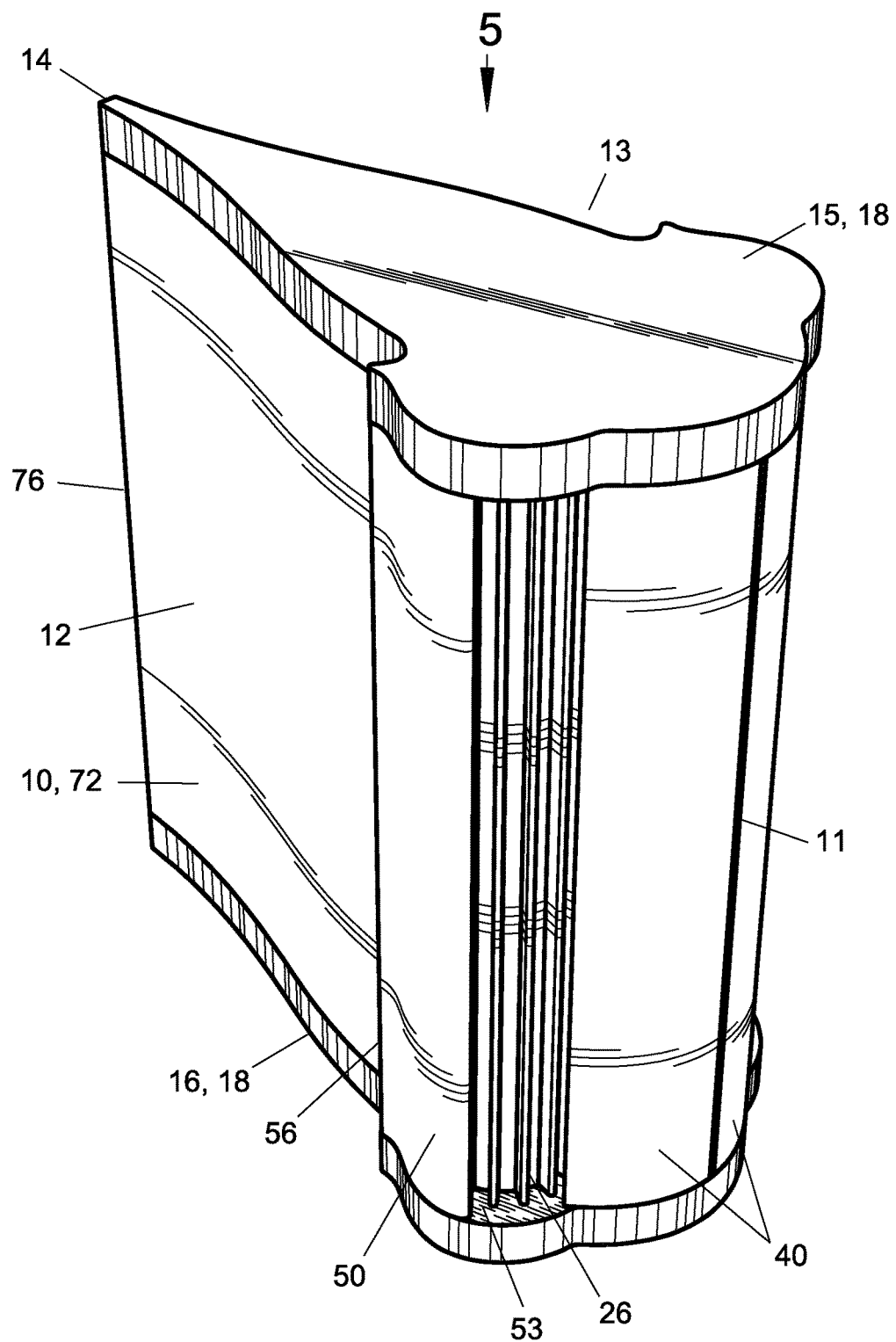
FIG. 34 is a perspective view of FIG. 33.

FIGS. 33-34 depict a mode of wing with slipstream turbine 5 comprising: wing or airfoil with two partial cylindrical voids 20, two turbines 30, two leading outriggers 40, and two slipstream outriggers 50, wherein wing or airfoil comprises a leading subcomponent 70, a left subcomponent 72, and a right subcomponent 74 to form an overall symmetric airfoil shape with a center evacuation channel 76 and a super low pressure chamber 78.

Figure 35:
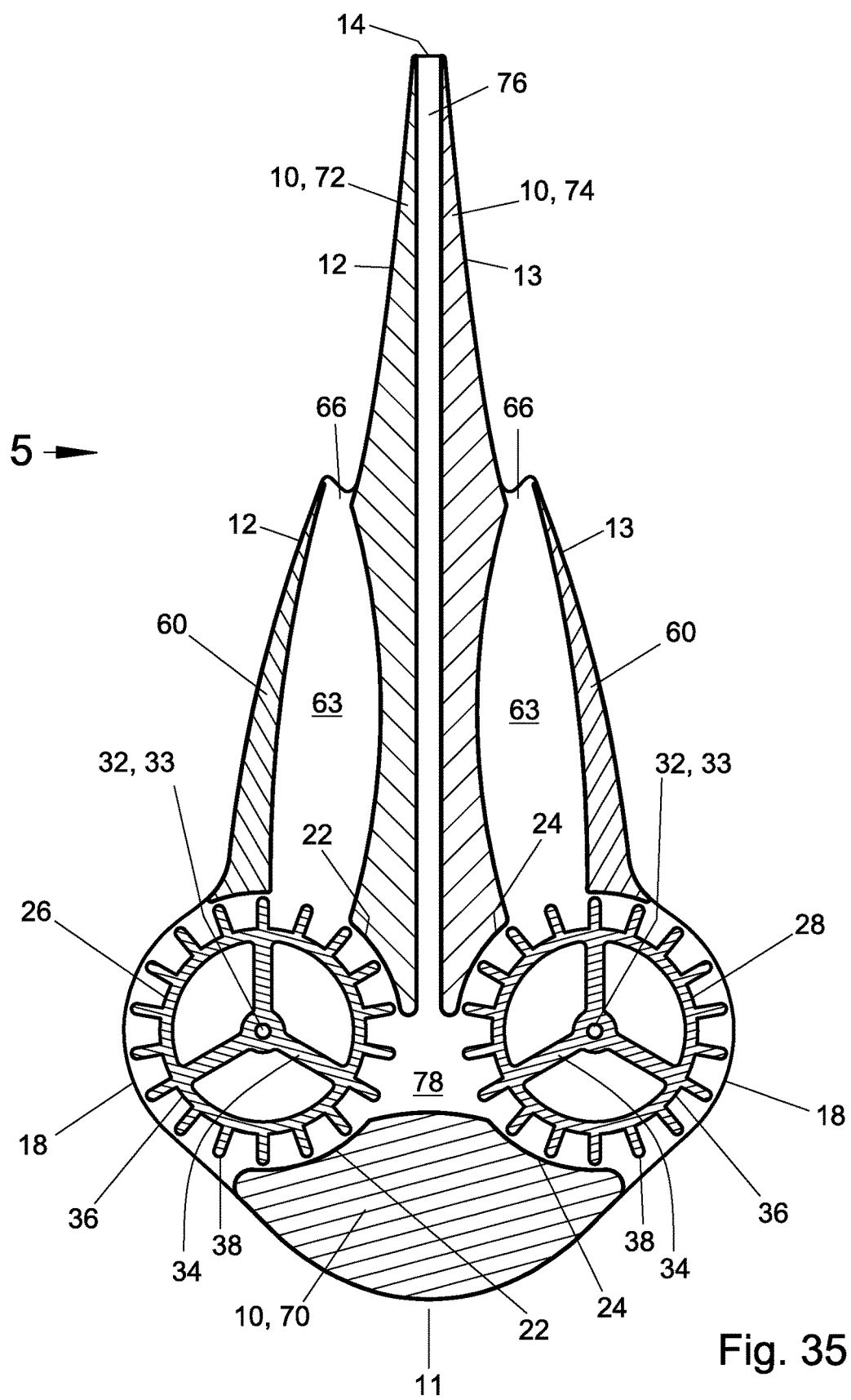
FIG. 35 is a lateral cross sectional view of a mode of wing with slipstream turbine with a turbine on the left surface, a turbine on the right surface, and two lateral outriggers, wherein the wing is broken down into three subcomponents to create a super low pressure chamber inside the wing.
Figure 36:
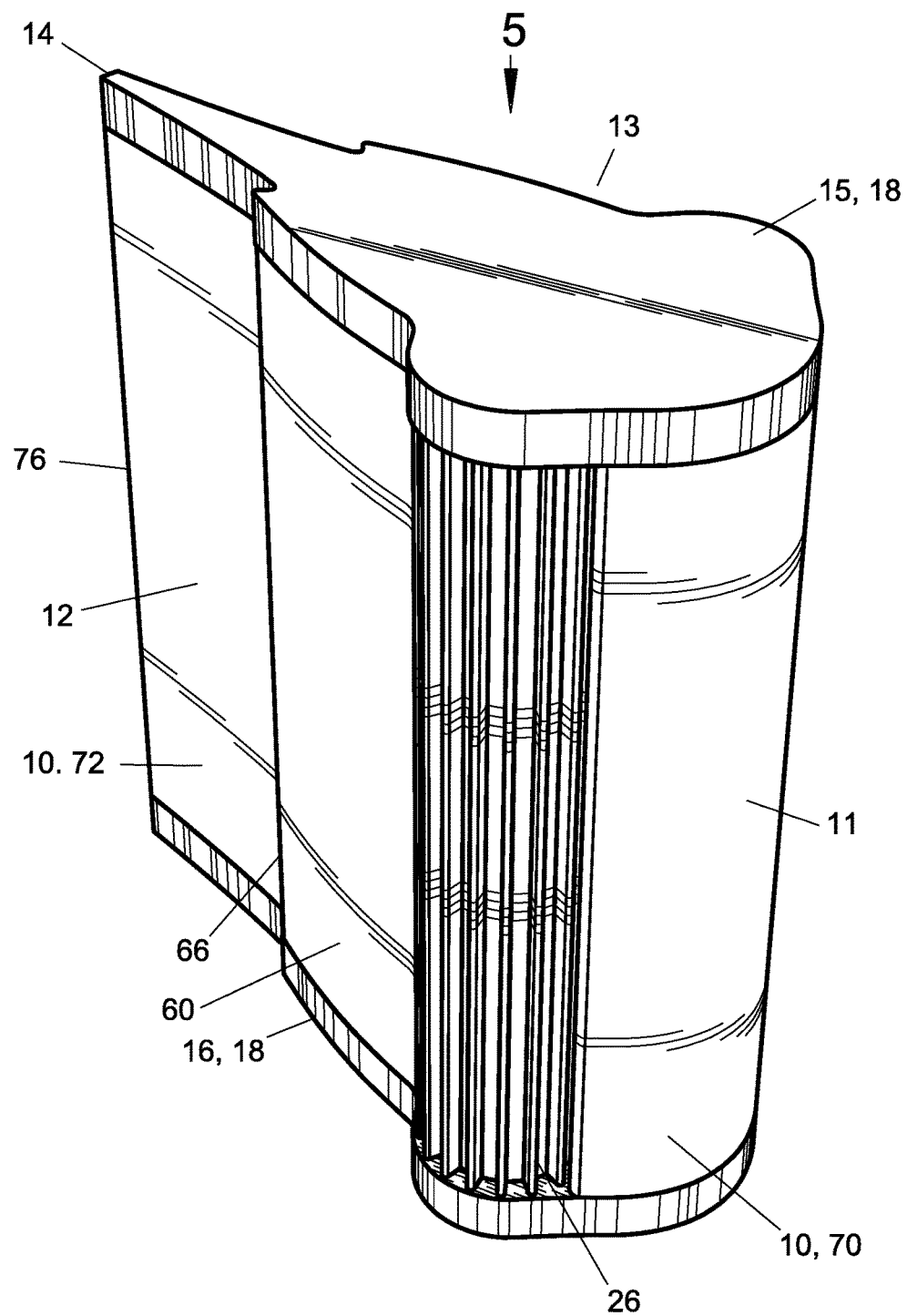
FIG. 36 is a perspective view of FIG. 35.

FIGS. 35-36 depict a mode of wing with slipstream turbine 5 comprising: wing or airfoil with two partial cylindrical voids 20, two turbines 30, and two lateral outriggers 60, wherein wing or airfoil comprises a leading subcomponent 70, a left subcomponent 72, and a right subcomponent 74 to form an overall symmetric airfoil shape with a center evacuation channel 76 and a super low pressure chamber 78.

Figure 37:
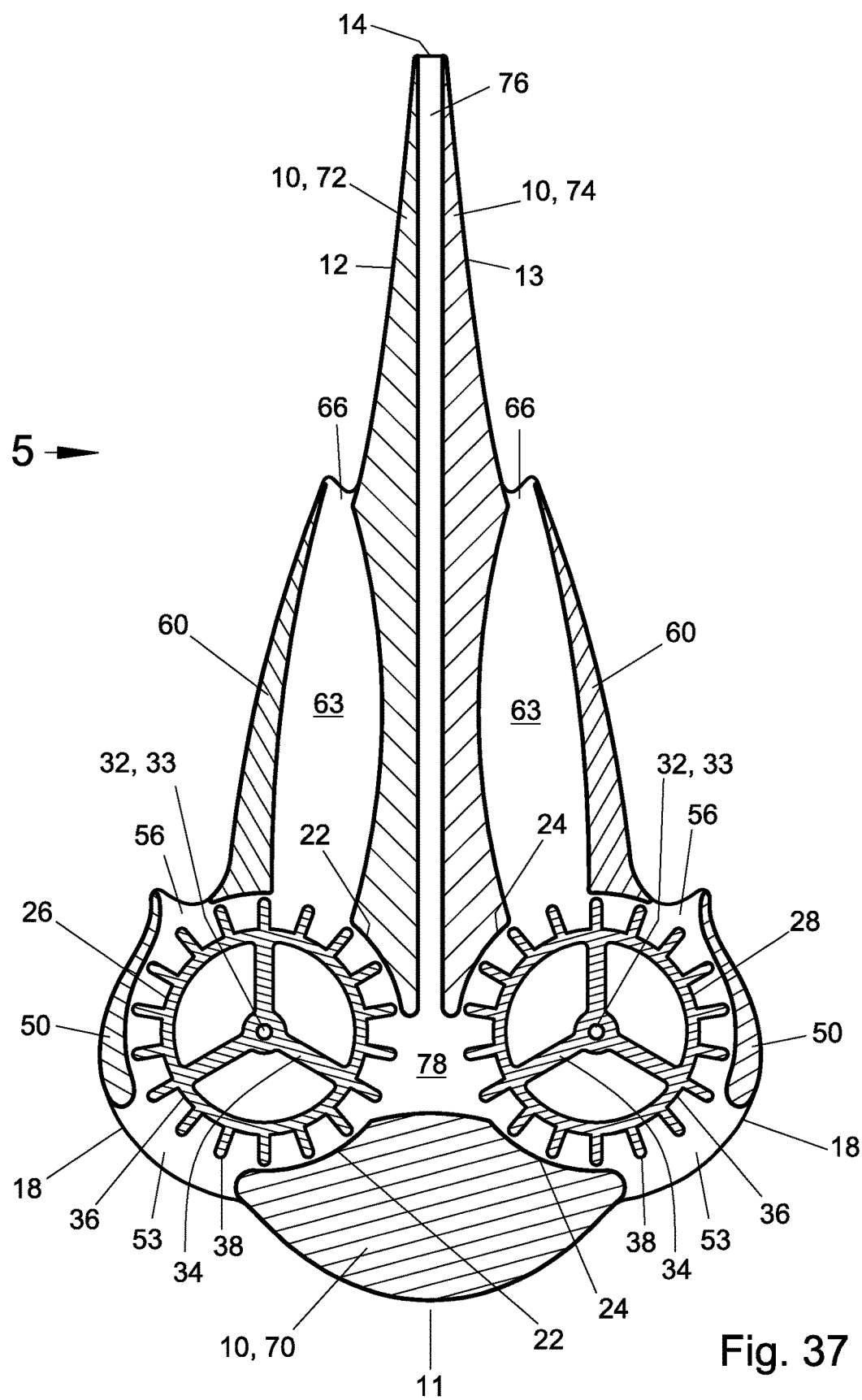
FIG. 37 is a lateral cross sectional view of a mode of wing with slipstream turbine with a turbine on the left surface, a turbine on the right surface, two slipstream outriggers, and two lateral outriggers, wherein the wing is broken down into three subcomponents to create a super low pressure chamber inside the wing.
Figure 38:
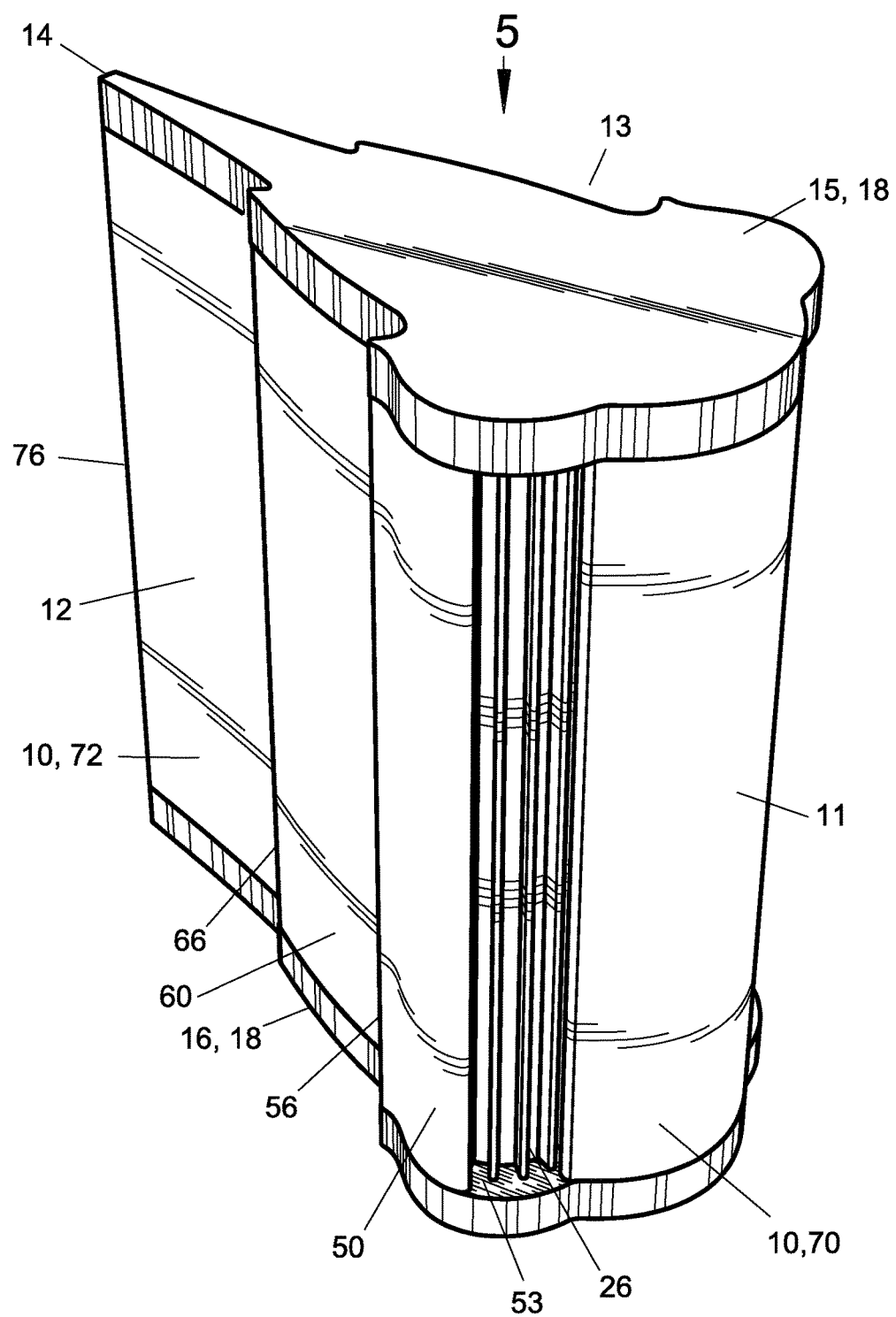
FIG. 38 is a perspective view of FIG. 37.

FIGS. 37-38 depict a mode of wing with slipstream turbine 5 comprising: wing or airfoil with two partial cylindrical voids 20, two turbines 30, two slipstream outriggers 50, and two lateral outriggers 60, wherein wing or airfoil comprises a leading subcomponent 70, a left subcomponent 72, and a right subcomponent 74 to form an overall symmetric airfoil shape with a center evacuation channel 76 and a super low pressure chamber 78.

Figure 39:
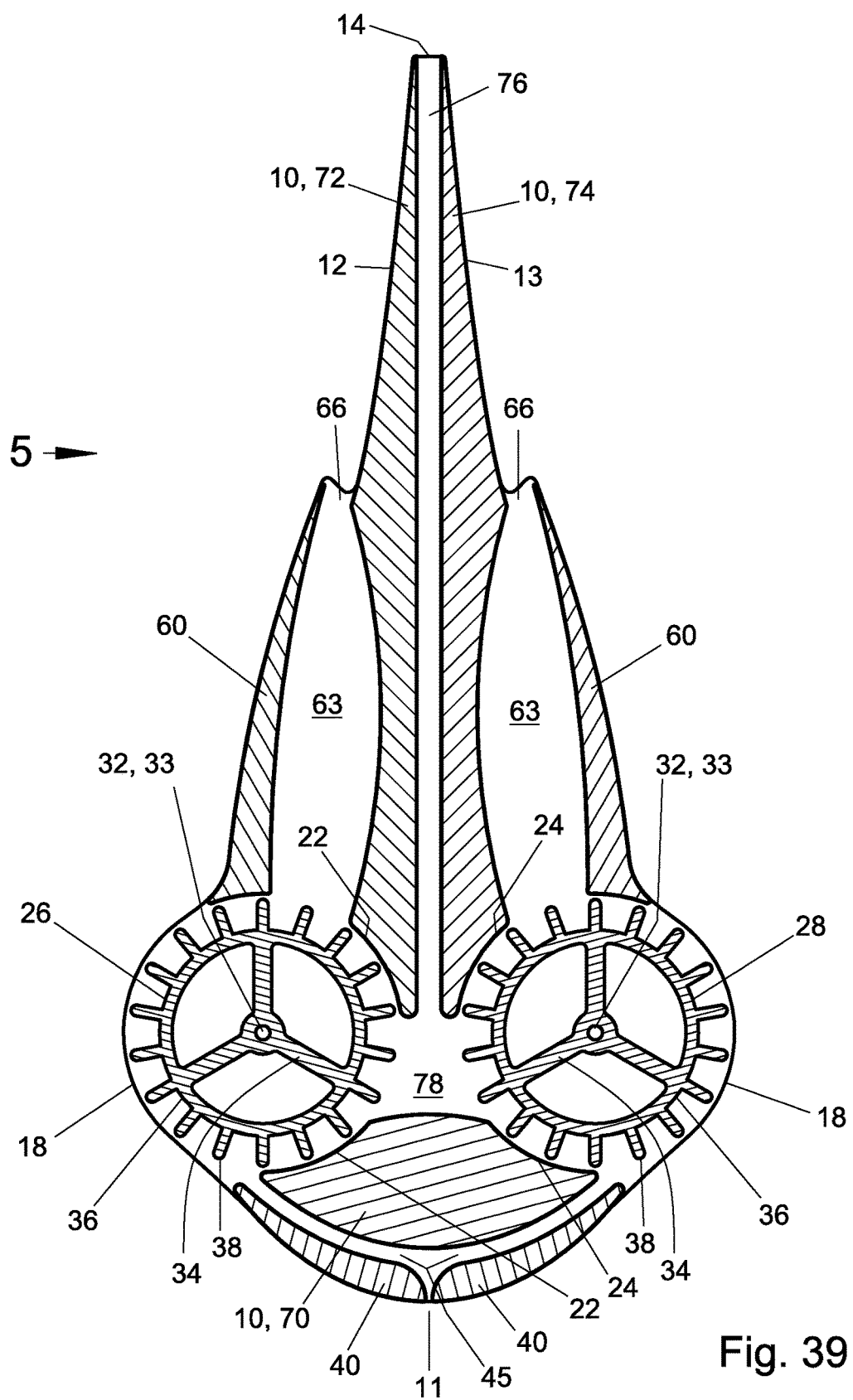
FIG. 39 is a lateral cross sectional view of a mode of wing with slipstream turbine with a turbine on the left surface, a turbine on the right surface, two leading outriggers, and two lateral outriggers, wherein the wing is broken down into three subcomponents to create a super low pressure chamber inside the wing.
Figure 40:
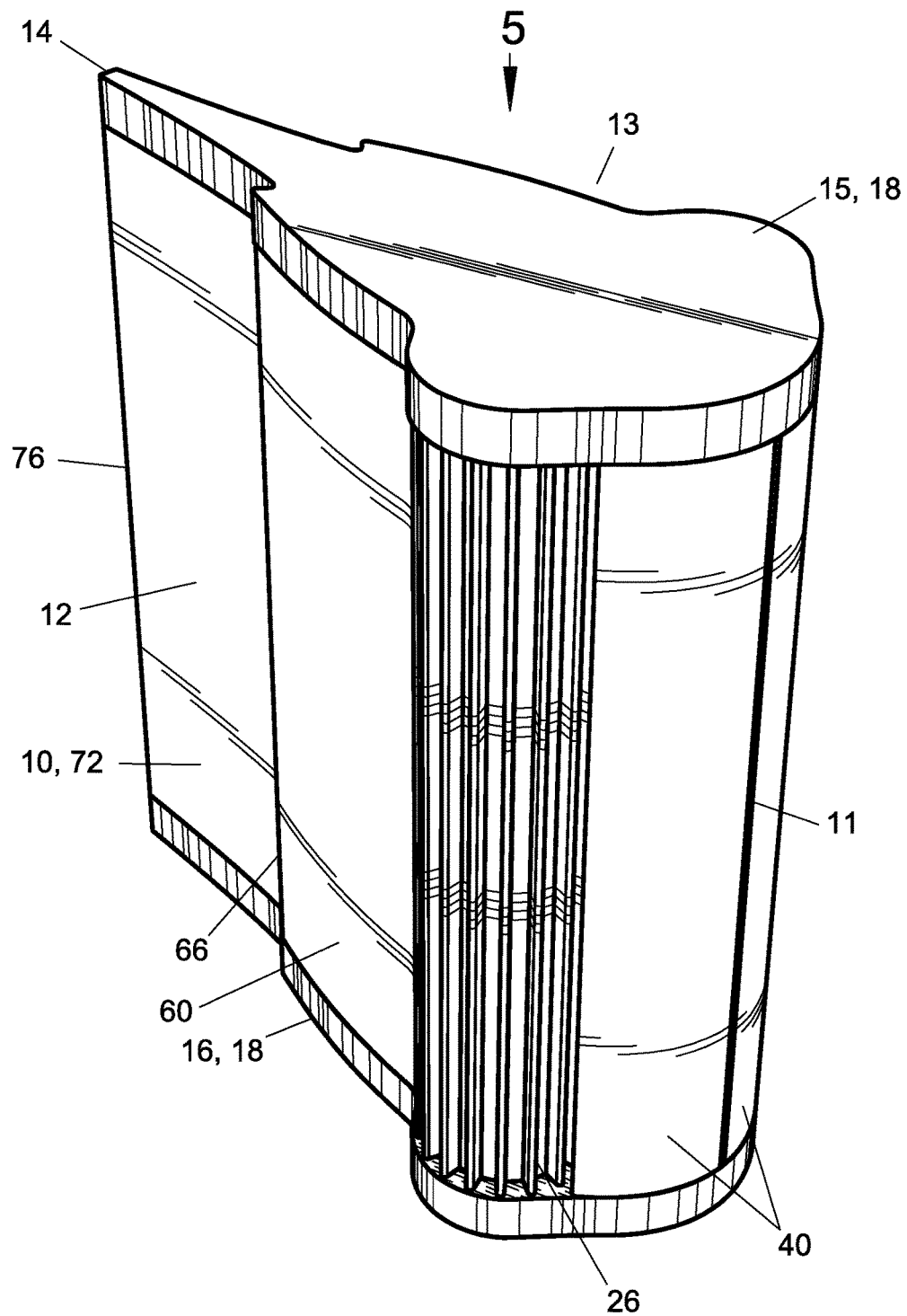
FIG. 40 is a perspective view of FIG. 39.

FIGS. 39-40 depict a mode of wing with slipstream turbine 5 comprising: wing or airfoil with two partial cylindrical voids 20, two turbines 30, two leading outriggers 40, and two lateral outriggers 60, wherein wing or airfoil comprises a leading subcomponent 70, a left subcomponent 72, and a right subcomponent 74 to form an overall symmetric airfoil shape with a center evacuation channel 76 and a super low pressure chamber 78.

Figure 41:
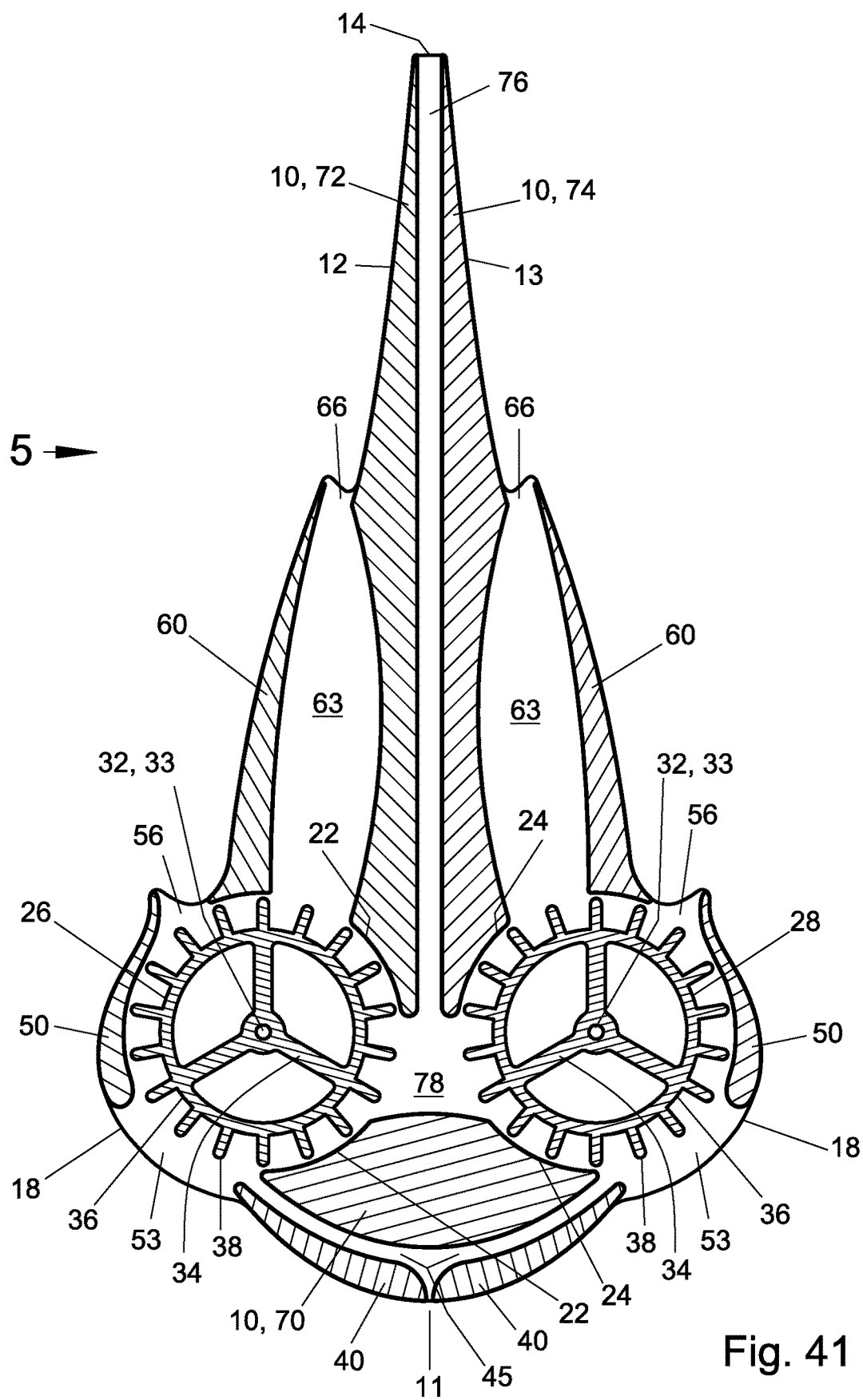
FIG. 41 is a lateral cross sectional view of a mode of wing with slipstream turbine with a turbine on the left surface, a turbine on the right surface, two leading outriggers, two slipstream outriggers, and two lateral outriggers, wherein the wing is broken down into three subcomponents to create a super low pressure chamber inside the wing.
Figure 42:
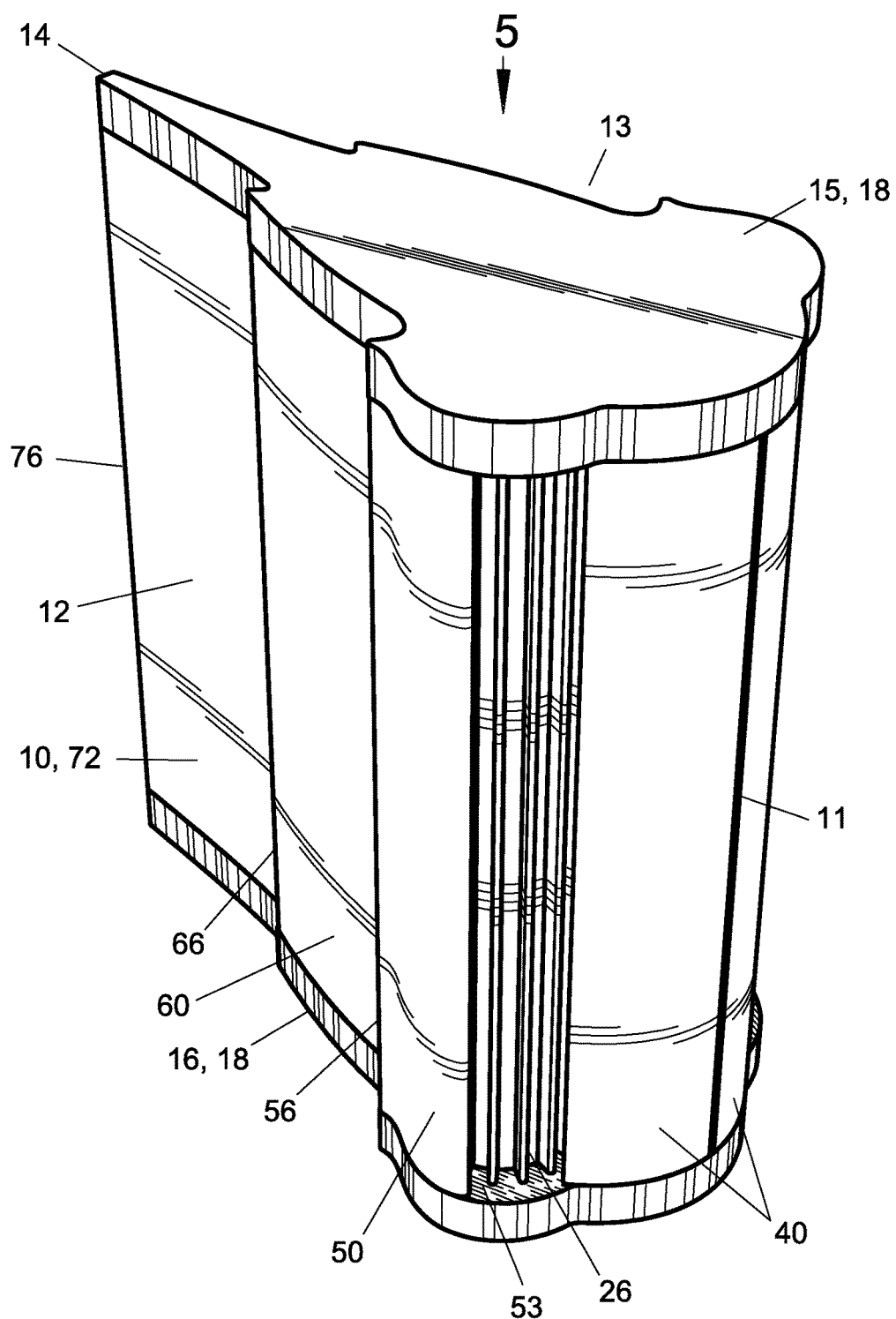
FIG. 42 is a perspective view of FIG. 41.

FIGS. 41-42 depict the best mode of wing with slipstream turbine 5 comprising: wing or airfoil with two partial cylindrical voids 20, two turbines 30, two leading outriggers 40, two slipstream outriggers 50, and two lateral outriggers 60, wherein wing or airfoil comprises a leading subcomponent 70, a left subcomponent 72, and a right subcomponent 74 to form an overall symmetric airfoil shape with a center evacuation channel 76 and a super low pressure chamber 78.

Figure 43:
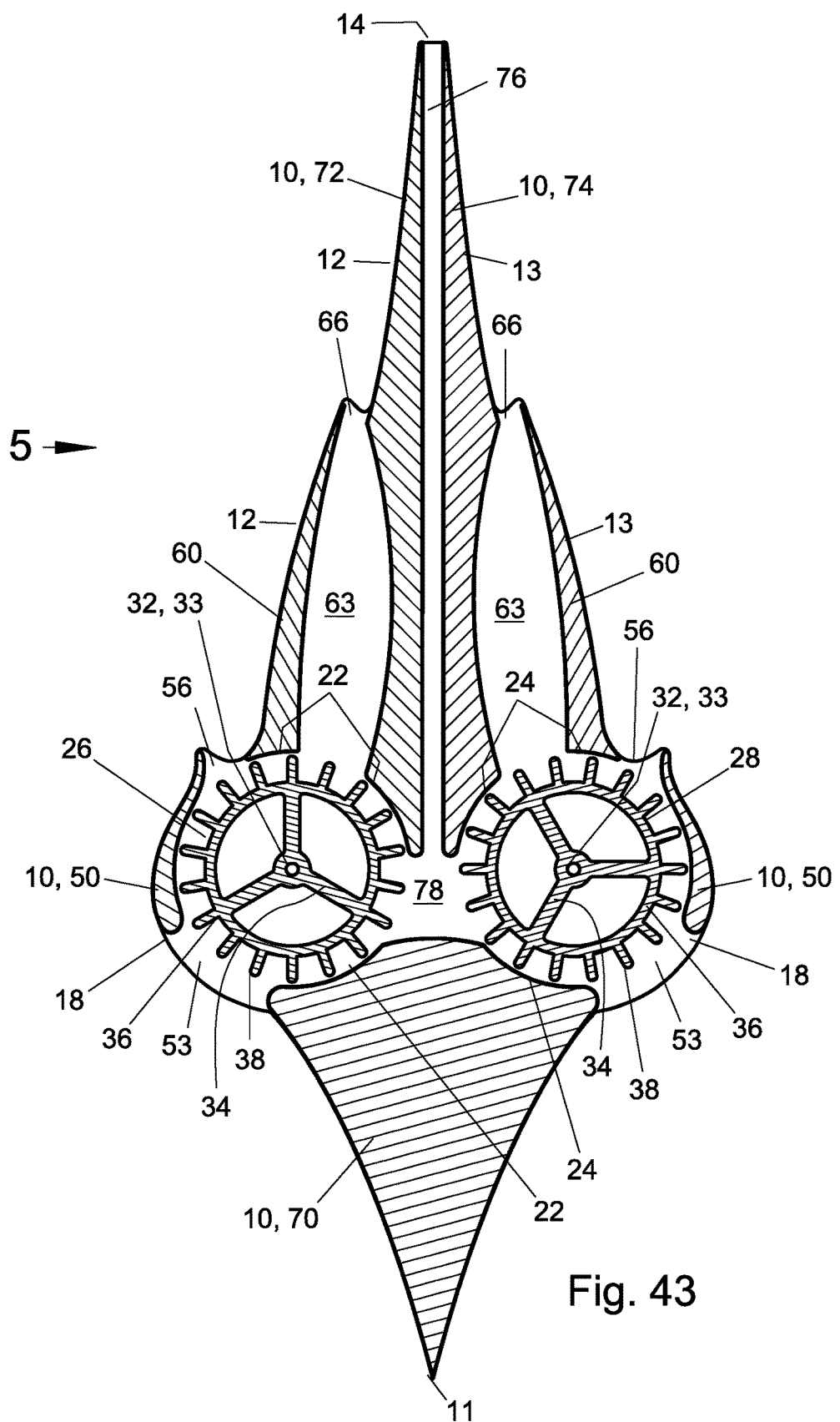
FIG. 43 is a lateral cross sectional view of a mode of wing with slipstream turbine with a turbine on the left surface, a turbine on the right surface, two slipstream outriggers, and two lateral outriggers, wherein the wing is broken down into three subcomponents to create a super low pressure chamber inside the wing and the leading component has a sharp leading edge.
Figure 44:
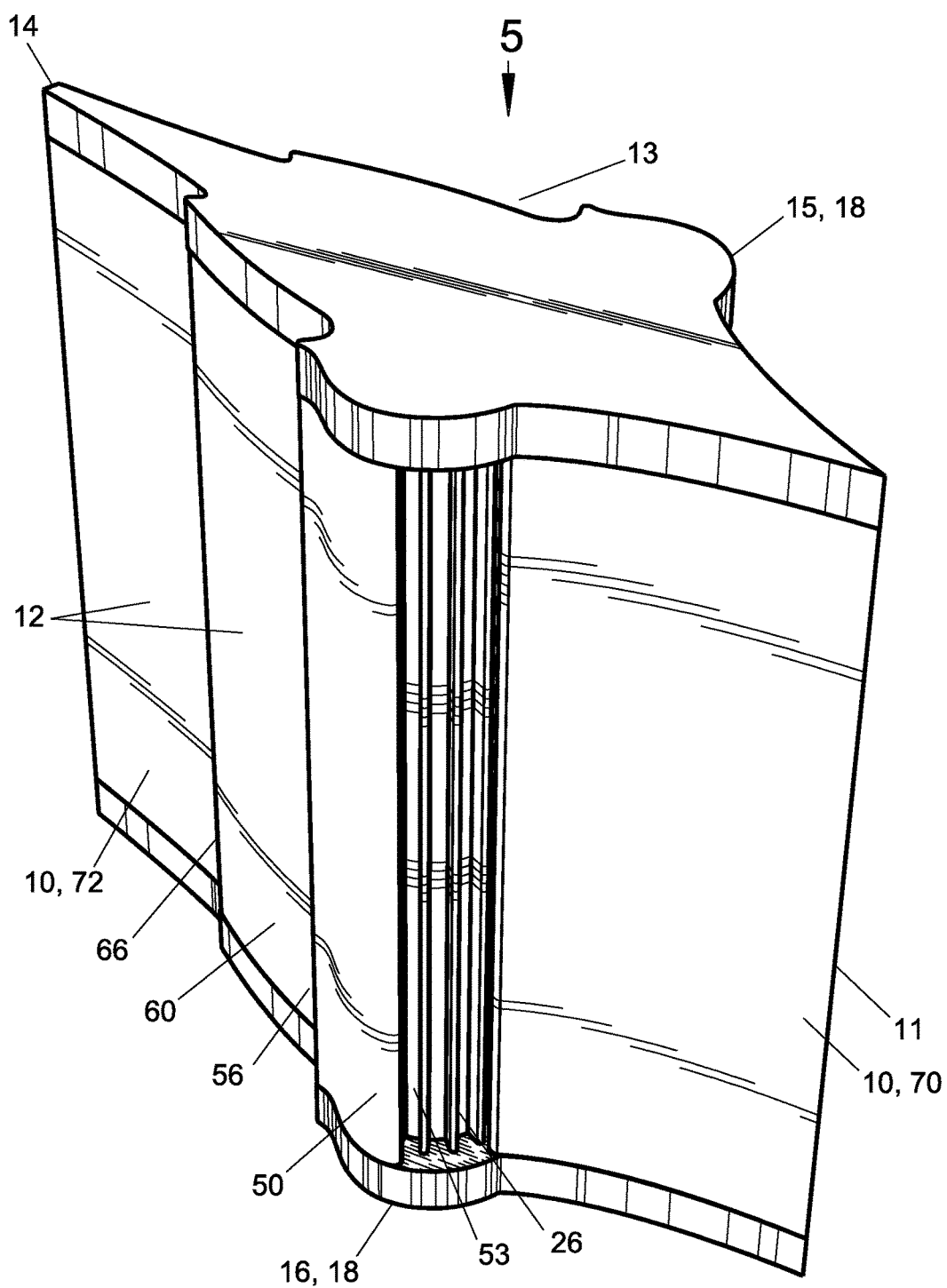
FIG. 44 is a perspective view of FIG. 43.

Alternately, leading subcomponent 70 may have a wedged or sharpened leading edge as depicted in FIGS. 43-44. This functions to help remove the stagnation area 113 in front of wing or airfoil 10 without the use of leading outriggers 40.

FIGS. 43-44 depict a mode of wing with slipstream turbine 5 comprising: wing or airfoil with two partial cylindrical voids 20, two turbines 30, two slipstream outriggers 50, and two lateral outriggers 60, wherein wing or airfoil comprises a leading subcomponent 70, a left subcomponent 72, and a right subcomponent 74 to form a overall symmetric airfoil shape with a center evacuation channel 76 and a super low pressure chamber 78.

Figure 45:
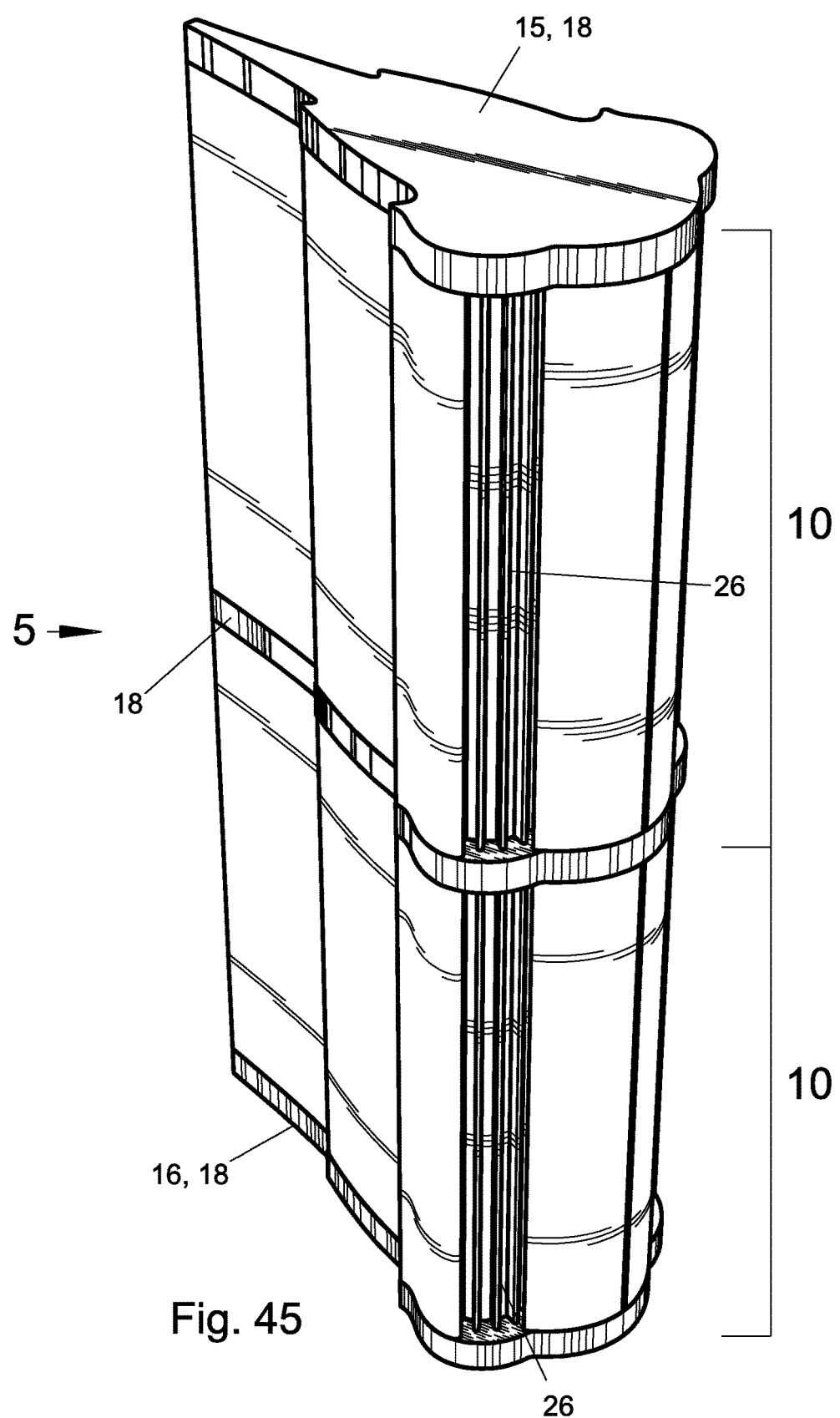
FIG. 45 is a perspective view of a mode of wing with slipstream turbine with at least two wing modules with slipstream turbines that have been stacked together end-to-end to form a larger wing or airfoil.

FIG. 45 is a perspective view of a mode of wing with slipstream turbine 5 with at least two wing or airfoil 10 modules that have been stacked together end-to-end to form a multi segmented wing with slipstream turbine 5 comprising at least two wings or airfoils 10, each with at least one partial cylindrical void 20 and at least one turbine 30 partially encapsulated within said at least one partial cylindrical void 20. The axle 32 of each segment may be rigidly connected to the axle 32 of another segment or to a generator. The mechanical housing 18 may rigidly mount wing or airfoil 10 components along with slipstream turbine 30 on top and/or bottom surfaces allowing a stacking end-to-end in a modular or serial fashion. Preferred usage is a modular configuration of best mode with each unit connected to an individual generator or work device inside mechanical housing 18 where output is then connected in total. A series configuration is where the slipstream turbines 30 on left or right be connected through the journals inside the mechanical housing 18 to the adjacent turbine 30 then ultimately connected to a single generating device.

A wing with slipstream turbine 5 immersed in a certain fluid 100 will have proportional effects acting in either a turbulent or static manner on fluid 100. As previously indicated static flow is very desirable. The lateral proportions recommended by static flow have a longitudinal portion as well. The longitudinal dimensions of slipstream turbine 30 are governed by torsion, individually or in serial. Individually the longitudinal dimension should also be balanced by overall structural needs. A wing with slipstream turbine 5 composed of many wing or airfoil 10 units has a combined structural load similar to that of a common wing under similar conditions. The combined output of this invention in modular mode will exceed that of any current system under similar fluid conditions, primarily swept area.

Figure 46:
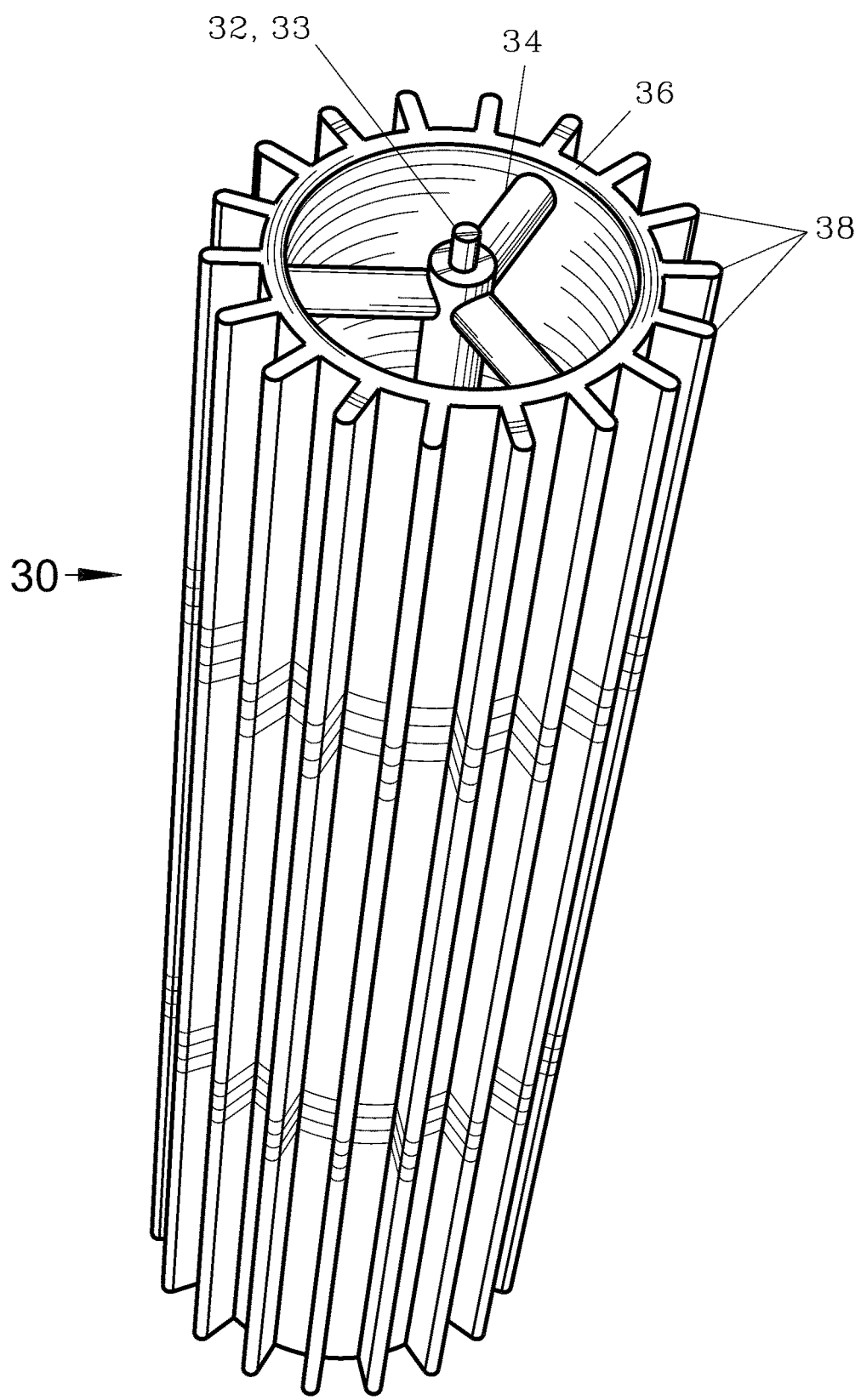
FIG. 46 is a perspective view of the turbine highlighting the runner and traveler configuration, used for lower density fluids.
Figure 47:
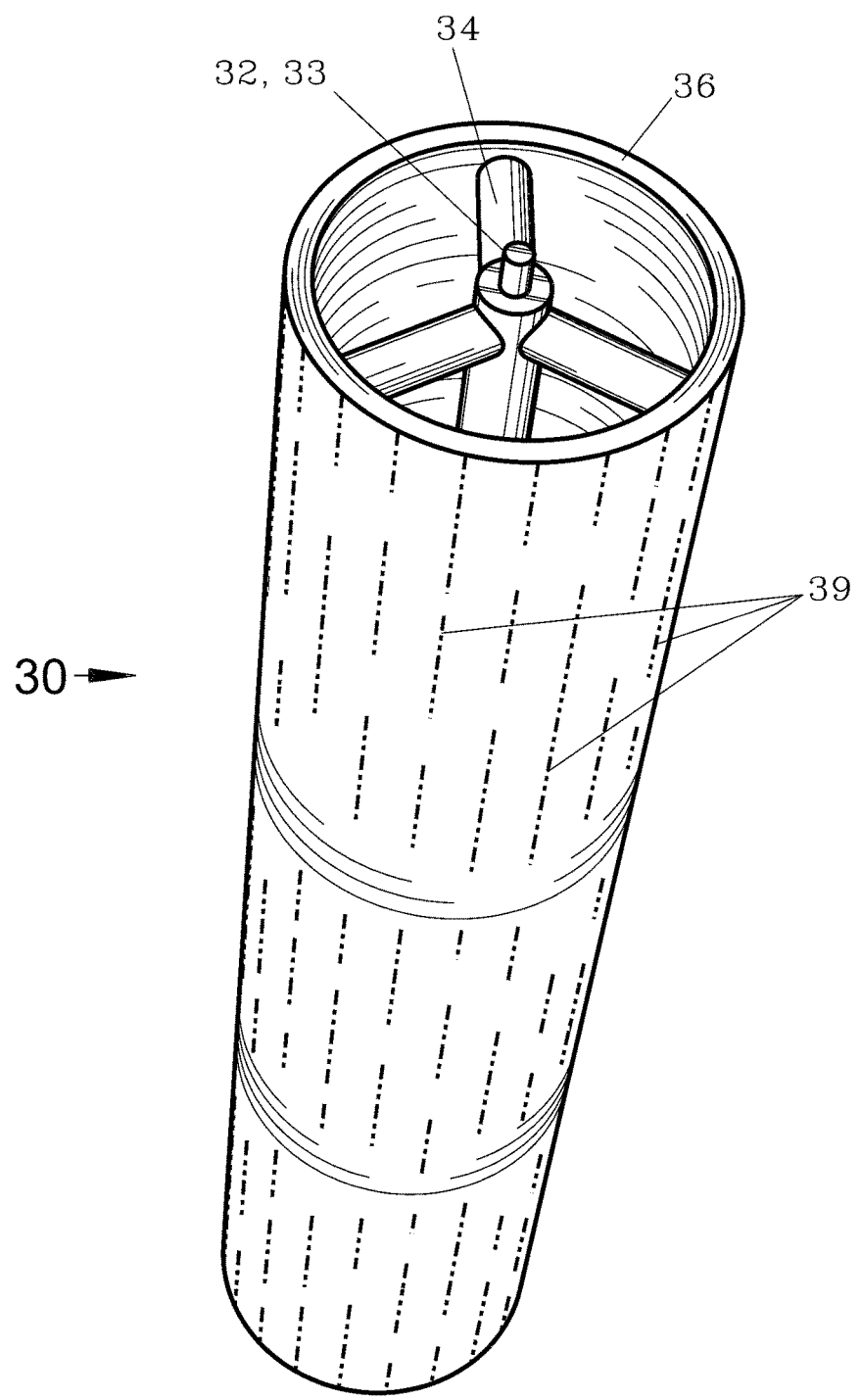
FIG. 47 is a perspective view of the turbine indicating a fibrous surface, similar to Astroturf, on the runner in place of the travelers, used for very high velocity and/or density fluids.

FIG. 46-47 depict two modes of slipstream turbine 30 that after detailed studies of the hydrodynamic nature in relation to fluid density revealed that the forces acting on the traveler 38 are directly proportional to the mass and viscosity of fluid impinging on traveler 38 in the area of same. Therefore as the average mass, viscosity or fluid velocity very from one location or fluid to another the travelers may change aspects to match optimum conditions. FIG. 46 includes blades or travelers 38 as the idealized form based on proportions indicated by analysis, however the length of traveler 38 should be carefully reviewed for each location. FIG. 47 shows blade or traveler 38 being replaced by fibrous surface covering 39 that could be as simple as a form of common outdoor carpet. The individual fibers, rods, bumps, indentations, paddles, fins or appendages protruding radially outward from the outer surface of drum or runner 36. Many fluids will not "wet" a surface, (water will not wet wax) meaning the water molecules do not adhere to the wax molecules: in that they appear to be repelled by each other, caused by molecular polarity and surface tension, this condition would be very detrimental to energy transfer particularly with fibrous surface covering 39, yet this could have interesting results when applied to other components that enjoy less surface friction.

What is claimed is:

1. A windmill comprising:
   an airfoil [10];
   a left partial cylindrical void [22];
   a right partial cylindrical void [24];
   a left turbine [26];
   a right turbine [28];
   a center evacuation channel [76]; and
   a super low pressure chamber [78], wherein
      said airfoil [10] comprises a leading subcomponent [70], a left subcomponent [72], and a right subcomponent [74], wherein
      said leading subcomponent [70], said left subcomponent [72], and said right subcomponent [74] are each an elongated planar member with rounded edges, elongated ellipsoid shaped planar member, elongated airfoil-shaped member, or wing-shaped member,
      said leading subcomponent [70], said left subcomponent [72], and said right subcomponent [74] are shaped and positioned to form an overall symmetric airfoil shape with a leading edge [11], a trailing edge [14], a left surface [12], a right surface [13], an upper end [15], and a lower end [16], with said leading edge [11] located on said leading subcomponent [70], said left surface [12] located on said left subcomponent [72], and said right surface [13] located on said right subcomponent [74],
      said left partial cylindrical void [22] is a cylindrical-shaped void in said left surface [12] where a complete cylindrical shaped void has not been carved, removed, or voided from said left subcomponent [70],
      said right partial cylindrical void [24] is a cylindrical-shaped void in said right surface [13] where a complete cylindrical shaped void has not been carved, removed, or voided from said right subcomponent [72], said left turbine [26] comprises an axle, a plurality of spoke members, a drum, and a plurality of blades [38] or a fibrous surface covering [39] that is carpet or a plurality of individual fibers, rods, bumps, indentations, paddles, fins, or appendages protruding radially outward out from said drum, said left turbine [26] is cylindrical shaped and sized slightly smaller than the cylindrical shape of said left partial cylindrical void [22] so that said left turbine [26] may be nested within said left partial cylindrical void [22] to form a slip fit therein, said right turbine [28] comprises an axle, a plurality of spoke members, a drum, and a plurality of blades [38] or a fibrous face covering [39] that is carpet or a plurality of individual fibers, rods, bumps, indentations, paddles, fins, or appendages protruding radially outward out from said drum, said right turbine [28] is cylindrical shaped and sized slightly smaller than the cylindrical shape of said right partial cylindrical void [24] so that said right turbine [28] may be nested within said right partial cylindrical void [24] to form a slip fit therein, said center evacuation channel [76] is defined by said left subcomponent [72], said trailing edge [14], said right subcomponent [74], and said super low pressure chamber [78], said center evacuation channel [76] is an open slot or channel running between said left subcomponent [72] and said right subcomponent [74] from respective leading edges of said left subcomponent [72] and said right subcomponent [74] to respective trailing edges of said left subcomponent [72] and said right subcomponent [74], and said super low pressure chamber [78] is defined by said subcomponent [70], said left turbine [26], said center evacuation channel [76], and said right turbine [28].

* * * * *